United States Patent
Nielsen et al.

(10) Patent No.: US 8,560,164 B2
(45) Date of Patent: Oct. 15, 2013

(54) SYSTEMS AND METHODS FOR COMPLEX EVENT PROCESSING OF VEHICLE INFORMATION AND IMAGE INFORMATION RELATING TO A VEHICLE

(75) Inventors: Steven Nielsen, North Palm Beach, FL (US); Curtis Chambers, Palm Beach Gardens, FL (US); Jeffrey Farr, Jupiter, FL (US)

(73) Assignee: CertusView Technologies, LLC, Palm Beach Gardens, FL (US)

( * ) Notice: Subject to any disclaimer, the term of this patent is extended or adjusted under 35 U.S.C. 154(b) by 81 days.

(21) Appl. No.: 12/853,371

(22) Filed: Aug. 10, 2010

(65) Prior Publication Data

US 2011/0060496 A1 Mar. 10, 2011

Related U.S. Application Data

(60) Provisional application No. 61/232,902, filed on Aug. 11, 2009, provisional application No. 61/238,530, filed on Aug. 31, 2009.

(30) Foreign Application Priority Data

Aug. 9, 2010 (CA) ..................................... 2712576

(51) Int. Cl.
*G06F 7/00* (2006.01)
*B60T 7/12* (2006.01)
*B60Q 1/00* (2006.01)

(52) U.S. Cl.
USPC ........ 701/31.4; 701/31.6; 701/517; 701/29.1; 340/576; 340/937

(58) Field of Classification Search
USPC .......................... 701/33, 31.4, 31.6, 484, 517; 340/426.16, 425.5
See application file for complete search history.

(56) References Cited

U.S. PATENT DOCUMENTS

| | | | |
|---|---|---|---|
| 5,717,922 A | 2/1998 | Hohensee et al. | |
| 6,542,077 B2 * | 4/2003 | Joao | 340/426.16 |
| 6,714,859 B2 | 3/2004 | Jones | |
| 6,804,606 B2 | 10/2004 | Jones | |
| 6,904,359 B2 | 6/2005 | Jones | |
| 6,952,645 B1 | 10/2005 | Jones | |
| 7,046,169 B2 * | 5/2006 | Bucholz et al. | 340/937 |
| 7,191,058 B2 | 3/2007 | Laird et al. | |

(Continued)

OTHER PUBLICATIONS

U.S. Appl. No. 12/980,054, filed Dec. 28, 2010, Nielsen et al.

(Continued)

*Primary Examiner* — Thomas Black
*Assistant Examiner* — Wae Louie

(57) ABSTRACT

A vehicle-based complex event processing (CEP) engine executes on a hardware computer processor in a vehicle. The CEP engine receives a first input stream onto which vehicle information related to the vehicle is published, and applies at least one query to the first input stream. The CEP engine then assesses, based on application of the query/queries, if a vehicle-related event has occurred and, if so, the CEP engine publishes an indication of occurrence of the vehicle-related event on at least one output stream of the CEP engine. In one example, the CEP engine may receive a second input stream onto which image information is published, wherein the image information is based at least in part on data provided by at least one on-board vehicle camera.

57 Claims, 13 Drawing Sheets

(56) References Cited

U.S. PATENT DOCUMENTS

| | | | |
|---|---|---|---|
| 7,266,571 B2 | 9/2007 | Botzer et al. | |
| 7,392,320 B2 | 6/2008 | Bookman et al. | |
| 7,397,363 B2* | 7/2008 | Joao | 340/539.11 |
| 7,421,334 B2* | 9/2008 | Dahlgren et al. | 701/117 |
| 7,441,249 B2* | 10/2008 | Adachi et al. | 719/313 |
| 7,448,048 B1 | 11/2008 | Nesamoney et al. | |
| 7,502,672 B1* | 3/2009 | Kolls | 701/31.6 |
| 7,558,564 B2 | 7/2009 | Wesby | |
| 7,640,105 B2* | 12/2009 | Nielsen et al. | 701/484 |
| 7,659,827 B2* | 2/2010 | Gunderson et al. | 340/576 |
| 7,705,777 B2 | 4/2010 | Sanderford, Jr. et al. | |
| 7,783,507 B2 | 8/2010 | Schick | |
| 7,891,004 B1 | 2/2011 | Gelvin et al. | |
| 7,904,569 B1 | 3/2011 | Gelvin et al. | |
| 8,060,304 B2* | 11/2011 | Nielsen et al. | 701/517 |
| 8,311,765 B2 | 11/2012 | Nielsen et al. | |
| 8,473,148 B2 | 6/2013 | Nielsen et al. | |
| 8,480,332 B2 | 7/2013 | Miller | |
| 2002/0016653 A1* | 2/2002 | Levine | 701/1 |
| 2003/0055666 A1 | 3/2003 | Roddy | |
| 2004/0153225 A1 | 8/2004 | Stam et al. | |
| 2004/0237077 A1 | 11/2004 | Cole et al. | |
| 2005/0027480 A1* | 2/2005 | Qiao et al. | 702/183 |
| 2005/0107927 A1 | 5/2005 | Mavreas | |
| 2006/0015389 A1 | 1/2006 | Perham | |
| 2006/0052909 A1 | 3/2006 | Cherouny | |
| 2006/0229923 A1 | 10/2006 | Adi et al. | |
| 2007/0005202 A1* | 1/2007 | Breed | 701/29 |
| 2007/0027583 A1* | 2/2007 | Tamir et al. | 701/1 |
| 2007/0050232 A1 | 3/2007 | Chang et al. | |
| 2007/0118545 A1 | 5/2007 | Chandrasekharan et al. | |
| 2007/0124063 A1* | 5/2007 | Kindo | 701/208 |
| 2007/0185746 A1 | 8/2007 | Chieu et al. | |
| 2007/0198144 A1* | 8/2007 | Norris et al. | 701/23 |
| 2007/0198992 A1 | 8/2007 | Mirlas et al. | |
| 2007/0255529 A1 | 11/2007 | Biazetti et al. | |
| 2007/0257781 A1 | 11/2007 | Denson | |
| 2007/0260569 A1 | 11/2007 | Biger et al. | |
| 2008/0010338 A1 | 1/2008 | Curtis et al. | |
| 2008/0033609 A1* | 2/2008 | Razavi | 701/33 |
| 2008/0091309 A1 | 4/2008 | Walker | |
| 2008/0141281 A1 | 6/2008 | Ramsey et al. | |
| 2008/0147267 A1* | 6/2008 | Plante et al. | 701/35 |
| 2008/0189352 A1 | 8/2008 | Mitchell et al. | |
| 2008/0208657 A1 | 8/2008 | Chessell et al. | |
| 2008/0235658 A1 | 9/2008 | Adi et al. | |
| 2008/0281485 A1* | 11/2008 | Plante et al. | 701/35 |
| 2009/0013928 A1 | 1/2009 | Nielsen et al. | |
| 2009/0187307 A1 | 7/2009 | Imadea et al. | |
| 2009/0201178 A1 | 8/2009 | Nielsen et al. | |
| 2009/0201311 A1 | 8/2009 | Nielsen et al. | |
| 2009/0202101 A1 | 8/2009 | Nielsen et al. | |
| 2009/0202110 A1 | 8/2009 | Nielsen et al. | |
| 2009/0202111 A1 | 8/2009 | Nielsen et al. | |
| 2009/0202112 A1 | 8/2009 | Nielsen et al. | |
| 2009/0204238 A1 | 8/2009 | Nielsen et al. | |
| 2009/0204466 A1 | 8/2009 | Nielsen et al. | |
| 2009/0204614 A1 | 8/2009 | Nielsen et al. | |
| 2009/0204625 A1 | 8/2009 | Nielsen et al. | |
| 2009/0207019 A1 | 8/2009 | Nielsen et al. | |
| 2009/0208642 A1 | 8/2009 | Nielsen et al. | |
| 2009/0210098 A1 | 8/2009 | Nielsen et al. | |
| 2009/0210284 A1 | 8/2009 | Nielsen et al. | |
| 2009/0210285 A1 | 8/2009 | Nielsen et al. | |
| 2009/0210297 A1 | 8/2009 | Nielsen et al. | |
| 2009/0210298 A1 | 8/2009 | Nielsen et al. | |
| 2009/0237408 A1 | 9/2009 | Nielsen et al. | |
| 2009/0238414 A1 | 9/2009 | Nielsen et al. | |
| 2009/0238415 A1 | 9/2009 | Nielsen et al. | |
| 2009/0238416 A1 | 9/2009 | Nielsen et al. | |
| 2009/0238417 A1 | 9/2009 | Nielsen et al. | |
| 2009/0241045 A1 | 9/2009 | Nielsen et al. | |
| 2009/0271468 A1 | 10/2009 | Distefano | |
| 2009/0324815 A1 | 12/2009 | Nielsen et al. | |
| 2009/0327024 A1 | 12/2009 | Nielsen et al. | |
| 2010/0006667 A1 | 1/2010 | Nielsen et al. | |
| 2010/0010862 A1 | 1/2010 | Nielsen et al. | |
| 2010/0010863 A1 | 1/2010 | Nielsen et al. | |
| 2010/0010882 A1 | 1/2010 | Nielsen et al. | |
| 2010/0010883 A1 | 1/2010 | Nielsen et al. | |
| 2010/0023201 A1* | 1/2010 | Kinney et al. | 701/33 |
| 2010/0084532 A1 | 4/2010 | Nielsen et al. | |
| 2010/0085054 A1 | 4/2010 | Nielsen et al. | |
| 2010/0085376 A1 | 4/2010 | Nielsen et al. | |
| 2010/0085694 A1 | 4/2010 | Nielsen et al. | |
| 2010/0085701 A1 | 4/2010 | Nielsen et al. | |
| 2010/0086671 A1 | 4/2010 | Nielsen et al. | |
| 2010/0086677 A1 | 4/2010 | Nielsen et al. | |
| 2010/0088031 A1 | 4/2010 | Nielsen et al. | |
| 2010/0088032 A1 | 4/2010 | Nielsen et al. | |
| 2010/0088134 A1 | 4/2010 | Nielsen et al. | |
| 2010/0088135 A1 | 4/2010 | Nielsen et al. | |
| 2010/0088164 A1 | 4/2010 | Nielsen et al. | |
| 2010/0090700 A1 | 4/2010 | Nielsen et al. | |
| 2010/0090858 A1 | 4/2010 | Nielsen et al. | |
| 2010/0094553 A1 | 4/2010 | Nielsen et al. | |
| 2010/0117654 A1 | 5/2010 | Nielsen et al. | |
| 2010/0182398 A1 | 7/2010 | Mazzilli | |
| 2010/0188088 A1 | 7/2010 | Nielsen et al. | |
| 2010/0188215 A1 | 7/2010 | Nielsen et al. | |
| 2010/0188216 A1 | 7/2010 | Nielsen et al. | |
| 2010/0188245 A1 | 7/2010 | Nielsen et al. | |
| 2010/0188407 A1 | 7/2010 | Nielsen et al. | |
| 2010/0189312 A1 | 7/2010 | Nielsen et al. | |
| 2010/0189887 A1 | 7/2010 | Nielsen et al. | |
| 2010/0198663 A1 | 8/2010 | Nielsen et al. | |
| 2010/0201690 A1 | 8/2010 | Nielsen et al. | |
| 2010/0201706 A1 | 8/2010 | Nielsen et al. | |
| 2010/0205031 A1 | 8/2010 | Nielsen et al. | |
| 2010/0205032 A1 | 8/2010 | Nielsen et al. | |
| 2010/0205195 A1 | 8/2010 | Nielsen et al. | |
| 2010/0205264 A1 | 8/2010 | Nielsen et al. | |
| 2010/0205536 A1 | 8/2010 | Nielsen et al. | |
| 2010/0205554 A1 | 8/2010 | Nielsen et al. | |
| 2010/0205555 A1 | 8/2010 | Nielsen et al. | |
| 2010/0228588 A1 | 9/2010 | Nielsen et al. | |
| 2010/0241046 A1 | 9/2010 | Pinchuk et al. | |
| 2010/0245086 A1 | 9/2010 | Nielsen et al. | |
| 2010/0247754 A1 | 9/2010 | Nielsen et al. | |
| 2010/0253511 A1 | 10/2010 | Nielsen et al. | |
| 2010/0253513 A1 | 10/2010 | Nielsen et al. | |
| 2010/0253514 A1 | 10/2010 | Nielsen et al. | |
| 2010/0255182 A1 | 10/2010 | Nielsen et al. | |
| 2010/0256825 A1 | 10/2010 | Nielsen et al. | |
| 2010/0256912 A1 | 10/2010 | Nielsen et al. | |
| 2010/0256981 A1 | 10/2010 | Nielsen et al. | |
| 2010/0257029 A1 | 10/2010 | Nielsen et al. | |
| 2010/0257477 A1 | 10/2010 | Nielsen et al. | |
| 2010/0259381 A1 | 10/2010 | Nielsen et al. | |
| 2010/0259414 A1 | 10/2010 | Nielsen et al. | |
| 2010/0262470 A1 | 10/2010 | Nielsen et al. | |
| 2010/0262670 A1 | 10/2010 | Nielsen et al. | |
| 2010/0263591 A1 | 10/2010 | Nielsen et al. | |
| 2010/0268786 A1 | 10/2010 | Nielsen et al. | |
| 2010/0285211 A1 | 11/2010 | Nielsen et al. | |
| 2010/0318401 A1 | 12/2010 | Nielsen et al. | |
| 2010/0318402 A1 | 12/2010 | Nielsen et al. | |
| 2010/0318465 A1 | 12/2010 | Nielsen et al. | |
| 2010/0324967 A1 | 12/2010 | Nielsen et al. | |
| 2011/0007076 A1 | 1/2011 | Nielsen et al. | |
| 2011/0020776 A1 | 1/2011 | Nielsen et al. | |
| 2011/0022433 A1 | 1/2011 | Nielsen et al. | |
| 2011/0035245 A1 | 2/2011 | Nielsen et al. | |
| 2011/0035251 A1 | 2/2011 | Nielsen et al. | |
| 2011/0035252 A1 | 2/2011 | Nielsen et al. | |
| 2011/0035260 A1 | 2/2011 | Nielsen et al. | |
| 2011/0035324 A1 | 2/2011 | Nielsen et al. | |
| 2011/0035328 A1 | 2/2011 | Nielsen et al. | |
| 2011/0040589 A1 | 2/2011 | Nielsen et al. | |
| 2011/0040590 A1 | 2/2011 | Nielsen et al. | |
| 2011/0045175 A1 | 2/2011 | Nielsen et al. | |
| 2011/0046993 A1 | 2/2011 | Nielsen et al. | |
| 2011/0046994 A1 | 2/2011 | Nielsen et al. | |
| 2011/0046999 A1 | 2/2011 | Nielsen et al. | |

(56) References Cited

U.S. PATENT DOCUMENTS

| | | | |
|---|---|---|---|
| 2011/0060496 A1* | 3/2011 | Nielsen et al. ................. 701/33 |
| 2011/0060549 A1 | 3/2011 | Nielsen et al. |
| 2011/0093162 A1* | 4/2011 | Nielsen et al. ................. 701/33 |
| 2011/0093304 A1* | 4/2011 | Nielsen et al. ............... 705/7.12 |
| 2011/0093306 A1 | 4/2011 | Nielsen et al. |
| 2011/0095885 A9 | 4/2011 | Nielsen et al. |
| 2011/0117272 A1 | 5/2011 | Nielsen et al. |
| 2011/0131081 A1 | 6/2011 | Nielsen et al. |
| 2011/0135163 A1 | 6/2011 | Nielsen et al. |
| 2011/0137769 A1 | 6/2011 | Nielsen et al. |
| 2011/0236588 A1 | 9/2011 | Nielsen et al. |
| 2011/0249394 A1 | 10/2011 | Nielsen et al. |
| 2011/0279229 A1 | 11/2011 | Nielsen et al. |
| 2011/0279230 A1 | 11/2011 | Nielsen et al. |
| 2011/0279476 A1 | 11/2011 | Nielsen et al. |
| 2011/0282542 A9 | 11/2011 | Nielsen et al. |
| 2011/0283217 A1 | 11/2011 | Nielsen et al. |
| 2011/0285749 A1 | 11/2011 | Nielsen et al. |
| 2012/0019380 A1 | 1/2012 | Nielsen et al. |
| 2012/0036140 A1 | 2/2012 | Nielsen et al. |
| 2012/0065924 A1 | 3/2012 | Nielsen et al. |
| 2012/0065944 A1 | 3/2012 | Nielsen et al. |
| 2012/0066137 A1 | 3/2012 | Nielsen et al. |
| 2012/0066273 A1 | 3/2012 | Nielsen et al. |
| 2012/0066506 A1 | 3/2012 | Nielsen et al. |
| 2012/0069178 A1 | 3/2012 | Nielsen et al. |
| 2012/0072035 A1 | 3/2012 | Nielsen et al. |
| 2012/0110019 A1 | 5/2012 | Nielsen et al. |
| 2012/0113244 A1 | 5/2012 | Nielsen et al. |
| 2012/0274476 A1 | 11/2012 | Nielsen et al. |
| 2012/0328162 A1 | 12/2012 | Nielsen et al. |
| 2012/0330849 A1 | 12/2012 | Nielsen et al. |
| 2013/0002854 A1 | 1/2013 | Nielsen et al. |
| 2013/0006718 A1 | 1/2013 | Nielsen et al. |
| 2013/0044918 A1 | 2/2013 | Nielsen et al. |
| 2013/0101180 A1 | 4/2013 | Nielsen et al. |
| 2013/0103318 A1 | 4/2013 | Nielsen et al. |
| 2013/0116855 A1 | 5/2013 | Nielsen et al. |
| 2013/0125042 A1 | 5/2013 | Nielsen et al. |
| 2013/0135343 A1 | 5/2013 | Nielsen et al. |
| 2013/0147637 A1 | 6/2013 | Nielsen et al. |
| 2013/0162431 A1 | 6/2013 | Nielsen et al. |

OTHER PUBLICATIONS

U.S. Appl. No. 12/980,083, filed Dec. 28, 2010, Nielsen et al.
U.S. Appl. No. 12/981,018, filed Dec. 29, 2010, Nielsen et al.
GigaSpaces blog, Interview with Michael DiStefano from Integrasoft on their CEP Cloud Services using Esper GigaSpaces, Feb. 13, 2010, 8 pages, http://blog.gigaspaces.com/2010/02/13/interview-with-michael-di-stefano-from-integrasoft-on-their-cep-cloud-services-using-esper-gigaspaces/.
IBM Corporation, "A Conceptual Model for Event Processing Systems," 2010, 47 pages, ibm.com/developerWorks.
International Search Report, Application No. PCT/US2010/45000, Nov. 8, 2010.
Luckham, D. (Editor), Event Processing Technical Society, "Event Processing Glossary—Version 1.1," Jul. 2008, 19 pages.
McReynolds, S., Complex Event Processing in the Real World, an Oracle White Paper, Sep. 2007, 13 pages.
Notice of Allowance dated Feb. 3, 2012 from Canadian Application No. 2,754,159.
Notice of Allowance dated Jul. 26, 2011 from Canadian Application No. 2,712,576.
Su, Y. et al., "Study of Integrated Vehicle Image System Including LDW, FCW, and AFS," World Academy of Science, Engineering and Technology 60 2009, p. 216-222.
TIBCO Complex Event Processing blog, CEP vs. "Business Rules," Oct. 22, 2007, 7 pages, http://tibcoblogs.com/cep/2007/10/22/cep-vs-business-rules/.
Office Action dated Jul. 5, 2012 from U.S. Appl. No. 12/980,083.
Office Action dated Jul. 6, 2012 from U.S. Appl. No. 12/980,054.
Office Action dated Jan. 16, 2013 form U.S. Appl. No. 12/981,018.
Notice of Allowance from U.S. Appl. No. 12/980,083 dated Feb. 28, 2013.
Office Action dated Nov. 14, 2012 from Australian Application No. 2010282634.
Notice of Allowance dated Mar. 13, 2013 from U.S. Appl. No. 12/980,054.
Notice of Allowability dated May 17, 2013 from U.S. Appl. No. 12/980,054.
Notice of Allowance dated May 8, 2013 from U.S. Appl. No. 12/980,083.
Notice of Allowance dated Apr. 25, 2013 from U.S. Appl. No. 12/981,018.

* cited by examiner

SYSTEMS AND METHODS FOR COMPLEX EVENT PROCESSING OF VEHICLE INFORMATION AND IMAGE INFORMATION RELATING TO A VEHICLE

CROSS-REFERENCES TO RELATED APPLICATIONS

This application claims a priority benefit, under 35 U.S.C. §119(a), to Canadian application serial no. 2712576, entitled "Systems and Methods for Complex Event Processing of Vehicle-related Information," filed on Aug. 9, 2010.

This application claims a priority benefit, under 35 U.S.C. §119(e), to U.S. Provisional Patent Application No. 61/232,902, entitled "Systems And Methods For Complex Event Processing," filed on Aug. 11, 2009.

This application claims a priority benefit, under 35 U.S.C. §119(e), to U.S. Provisional Patent Application No. 61/238,530, entitled "Systems And Methods For Complex Event Processing," filed on Aug. 31, 2009.

Each of the above-identified applications is incorporated by reference herein in its entirety.

BACKGROUND

Complex event processing (CEP) relates to identifying patterns of events or relationships between such events. A CEP "engine" (e.g., one or more processors, memory, software and/or other associated devices to perform CEP) may receive one or more input streams of data from any of a variety of information sources, monitor the input stream(s) for the presence of certain information, and then publish data onto one or more output streams relating to some type of processing/analysis of the input stream(s) (e.g., if/when it is determined that one or more events have occurred based on certain information in the input stream(s)). Various types of data may be published onto input streams having a variety of formats for inputting to the CEP engine; for example, data may include text strings, integer values, floating point digital values (or other types of digital values), and/or Boolean (e.g., true/false) values. Likewise, data published onto output streams may have a variety of formats (e.g., Boolean values may be employed particularly to indicate an occurrence or non-occurrence of an event based on monitoring of the input stream(s)).

In CEP, a set of queries may be defined (e.g., by a user, developer, or administrator of the CEP engine) that the CEP engine uses to process/analyze the input stream(s) so as to determine if one or more events have occurred. That is, a CEP engine may receive incoming data (e.g., from external sensors or other data sources) on one or more input streams and apply the queries to the incoming data to determine if events have occurred. As examples, some queries may be thought of as IF-THEN conditional statements or SQL-type pattern-match queries that define if/when one or both of simple events (sometimes called primitive events) and complex events have occurred. The distinction between simple and complex events in some instances may be defined by the creator of the queries. In one illustrative example, a simple event may be considered as the existence of a particular condition or state at a particular instant of time or for some duration of time, whereas a complex event may be considered as relating to the combined occurrence of two or more simple events with a particular timing relationship between/among the simple events. In any event, again occurrences that constitute simple events are defined by the creator of the queries, and likewise the queries may define complex events, which typically are events that are composed of or derived from other events.

For example, a CEP engine may receive input data from a thermometer and a hygrometer. One query in a query set may define a simple event, called a "temperature event" to have occurred if the temperature data from the thermometer indicates that the temperature is above ninety degrees Fahrenheit. Another query in the query set may define a simple event, called a "humidity event" to have occurred if the relative humidity data from the hygrometer is above ninety percent. A third query in the query set may define a complex event, called a "sweltering event" to have occurred if a "temperature event" occurs within thirty minutes of a "humidity event."

As another example, a CEP engine may receive respective input streams including data indicating the appearance of a man in a tuxedo, a woman in a white dress, and rice flying through the air, each of which may be defined as a simple event. Based on a particular query set, the CEP engine may infer from these simple events occurring within a certain amount of time of each other that a wedding has occurred and may output an indication that a wedding has occurred. The wedding can be thought of as a complex event that was inferred by the CEP engine from a pattern of simple events (e.g., the man in the tuxedo, the woman in the white dress, and rice flying through the air).

FIG. 1 is an example of a conventional CEP engine 101. CEP engine 101 includes a set or network of queries 103 that may be used to determine whether an event has occurred. Stream analysis logic 105 may receive a plurality of incoming data streams (also referred to as "input streams") 109a, 109b, . . . , 109n generated from a plurality of data sources 107a, 107b, 107n, and may apply queries 103 to the incoming data streams 109 to determine whether one or more events have occurred. Stream analysis logic 105 may output one or more indications of event occurrences via output streams 111a, 111b, . . . , 111m. One or more of the data sources may be a sensor (e.g., as discussed above in the temperature/hygrometer example). The input and output streams may be formatted in any of a variety of manners; for example, in one implementation, a given input stream may include a succession of data fields including various types of data (e.g., string/text, numerical, Boolean), and the data fields may be particularly organized is some order and include some type of identification field to identify the stream (e.g., a stream name, header, or other identifier) and one or more other data or "payload" fields including data.

CEP engines differ from conventional rules-based processing systems in various respects. First, conventional rules-based processing systems typically employ a batch processing approach in which incoming data is processed by the system periodically in batches. That is, incoming data is collected over a period of time, and at the end of each period the data is processed in a batch. By contrast, CEP engines are event driven, such that data streams input to the engine are continuously monitored and analyzed, and processing is driven by the occurrence of events. This allows a CEP engine to detect an event as soon as the data indicating the occurrence of that event is received by the CEP engine. By contrast, in a batch rules-based processing system, the detection of an event would not occur until the next periodic batch processing is executed.

In addition, unlike conventional rules-based processing systems, CEP engines employ "windows" for complex event detection. A window is a segment of memory that stores a value (e.g., an input value, from an incoming data stream, for example, or a computed result) for a configurable period of time. There are a number of different types of windows, including sliding windows, jumping windows, multi-policy windows, and other types of windows. With sliding windows, the designer of a network of queries to be applied or executed by a CEP engine may specify how long a value remains in one or more of the windows. For example, a query set may specify that only n values can be stored in a particular window at any given time, such that if there are n values stored in the window and a new value is received, the oldest value stored in the window is removed from the window to make room for the new value. Alternatively, a query set may specify a time period (e.g., in seconds, minutes, hours, days, months, years, and/or any other time period accepted by the CEP engine) for which a value is retained in the window. For example, a query set may specify that when a new value is received, it is stored in the window for four seconds, after which it is removed from the window.

The use of windows enables CEP engines to detect occurrences of complex events based on the times at which particular events occurred. For example, a CEP query may specify that a complex event of "wedding" is determined (and indicated in one or more output data streams) if a first event indicating the appearance of a man in a tuxedo ("tuxedo event") occurs within ten minutes of a second event indicating the appearance of a woman in a white dress ("white dress event") and within fifteen minutes of an event indicating rice flying through the air ("flying rice event"). The use of windows allows any "white dress event" to be stored in a first window for ten minutes before it is discarded, and any "flying rice event" to be stored in a second window for fifteen minutes before it is discarded. Thus, the CEP engine may, upon detecting a "tuxedo event," monitor the first and second windows to determine whether they store respective indications of a "white dress event" and a "flying rice event," and if both are present in their respective windows, detect a complex "wedding event."

In addition, the use of windows enables the system to preserve data that is pertinent to the defined events and discard data that is not pertinent to the defined events. This allows the system to efficiently use its storage/memory resources. For example, if a particular query indicates that a event is determined to have occurred if a value of "5" appears on a first input stream three times in a ten minute period, data that was received more than ten minutes since the last value of "5" was received is no longer pertinent and may be discarded.

Examples of commercially available CEP engines that operate in this way include the StreamBase Server, available from StreamBase Systems, Inc. of Lexington, Mass., Sybase CEP and the Sybase Aleri Streaming Platform, available from Sybase, Inc. of Dublin, Calif., and BusinessEvents 3.0 available from TIBCO Software Inc. of Palo Alto, Calif.

SUMMARY

The inventors have appreciated that in some commercial applications it may be desirable to have multiple CEP engines, in some instances situated at different geographic locations, that are able to communicate with each other. In this manner, complex event processing of geographically dispersed information and events that relate in some manner to a same or similar commercial application may be shared amongst multiple CEP engines.

For example, in a system of communicatively coupled CEP engines, one CEP engine may perform event processing using information from sensors that are not local to it, but wherein the information is passed to it and/or preliminarily processed by another CEP engine at a different geographic location. More specifically, communication amongst multiple CEP engines enables a first CEP engine to receive information from a local sensor, process that information to determine if a first event has occurred, take some "local action" triggered by the occurrence of the event (e.g., provide some perceivable indication of the first event, such as an audible or visible alert), and send an indication of the occurrence of the first event to a second CEP engine (which may be in a geographically remote location). The second CEP engine may process the indication of the occurrence of the first event with other information that it receives to determine if any other events have occurred, based on the first event, and in some cases may send an indication of the occurrence of such events back to the first CEP engine. This arrangement enables the first CEP engine to take a "reflexive" (i.e., essentially real-time or instantaneous) action in response to the occurrence of the first event without having to wait for any additional processing or response from the second CEP engine, but still allows for the second CEP engine to perform event processing based on the occurrence of the first event and send indications of other events detected by the second CEP engine back to the first CEP engine.

The inventors also have appreciated that allowing multiple CEP engines to communicate amongst each other may be useful in fields such as field service operations (e.g., scheduled installation, repair and/or maintenance; excavation and construction activities; activities relating to deployment and location of above-ground and underground utilities; etc.) and fleet management (e.g., where an organization is responsible for managing and/or operating a fleet of vehicles for various purposes). For purposes of the present disclosure, the term "fleet management operations" refers to any activity relating to the maintenance, dispatch (e.g., scheduling), operation, monitoring (e.g., tracking) and oversight of multiple vehicles and/or vehicle operators employed to conduct business. Given the wide variety of information and functionality germane to fleet management operations in general, the inventors have recognized and appreciated a number of advantages provided by innovative CEP architectures applied to such an environment.

In view of the foregoing, various embodiments of the present invention relate generally to apparatus, systems and methods for complex event processing, wherein exemplary implementations are directed to complex event processing of vehicle-related information, and/or innovative architectures for a system of communicatively coupled CEP engines (that may be employed, for example, to facilitate fleet management operations).

In particular, as discussed below in greater detail, the techniques discussed herein for enabling communication amongst different CEP engines in different geographic locations may provide benefits when used in connection with dispatching and managing field service technicians and generally managing a fleet of vehicles. For example, a CEP engine may be situated in multiple vehicles in a fleet, and respective vehicle-based CEP engines may in some instances communicate with each other. Furthermore, a given vehicle-based CEP engine may communicate with one or more mobile devices carried by a supervisor or dispatcher (e.g., a smart phone, tablet computer, or laptop computer, which itself may be executing a CEP engine), and/or may communicate with one or more office-based CEP engines (e.g., a main office or "central" CEP engine) to provide indications of "vehicle-related events" detected at the vehicle. A vehicle-based CEP engine also may receive indications of events from other vehicles, from a CEP engine executing on a mobile device of a supervisor and/or dispatcher CEP, and/or a central CEP engine. In another aspect, a CEP engine in such a system receiving input streams from multiple different vehicles (which input streams themselves may include vehicle-related events) may apply queries to the multiple input streams to determine various "fleet-related events" (e.g., relating to two or more of the vehicles of the fleet).

In various embodiments discussed in detail herein, it should be appreciated that a wide variety of information may be published to one or more input streams and monitored by a given CEP engine to assess if simple or complex events have occurred.

For example, in one aspect, information generally relating to a particular vehicle and/or its operating environment ("vehicle information") may be published onto one or more input streams of a CEP engine, and one or more queries may be applied by the CEP engine to the input stream(s) to assess if a vehicle-related simple or complex event has occurred. One example of vehicle information includes information provided by an Electronic Control Unit (ECU) of a vehicle (e.g., which may provide values corresponding to parameter identifiers defined by the On Board Diagnostic OBD-II standard SAE J1979, or other custom protocols, for various vehicle sensor readings or vehicle status information). Other examples of vehicle information include, but are not limited to, information provided by a variety of environmental and/or operational sensors associated with the vehicle (e.g., one or more GPS receivers, temperature sensors, humidity sensors, accelerometers, light sensors, cellular or WiFi transceivers and associated diagnostics, etc.). Vehicle information also may include resource or scheduling information relating the a driver of the vehicle at any given time and a pattern of usage of the vehicle over some period of time (e.g., to what driver is a vehicle assigned, when and/or by whom the vehicle was taken out or returned to a company lot, when the vehicle was started-up at the beginning of a day/shift and shut-down/parked at the end of a day/shift, vehicle maintenance schedules and/or maintenance history, etc.). In some exemplary implementations, resource and scheduling information may be made available to/accessed by one or more CEP engines via one or more electronic records in a database maintained by a company overseeing fleet management operations.

In another aspect, "image information" relating to a given vehicle and/or its operating environment may be published onto one or more dedicated input streams and/or may be provided as part of the vehicle information to which a CEP engine applies one or more queries. Examples of image information include, but are not limited to, "raw" or unprocessed information obtained from an output of one or more on-board vehicle cameras, status information regarding operation of one or more on-board vehicle cameras, and processed information (e.g., color detection information, luminance information, edge detection information, motion detection information, pattern/object recognition information, etc.) derived from data provided by one or more on-board vehicle cameras. In exemplary implementations, one or more on-board vehicle cameras may be placed inside and/or outside of a vehicle in various locations, and may monitor an internal view (including a driver) and/or an external view. Examples of on-board vehicle cameras from which various image information may be obtained include, but are not limited to, a 360 degree camera system, one or more in-cab cameras (e.g., mounted on or near a rear view minor) facing the rear and/or front of the vehicle, and a video event recorder configured to record video events based at least in part on one or more exceptional forces acting on the vehicle (e.g., hard braking, swerving, collision, etc.). In some embodiments, image information may be helpful in determining complex events relating to the state of the driver and/or the presence of particular objects, colors and/or patterns in the driver's field of view; examples of such complex events include, but are not limited to, a "driver distracted event," a "driver sleeping event," a "disobeyed stop traffic signal event," an "excessive speed event," a "lane change event," a "proximate forward collision event," and/or a "reckless driving event," for example.

In yet another aspect, "non-vehicle specific information" that may be helpful in determining vehicle-related events and/or fleet-related events may be published onto one or more input streams to which a CEP engine applies one or more queries. Examples of such information include, but are not limited to, weather information, traffic information, street map information, and credit card or fuel card transaction information. One or more of these exemplary information types may be obtained from a variety of sources in any of a variety of manners (e.g., issuing a web service call to retrieve weather, traffic and/or street map information from the Internet, in some instances based on a vehicle's current location). Non-vehicle specific information may be assessed by a CEP engine alone or together with vehicle information, image information, and/or one or more other complex events to determine a variety of vehicle-related and/or fleet-related events (e.g., fuel card transaction information may be queried together with vehicle fuel gauge readings information from an ECU of the vehicle within a certain time period of the transaction to assess if an amount of purchased fuel sufficiently matches the fuel gauge reading; weather and/or traffic information queried together with vehicle speed readings information from an ECU of the vehicle may be used to determine a traffic jam event, an excessive speed event or reckless driving event; GPS readings from multiple vehicles queried together with street map information may be used to determine a "driver congregation event").

More specifically, in various embodiments disclosed herein it should be appreciated that one or more simple or complex events themselves may be published onto one or more input streams to which a CEP engine applies one or more queries. For example, multiple input streams of vehicle-related events from respective vehicles of a fleet may be processed by a CEP engine, alone or together with other vehicle information and/or non-vehicle specific information, to determine a variety of fleet-related events. Some examples of fleet-related events were already noted above and may include, but are not limited to, a "traffic jam event," a "driver congregation event," a "frequent fueling event," a "favorite fueling location event," a "frequented location event," a "rough road event," a "high speed areas event," and a "dead communication area event."

With respect to simple or complex event detection, in various embodiments discussed herein a CEP engine may publish an indication of occurrence of an event on one or more output streams (which may in turn serve as one or more input streams to one or more other CEP engines). In addition, the detection of a simple or complex event may trigger one or more local alerts; for example, in connection with a vehicle-based CEP engine, detection of a vehicle-related event may cause generation of an audible or visual alert in the vehicle, and/or may cause some altered operation of the vehicle (e.g., ignition disabled, throttle disabled, application of brakes, etc.). An indication of event occurrence (e.g., either as a discrete signal or as part of an output stream) also may be transmitted (e.g., to another vehicle, to a supervisor/dispatcher in the field or at a central office) so as to generate a remote alert.

In sum, one embodiment of the invention is directed to a method of complex event processing in a system comprising a first complex event processing engine that receives at least one first input stream as input and generates at least one first output stream by applying at least one first query set to the at least one first input stream and a second complex event processing engine that receives at least one second input stream as input and generates at least one second output stream by applying at least one second query set to the at least one second input stream. The method comprises acts of: receiving input data at the first complex event processing engine via the at least one first input stream; determining, using the input data, whether a complex event has occurred by applying the at least one first query set; and when it is determined by the first complex event processing engine that a complex event has occurred, sending an indication of the occurrence of the complex event to second complex event processing engine via the at least one first output stream.

Another embodiment is directed to a method for complex event processing in a vehicle having a plurality of hardware sensors that provide information about at least one aspect of the vehicle. The method comprises acts of: (A) receiving, at a first complex event processing engine in the vehicle, information from at least one of the hardware sensors; (B) determining, in response to receiving the information, whether an event has occurred; and (C) when it is determined that an event has occurred: (C1) triggering a response to the event in the vehicle; and (C2) sending an indication of the event to at least one second complex event processing engine external to the vehicle.

Another embodiment is directed to a method for use in a system comprising a plurality of complex event processing engines including first complex event processing engine that is configured to send data to and receive data from a second complex event processing engine in the plurality of complex event processing engines and is configured to not send data to or receive data from a third complex event processing engine in the plurality of event processing engines. The method comprises: configuring the first complex event processing engine to not send data to or receive data from the second complex event processing engine; and configuring the first complex event processing engine to send data to and receive data from the third complex event processing engine.

Another embodiment is directed to a method performed by a complex event processing (CEP) engine that executes on at least one hardware computer processor in a vehicle. The method comprises: A) receiving at least two input streams comprising: at least one first input stream onto which vehicle information related to the vehicle is published; and at least one second input stream onto which image information is published, wherein the image information is based at least in part on data provided by at least one on-board vehicle camera; B) applying at least one query to the at least one first input stream and the at least one second input stream; C) assessing, based on B), if a vehicle-related complex event has occurred; and D) if it is determined in C) that the vehicle-related complex event has occurred, publishing an indication of occurrence of the vehicle-related complex event on at least one output stream of the CEP engine.

Another embodiment is directed to at least one computer-readable medium encoded with a processor-executable instructions that, when executed by at least one hardware computer processor, implement a complex event processing (CEP) engine that performs a method comprising: A) receiving at least two input streams comprising: at least one first input stream onto which vehicle information related to a vehicle is published; and at least one second input stream onto which image information is published, wherein the image information is based at least in part on data provided by at least one on-board vehicle camera; B) applying at least one query to the at least one first input stream and the at least one second input stream; C) assessing, based on B), if a vehicle-related complex event has occurred; and D) if it is determined in C) that the vehicle-related complex event has occurred, publishing an indication of occurrence of the vehicle-related complex event on at least one output stream of the CEP engine.

Another embodiment is directed to a complex event processing (CEP) engine to assess occurrences of vehicle-related complex events, the CEP engine comprising: at least one hardware computer processor; at least one input/output (I/O) interface; and at least one tangible memory to store processor-executable instructions, wherein, upon execution of the processor-executable instructions by the at least one hardware computer processor, the CEP engine: A) receives, via the at least one I/O interface, at least two input streams comprising: at least one first input stream onto which vehicle information related to a vehicle is published; and at least one second input stream onto which image information is published, wherein the image information is based at least in part on data provided by at least one on-board vehicle camera; B) applies at least one query to the at least one first input stream and the at least one second input stream; C) assesses, based on B), if a vehicle-related complex event has occurred; and D) if it is determined in C) that the vehicle-related complex event has occurred, publishes, via the at least one I/O interface, an indication of occurrence of the vehicle-related complex event on at least one output stream of the CEP engine. In yet another embodiment, a system comprises the foregoing CEP engine in combination with the at least one on-board vehicle camera and the vehicle, wherein the CEP engine is disposed on the vehicle.

Another embodiment is directed to a method performed by a first vehicle-based complex event processing (CEP) engine that executes on at least one hardware computer processor in a first vehicle, the method comprising: A) receiving at least one first input stream onto which vehicle information related to the first vehicle is published; B) applying at least one query to the at least one first input stream; C) assessing, based on B), if a vehicle-related event has occurred; D) if it is determined in C) that the vehicle-related event has occurred, publishing an indication of occurrence of the vehicle-related event on at least one output stream of the first vehicle-based CEP engine; and E) transmitting the indication of occurrence of the vehicle-related event from the first vehicle.

Another embodiment is directed to at least one computer-readable medium encoded with a processor-executable instructions that, when executed by at least one hardware computer processor, implement a complex event processing (CEP) engine that performs a method comprising: A) receiving at least one first input stream onto which vehicle information related to a first vehicle is published; B) applying at least one query to the at least one first input stream; C) assessing, based on B), if a vehicle-related event has occurred; and D) if it is determined in C) that the vehicle-related event has occurred, publishing an indication of occurrence of the vehicle-related event on at least one output stream of the CEP engine.

Another embodiment is directed to a complex event processing (CEP) engine to assess occurrences of vehicle-related events, the CEP engine comprising: at least one hardware computer processor; at least one input/output (I/O) interface; and at least one tangible memory to store processor-executable instructions, wherein, upon execution of the processor-executable instructions by the at least one hardware computer processor, the CEP engine: A) receives at least one first input stream onto which vehicle information related to a first vehicle is published; B) applies at least one query to the at least one first input stream; C) assesses, based on B), if a vehicle-related event has occurred; and D) if it is determined in C) that the vehicle-related event has occurred, publishes an indication of occurrence of the vehicle-related event on at least one output stream of the CEP engine. Another embodiment is directed to a system, comprising the foregoing CEP engine and the first vehicle, wherein the CEP engine is disposed on the first vehicle, and wherein the CEP engine further E) transmits the indication of occurrence of the vehicle-related event from the first vehicle.

Another embodiment is directed to a method performed by a fleet management complex event processing (CEP) engine that executes on at least one hardware computer processor, the method comprising: A) receiving at least two input streams comprising: at least one first input stream onto which first vehicle information related to a first vehicle is published; and at least one second input stream onto which second vehicle information related to a second vehicle is published; B) applying at least one query to the at least one first input stream and the at least one second input stream; C) assessing, based on B), if a fleet-related complex event has occurred; and D) if it is determined in C) that the fleet-related complex event has occurred, publishing an indication of occurrence of the fleet-related complex event on at least one output stream of the fleet management CEP engine.

Another embodiment is directed to at least one computer-readable medium encoded with a processor-executable instructions that, when executed by at least one hardware computer processor, implement a fleet-management complex event processing (CEP) engine that performs a method comprising: A) receiving at least two input streams comprising: at least one first input stream onto which first vehicle information related to a first vehicle is published; and at least one second input stream onto which second vehicle information related to a second vehicle is published; B) applying at least one query to the at least one first input stream and the at least one second input stream; C) assessing, based on B), if a fleet-related complex event has occurred; and D) if it is determined in C) that the fleet-related complex event has occurred, publishing an indication of occurrence of the fleet-related complex event on at least one output stream of the fleet management CEP engine.

Another embodiment is directed to a fleet management complex event processing (CEP) engine to assess occurrences of fleet-related complex events, the fleet management CEP engine comprising: at least one hardware computer processor; at least one input/output (I/O) interface; and at least one tangible memory to store processor-executable instructions, wherein, upon execution of the processor-executable instructions by the at least one hardware computer processor, the fleet management CEP engine: A) receives at least two input streams comprising: at least one first input stream onto which first vehicle information related to a first vehicle is published; and at least one second input stream onto which second vehicle information related to a second vehicle is published; B) applies at least one query to the at least one first input stream and the at least one second input stream; C) assesses, based on B), if a fleet-related complex event has occurred; and D) if it is determined in C) that the fleet-related complex event has occurred, publishes an indication of occurrence of the fleet-related complex event on at least one output stream of the fleet management CEP engine. In another embodiment, a system comprises the foregoing fleet management CEP engine, in combination with a first vehicle-based CEP engine executing on at least one first vehicle-based hardware computer processor in the first vehicle; and a second vehicle-based CEP engine executing on at least one second vehicle-based hardware computer processor in the second vehicle, wherein the first vehicle information includes at least one first vehicle-related event, the first vehicle-based CEP engine transmits the at least one first vehicle-related event to the fleet management CEP engine, the second vehicle information includes at least one second vehicle-related event, and the second vehicle-based CEP engine transmits the at least one second vehicle-related event to the fleet management CEP engine.

Another embodiment is directed to a method performed by a complex event processing (CEP) engine that executes on at least one hardware computer processor, the method comprising: A) receiving at least two input streams comprising: at least one first input stream onto which first vehicle information related to a first vehicle is published; and at least one second input stream onto which non vehicle-specific information is published; B) applying at least one query to the at least one first input stream and the at least one second input stream; C) assessing, based on B), if a vehicle-related event and/or a fleet-related complex event has occurred; and D) if it is determined in C) that the vehicle-related event and/or the fleet-related complex event has occurred, publishing at least one indication of occurrence of the vehicle-related event and/or the fleet-related complex event on at least one output stream of the CEP engine.

Another embodiment is directed to at least one computer-readable medium encoded with a processor-executable instructions that, when executed by at least one hardware computer processor, implement a complex event processing (CEP) engine that performs a method comprising: A) receiving at least two input streams comprising: at least one first input stream onto which first vehicle information related to a first vehicle is published; and at least one second input stream onto which non vehicle-specific information is published; B) applying at least one query to the at least one first input stream and the at least one second input stream; C) assessing, based on B), if a vehicle-related event and/or a fleet-related complex event has occurred; and D) if it is determined in C) that the vehicle-related event and/or the fleet-related complex event has occurred, publishing at least one indication of occurrence of the vehicle-related event and/or the fleet-related complex event on at least one output stream of the CEP engine.

Another embodiment is directed to a complex event processing (CEP) engine to assess occurrences of complex events, the CEP engine comprising: at least one hardware computer processor; at least one input/output (I/O) interface; and at least one tangible memory to store processor-executable instructions, wherein, upon execution of the processor-executable instructions by the at least one hardware computer processor, the CEP engine: A) receives at least two input streams comprising: at least one first input stream onto which first vehicle information related to a first vehicle is published; and at least one second input stream onto which non vehicle-specific information is published; B) applies at least one query to the at least one first input stream and the at least one second input stream; C) assesses, based on B), if a vehicle-related event and/or a fleet-related complex event has occurred; and D) if it is determined in C) that the vehicle-related event and/or the fleet-related complex event has occurred, publishes at least one indication of occurrence of the vehicle-related event and/or the fleet-related complex event on at least one output stream of the CEP engine.

Another embodiment is directed to a method performed in a system comprising a plurality of complex event processing engines including a first complex event processing engine set at a first tier and a second complex event processing engine set at a second tier, wherein each of the plurality of complex event processing engines executes on at least one hardware computer processor. The method comprises: A) configuring the plurality of complex event processing engines such that each complex event process engine in the second set communicates with only some of the other complex event processing engines in the second set; and B) configuring the plurality of complex event processing engines such that each complex event processing engine in the first set is capable of communicating with each complex event processing engine in the second set.

Another embodiment is directed to at least one computer-readable medium encoded with processor-executable instructions that, when executed by a processor, perform a method of configuring a plurality of complex event processing engines including a first complex event processing engine set at a first tier and a second complex event processing engine set at a second tier, wherein each of the plurality of complex event processing engines executes on at least one hardware computer processor, and wherein the method comprises: A) configuring the plurality of complex event processing engines such that each complex event process engine in the second set communicates with only some of the other complex event processing engines in the second set; and B) configuring the plurality of complex event processing engines such that each complex event processing engine in the first set is capable of communicating with each complex event processing engine in the second set.

Another embodiment is directed to a computer comprising: at least one tangible memory that stores processor-executable instructions for configuring a plurality of complex event processing engines including a first complex event processing engine set at a first tier and a second complex event processing engine set at a second tier, and at least one hardware computer-processor that executes the processor-executable instructions to: A) configure the plurality of complex event processing engines such that each complex event process engine in the second set communicates with only some of the other complex event processing engines in the second set; and B) configure the plurality of complex event processing engines such that each complex event processing engine in the first set is capable of communicating with each complex event processing engine in the second set.

For purposes of the present disclosure, the term "complex event processing (CEP)" refers to a software and/or hardware-implemented technique (e.g., facilitated by a computer system, distributed computer system, computational analysis coded in software, and/or a combination thereof) relating to recognizing one or more events, patterns of events, or the absence of an event or pattern of events, within one or more input streams of information and performing one or more actions and/or computations in response to such recognition, in accordance with specified queries, criteria, algorithms, or logic. CEP generally involves detection of relationships between information contained in input streams (which input streams may include indications of previously recognized events), such as causality, membership, timing, event-driven processes, detection of complex patterns of one or more events, event streams processing, event correlation and abstraction, and/or event hierarchies. CEP may complement and contribute to technologies such as, but not limited to, service oriented architecture (SOA), event driven architecture (EDA), and/or business process management (BPM). The applicants have recognized and appreciated that CEP allows the information contained in the events flowing through all of the layers of a service business, an enterprise information technology infrastructure and/or management operation to be discovered, analyzed, and understood in terms of its impact on management goals and business processes, and acted upon in real time or as a management process.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

DETAILED DESCRIPTION

Figure 1:
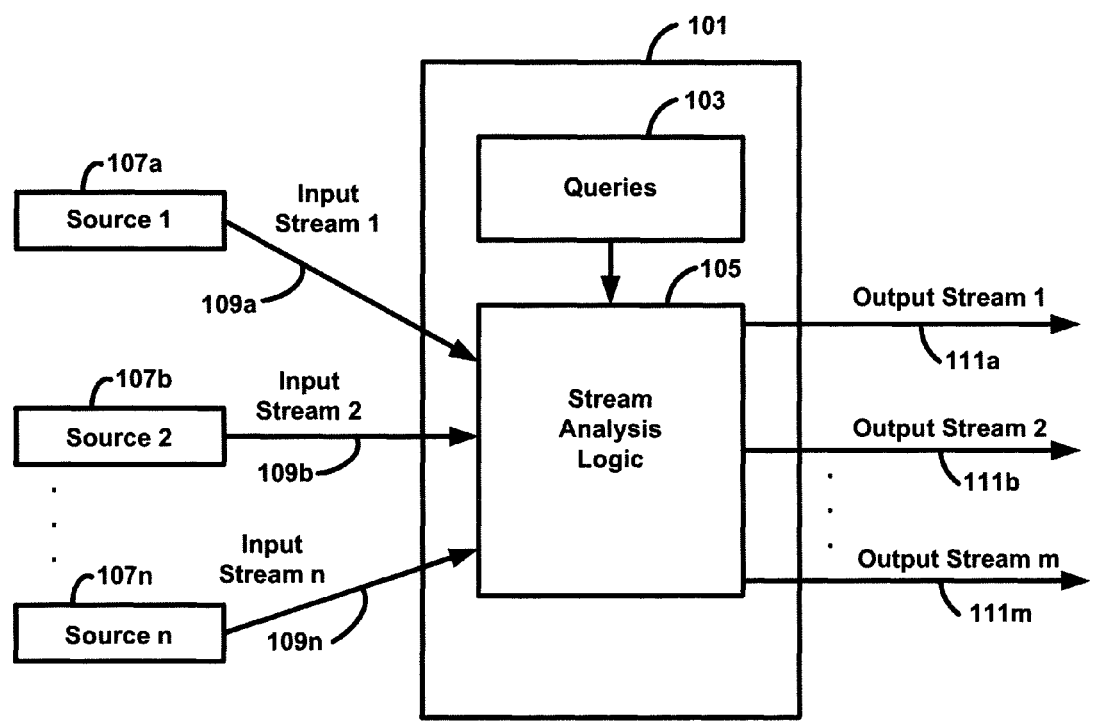
FIG. 1 is a block diagram of a conventional complex event processing engine.

Following below are more detailed descriptions of various concepts related to, and embodiments of, inventive systems, methods and apparatus for complex event processing. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes. Although particular examples are discussed herein relating to field service operations and vehicle fleet management, it should be readily appreciated that the concepts disclosed herein are not limited to these exemplary applications.

A CEP engine may receive data published onto one or more input streams from a plurality of local sensors in the environment of the CEP engine. The inventors have appreciated that, in some situations, it may be desirable for a CEP engine to have access to data streams from non-local sources, as this enables a CEP engine to generate events that are based on information from both local incoming data streams and non-local incoming data streams.

One possible technique for providing one or more incoming data streams from non-local sources to a CEP engine is to directly transmit (e.g., via a wired or wireless communication link) one or more data streams from the non-local source(s) to the CEP engine. For example, it may be desirable to have a CEP engine in one or more offices of a company that is responsible for various field service operations (e.g., a package delivery company), and thus in some manner responsible for vehicle dispatch and/or fleet management. Such a CEP engine at a "central office" or "home office" of the company may receive local input streams (e.g., information about scheduled deliveries, information about which vehicles are out on deliveries, information about which drivers took out which vehicles, and any other locally generated information), as well as information generated from non-local sensors in one or more vehicles.

To provide information from the sensors in the vehicle to the CEP engine, the information collected from the vehicle sensors may be wirelessly transmitted (e.g., via the Internet, via a cellular telephone network, or in any other way) from the vehicle so that it is ultimately received by the CEP engine in the office of the field service company. The CEP engine may process the data streams from these non-local sources to determine if any events have occurred and, if so, wirelessly transmit an indication of the occurrence of any such events to the vehicle so that that the appropriate response may be taken. However, the inventors have recognized a number of drawbacks to this approach.

First, the inventors have appreciated that some events may warrant an essentially immediate response at the source of the information from which the event was detected. Using the technique described above, the response is delayed by the time taken to transmit information that is not local to the CEP engine from the information source to the CEP engine and to transmit an indication of the event from the CEP engine back to the source.

In the example discussed above, an illustrative event that may warrant an immediate response is the vehicle exceeding a certain speed. For example, one sensor in the vehicle may indicate the speed of the vehicle. If the speed of the vehicle reaches or exceeds a certain threshold it may be desired to detect a speeding event and notify the driver of the vehicle that he or she is speeding (e.g., by playing an audio notification in the vehicle, by displaying such a notification on the dashboard, instrument panel, or display screen in the vehicle, or in some other way). It may also be desirable to automatically take some additional action to reduce the driver's speed, such as disabling the throttle or applying the brakes.

Using the technique described above, sensor information from the vehicle may be transmitted to the CEP engine at the company's office, the CEP engine may determine that a speeding event has occurred and may transmit an indication of the occurrence of such an event back to the vehicle. The vehicle may then take the appropriate action in response to occurrence of the event (e.g., notifying the driver, disabling the throttle, applying the brakes, or some other action). However, the time between the actual occurrence of the event and the action taken in response to the event is delayed by the time needed to transmit the sensor information to the CEP engine and receive the indication of the speeding event back from the CEP engine in response.

Additionally, the inventors have recognized that using the technique above may not provide adequate security for information transferred to and from the CEP engine. That is, by transmitting the information from the non-local sources to the CEP engine, the information becomes more susceptible to unwanted interception, particularly if the information is transmitted wirelessly. Moreover, the inventors have recognized that transmitting this information may increase traffic on the channel over which the information is sent, resulting in an increase in network latency. In the example discussed above, the vehicle may transmit all speed information to the CEP engine, even though much of this information does not result in the detection of an event. As a result, this information may clog the channel over which it is being transmitted even though most of it is not relevant to any event.

I. CEP Network Architectures

In view of the foregoing, the inventors have developed various CEP architectures that, in some embodiments, may enable a given CEP engine to receive information from non-local sources, in many instances without the drawbacks discussed above.

A. Multiple Communicatively Coupled CEP Engines

Figure 2:
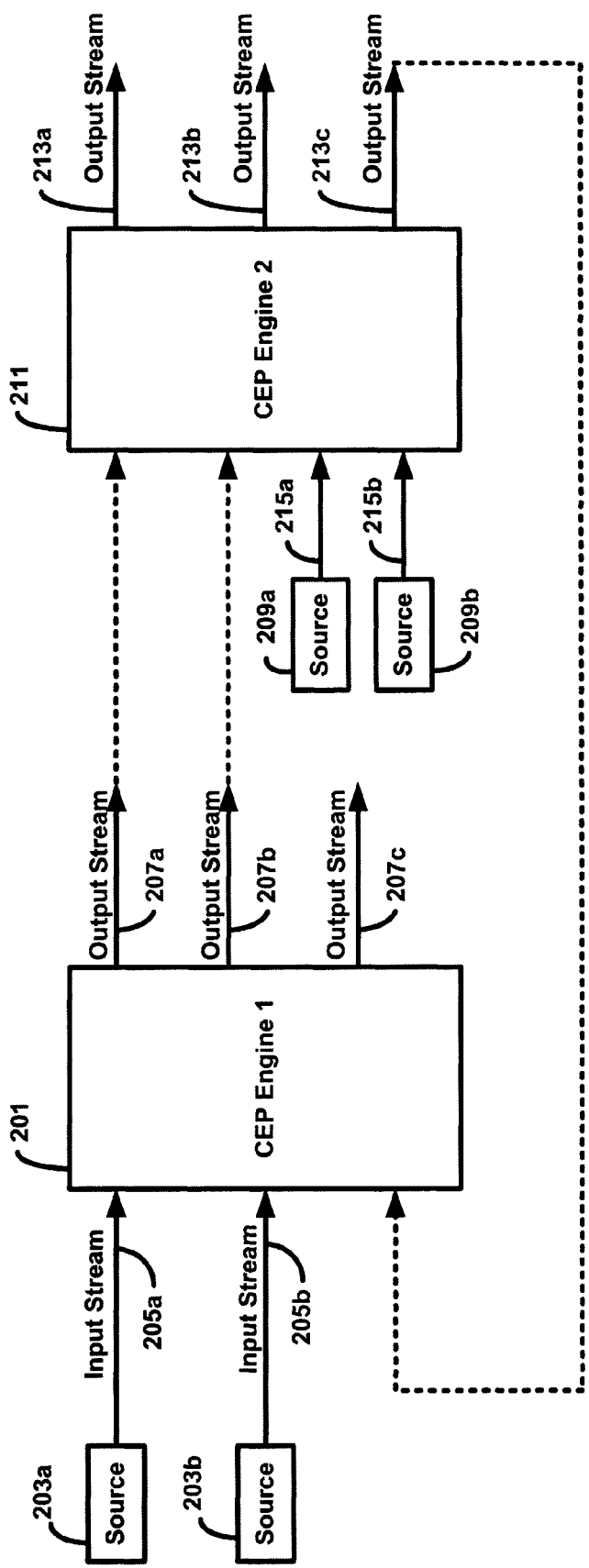
FIG. 2 is a block diagram of a complex event processing architecture including multiple CEP engines, in accordance with some embodiments of the invention.

FIG. 2 shows an example of a CEP architecture including multiple communicatively coupled CEP engines, according to some embodiments of the present invention. In the example of FIG. 2, a first CEP engine 201 receives one or more input streams 205a and 205b from one or more sources 203a and 203b respectively, and publishes data onto one or more output streams 207a, 207b, and 207c. For simplicity, in the example of FIG. 2, sources 203a and 203b provide input streams directly to CEP engine 201, and sources 209a and 209b provide input streams directly to CEP engine 211. However, it should be appreciated that raw data from an input source (e.g., a sensor) may be reformatted into a format suitable for processing as an input stream by the event processing logic of a CEP engine. That is, for example, a software component of the CEP engine 201 or some other intermediary component may receive the raw data from an input source, reformat it, and provide it to event processing logic of the CEP engine (e.g., publish the raw data and/or information relating to same to one or more input streams), as discussed further below.

In one aspect of the embodiment shown in FIG. 2, each output stream 207 may correspond to a particular type of event. Thus, for example, an indication of the occurrence of an event of type A may be output via output stream 207a, an indication of the occurrence of an event of type B may be output via output stream 207b, and an indication of the occurrence of an event of type C may be output via output stream 207c. Some events detected by CEP engine 201 may be simple events that trigger an immediate local response, some may be informational events that do not trigger any response but rather are temporarily stored locally (and, in some cases, subsequently transmitted to another CEP engine, as discussed further below) and some may be complex events that are detected from a particular pattern of other events indicated in one or more input streams over a period of time and may trigger a local response, may be temporarily stored, and/or may be subsequently transmitted to another CEP engine.

In the embodiment of FIG. 2, one or more of the output streams from the first CEP engine 201 may be transmitted to a second CEP engine 211, such that these output streams are treated as input streams by the second CEP engine 211. More specifically, second CEP engine 211 may receive data via one or more input streams 215a and 215b provided from one or more local sources 209a and 209b, respectively, and may also receive, via one or more input streams, one or more events published onto one or more output streams generated by the first CEP engine 201. In the example of FIG. 2, output streams 207a and 207b provided by the first CEP engine 201 may be applied as input streams to the second CEP engine 211. In some embodiments, in addition to serving as input streams to the second CEP engine 211, one or more of the events published onto output streams 207a and 207b may be stored in the first CEP engine locally and/or may trigger a local response in the environment of the first CEP engine.

Providing one or more output streams of the first CEP engine 201 to the second CEP engine 211 enables the second CEP engine 211 to detect events based on a combination of information from non-local sources (including the one or more output steams of the first CEP engine) and information from local sources. Second CEP engine 211 may in turn publish data to one or more output streams 213a, 213b, and 213c, each of which may correspond to an event or multiple events.

In some embodiments, one or more of the output streams from the second CEP engine 211 may be provided as input streams to the first CEP engine 201. For example, as shown in FIG. 2, output stream 213c is provided from the second CEP engine 211 as an input stream to the first CEP engine 201. In one significant aspect, the illustrative architecture shown in FIG. 2 enables the first CEP engine 201 to detect events based on information from information sources that are not local to it and similarly enables the second CEP engine 211 to detect events from sources that are not local to it.

For example, the first CEP engine 201 may be a CEP engine that is in a fleet vehicle (e.g., delivery truck) and sources 203a and 203b may be sensors in the vehicle that provide information about aspects of the vehicle to CEP engine 201 via input stream 205a (e.g., source 203a may be am Electronic Control Unit (ECU) of the vehicle that provides information about various components of the vehicle, including the speed of the vehicle as measured by the vehicle's speedometer). The second CEP engine 211 may be a CEP engine at an office of the company overseeing the fleet of vehicles, and/or a CEP engine executing on a mobile computing device carried by a field supervisor or dispatcher. CEP engine 201 may be configured such that if the speed of the vehicle (as indicated in input stream 205a) exceeds 75 miles per hour, a speeding event is generated and an indication of the occurrence of this event is published onto output stream 207a. Additionally, upon detection of the speeding event, the indication of the event may be provided to an onboard system of the vehicle, triggering it to notify the driver of the speeding event (e.g., by playing an audio indication, displaying a visual indication, or in some other way) or take some action to decrease the speed of the vehicle (e.g., temporarily disabling the throttle or applying the brakes). In addition, the indication of the speeding event published onto the output stream 207a may be applied as an input to CEP engine 211.

Furthering the example of multiple CEP engines in a vehicle-related context, in one embodiment relating to fleet management CEP engine 211 may be configured to monitor all or some subset of the drivers of the respective vehicles in the fleet. Thus, for example, source 209a may be a computer system that logs when a driver takes out a particular vehicle and when the driver returns that vehicle. Each time a vehicle is taken out or returned, an indication of which vehicle is being taken out or returned and which driver is taking or returning the vehicle may be provided to CEP engine 211 via input stream 215a. CEP engine 211 may additionally be configured to, upon receipt of a speeding event generated by CEP engine 201 on output stream 207a, determine which driver is driving the vehicle using the information received via input stream 215a, and generate an event (e.g., via output stream 213a) indicating that that particular driver is speeding. In addition, CEP engine 211 may store the occurrence of this event so that, for example, the number of speeding events for that particular driver may be tracked. CEP engine 211 may be configured to detect an event if the number of speeding events for a given vehicle driver over a certain period of time exceeds a certain threshold. The occurrence of such an event may trigger an action such as, for example, sending an e-mail to the driver's supervisor notifying him or her of the speeding events.

In the foregoing example, when a speeding event occurs, the event may trigger a response in the vehicle (e.g., the audio playback or visual display of a warning and/or an action to automatically reduce the speed of the vehicle) irrespective of sending an indication of the event to another (e.g., external) CEP engine and sending sensor data (e.g., speedometer data from the vehicle) to another CEP engine. This reduces the time from when the event actually occurs to when the response triggered by the event happens. In addition, the actual speedometer data from the sensor in the vehicle need not be transmitted to an external CEP engine. Rather, only the indication of a speeding event is transmitted from CEP engine 201 to CEP engine 211. This reduces the amount of information that is transmitted to another CEP engine which exposes less information to the risk of being intercepted and uses less bandwidth of the channel over which the information is transmitted. Notwithstanding the foregoing, it should be appreciated that CEP engine 211 in some cases may receive information from non-local sensors (e.g., the speedometer in the vehicle), via the first CEP engine 201, and may combine this information with information from local sources (e.g., sources 209a and 209b) to detect events.

In this example, the speeding event that is output by CEP engine 201 via stream 207a to CEP engine 211 is a simple event, in that data from a sensor is used by CEP engine 201 to detect the occurrence of the event independent of the occurrence or non-occurrence of any other events. However, in the example of FIG. 2, CEP engine 201 may also output indications of the occurrence of complex events to CEP engine 211. For example, in some embodiments, when CEP engine 201 detects the occurrence of a complex event, an indication of the complex event may be sent to CEP engine 211 and/or the occurrence of the complex event may trigger some local action. As noted above, a complex event is an event based on some pattern of, or relationship between, other events. For example, CEP engine 201 may detect a complex event if the vehicle's speed exceeds 75 miles per hour and the driver's seat belt is not fastened. Similarly, CEP engine 211 may provide indications of simple and/or complex events that it detects to CEP engine 201.

It should be appreciated that the example above in which CEP engine 201 is in a vehicle of a fleet and CEP engine 211 is in an office of the company overseeing the fleet or on a mobile computing device of a supervisor/dispatcher is merely one example of an environment in which the CEP architecture involving multiple CEP engines as shown in FIG. 2 may be used. In general, the architecture shown in FIG. 2 is applicable to many different environments, and the invention is not limited to use in a vehicle fleet environment or any other particular environment.

For example, in some embodiments, CEP engine 211 may be a CEP engine executing on a computer in the vehicle of a field-service technician and CEP engine 201 may be a CEP engine executing in a handheld device (e.g., a tablet PC, mobile phone, or other handheld computing device) that the field-service technician carries at a work site. Because CEP engine 201 is embedded in a mobile device (that may have less processing power than the computer on which CEP engine 211 executes), CEP engine 201 may publish data on output streams to CEP engine 211 to handle processing that is better suited for a computer with greater processing resources, and may receive feedback indicative of the results of this processing via one or more output streams of CEP engine 211.

Moreover, in the example of FIG. 2, CEP engine 201 is depicted as receiving two input streams from two local sources and one input stream that is an output stream of CEP engine 211. It should be appreciated, however, that the number of input streams received by CEP engine 201 and CEP engine 211 are merely illustrative, as each of these engines may receive any number of input streams. In addition, any number of these streams may be generated from local sources and any number may be input streams generated from output streams of another CEP engine. Similarly, although in the example of FIG. 2 CEP engine 201 and CEP engine 211 are depicted as each generating three output streams, the invention is not limited in this respect, as each of these engines may generate any number of output streams. In this respect, it should be appreciated that the number and type of input streams that a given CEP engine receives, the number and type of output streams that a given CEP engine generates, and the queries that it applies to data received via input streams to detect the occurrence of events, may be configured by a user, developer, or administrator of the CEP engine itself and/or another system in any of a variety of manners.

Though not depicted in FIG. 2, in some embodiments the output stream of a CEP engine may be fed back as an input stream to the same CEP engine. In this manner, events detected by a given CEP engine may be used by the same CEP engine to subsequently detect other events predicated upon previous events, in some cases together with other information provided on other input stream. In one exemplary implementation, a CEP engine may feedback to itself as an input stream one of its own output streams to facilitate diagnosis of its own "operating health" and detect events based on this self-diagnosis (e.g., indicate events based at least in part on memory usage, processing rate, etc.). The foregoing concept of CEP engine "self-feedback" may be employed in any of the exemplary embodiments discussed herein.

In addition, a CEP engine may access or obtain information on an input stream in any suitable way, as the invention is not limited in this respect. For example, for some input streams, the source of the stream may "push" information to the CEP engine, such that the CEP engine receives information sent to it or broadcasted by the information source. For other input streams, the CEP engine may "pull" information from the source, such that the CEP engine requests information from the source (e.g., "polls" the source) and receives the information in response to a request.

CEP engines 201 and 211 may communicate with each other in a variety of manners over a variety of communication media (e.g., via one or more wired or wireless communication interfaces). In embodiments in which one or both CEP engines operate in a mobile environment (e.g., in a vehicle, in a mobile device, or in any other mobile environment), the CEP engines may communicate using one or more wireless connections (e.g., cellular connections, WiFi connections, etc.). However, the invention is not limited in this respect as, in some embodiments (e.g., embodiments in which both CEP engines are stationary), the CEP engines may communicate without using any wireless connections.

As discussed above in the example of FIG. 2, in some exemplary implementations data published onto one or more input streams received by a given CEP engine may come from either a local source or another non-local CEP engine. However, the invention is not limited in this respect as, in some embodiments, a CEP engine may receive data on one or more input streams from a non-local source other than another CEP engine. Any suitable non-local source may provide data on an input stream. For example, in some embodiments, an external database that is accessible via the Internet (or in some other way) may serve as a non-local information source. Examples of such non-local sources include, but are not limited to, a non-local database that provides map information (e.g., street information), a non-local database that provides traffic information, a non-local database that provides weather information, a non-local database that stores publicly available financial information about companies (e.g., the SEC EDGAR database), a non-local database that provides credit card or fuel card transaction information, an RSS feed, and/or any of a variety of sources of data on the Internet.

In the example of FIG. 2, CEP engines 201 and 211 may be implemented in any suitable way, as the invention is not limited in this respect. In some embodiments, a commercially available software CEP engine, such as any of the commercially available engines discussed above, may be used alone or in connection with other components.

In embodiments in which one or both of CEP engines 201 and 211 are implemented in software, a software CEP engine may execute on any suitable hardware system. For example, in some embodiments, the CEP engine may be executed by one or more hardware processors of a general purpose computer that includes at least one physical storage device (e.g., a non-volatile memory device and/or a volatile memory device) for storing processor-executable instructions representing the CEP engine software and at least one input/output (I/O) interface for receiving data published on input streams from input sources or devices and for sending data published on output streams to output recipients or devices. In some embodiments, the hardware processor(s) on which a software CEP engine executes may be in a mobile or portable device, such as a mobile telephone, personal digital assistant, portable laptop computer, or any other type of mobile or portable device.

Figure 3:
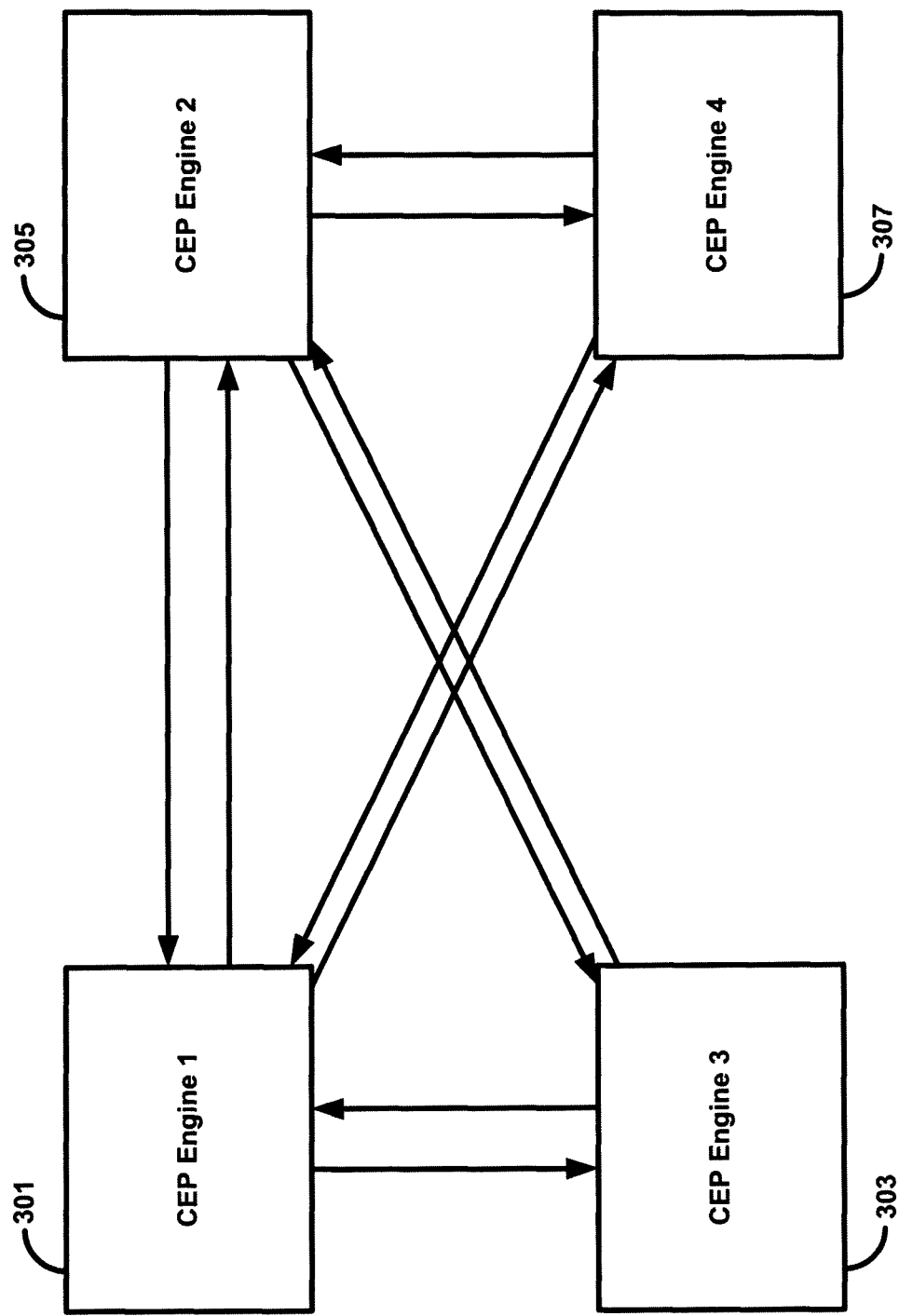
FIG. 3 is a block diagram of a complex event processing architecture having four peer complex event processing engines, in accordance with some embodiments of the invention.

In the illustrative architecture of FIG. 2, there are two CEP engines which communicate with each other and which are capable of sending indications of simple and complex events to each other. However, the architecture shown in FIG. 2 is not limited to use with two CEP engines, as any number of CEP engines may communicate with each other. For example, FIG. 3 shows an embodiment having four peer CEP engines 301, 303, 305, and 307. For the sake of clarity, all of the input streams and output streams of each CEP engine are not depicted. Rather, arrows are used to indicate that each CEP engine may send indications of the occurrence events (e.g., simple event, complex events, or other types of events) and/or other information on which to perform one or more queries to each of the other peer CEP engines and may receive, from each of the other CEP engines, indications of the occurrence events detected by those CEP engines and/or other information.

In the example of FIG. 3, each CEP engine may be a "peer" with every other CEP engine in the system (i.e., can send information, such as indications of events or pass on data from input streams, to and receive information from these engines). However, the invention is not limited in this respect, as in some embodiments, certain CEP engines may be a peer to some of the CEP engines in the system, but not to others. For example, in one embodiment as discussed in further detail below, CEP engine 301 may send information (e.g., indications of events) to and receive information from CEP engines 303 and 305, but may not communicate with CEP engine 307.

B. Reconfigurable Hierarchical CEP System Architectures

Figure 4A:
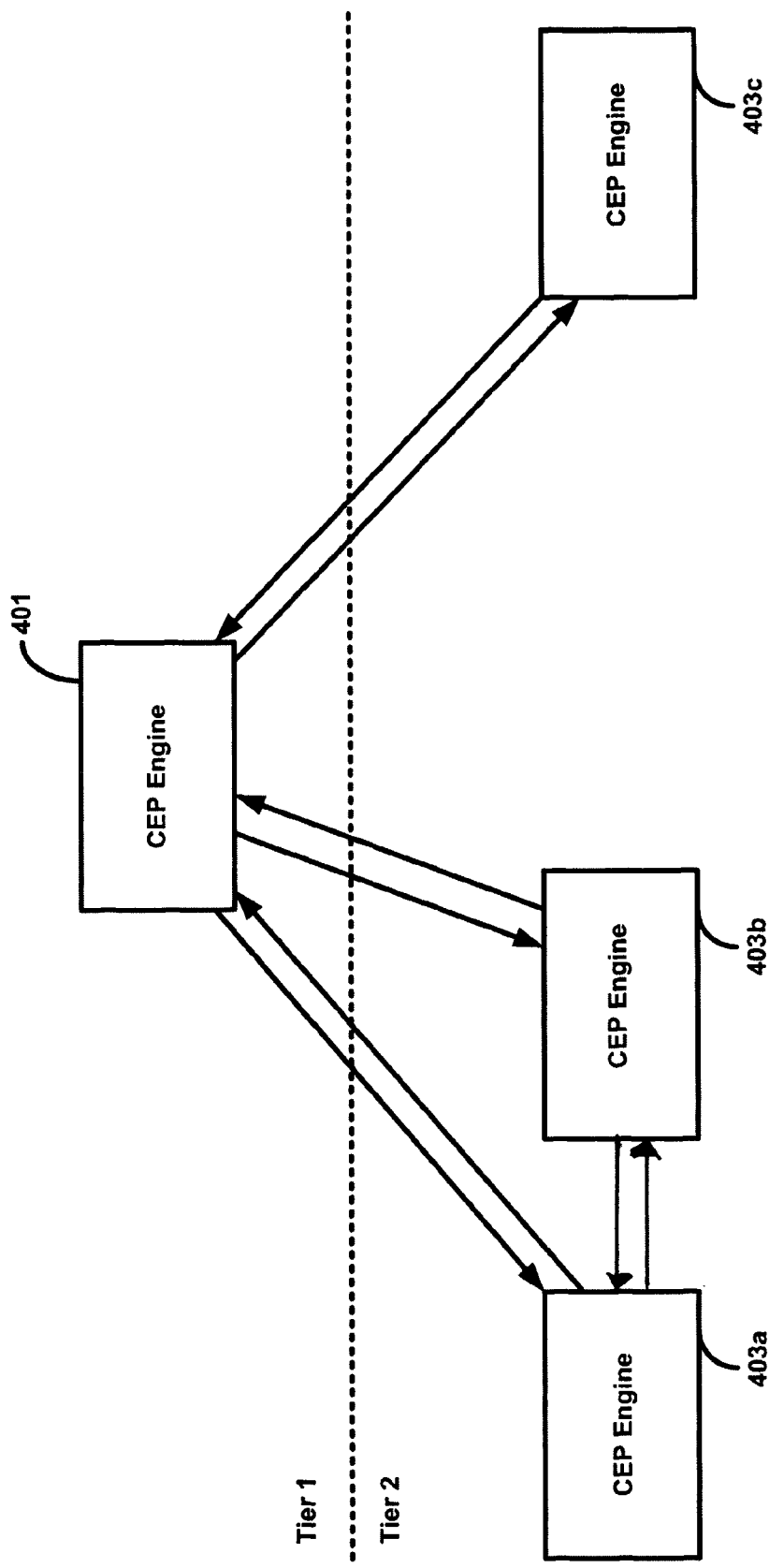
FIG. 4A is a block diagram of a first exemplary configuration of a reconfigurable hierarchical complex event processing architecture, in accordance with some embodiments of the invention.

FIG. 4A depicts another CEP architecture according to one embodiment of the present invention in which there is a network of CEP engines arranged in a hierarchy. In the example of FIG. 4A, CEP engine 401 is in tier 1 of the hierarchy and each of CEP engines 403a, 403b, and 403c is in tier 2 of the hierarchy. In the hierarchical architecture of FIG. 4A, each CEP engine 403a in tier 2 of the hierarchy communicates with CEP engine 401. In addition, CEP engine 403a communicates directly with CEP engine 403b (i.e., without needing to traverse CEP engine 401 as a "relay"), but not CEP engine 403c, and CEP engine 403b communicates directly with CEP engine 403a, but not CEP engine 403c. Thus, in the example of FIG. 4A, a CEP engine in a higher tier (e.g., tier 1) can communicate with all of the CEP engines in the network of CEP engines that are in the tier below it. Additionally, while all of the CEP engines in the lower tier (e.g., tier 2) can communicate with all of the CEP engines in the tier above them, a given CEP engine in the lower tier cannot necessarily communicate with all of the other CEP engines in its same tier.

In some embodiments relating to hierarchical CEP system architectures, the ability or inability of one CEP engine in the network to communicate with another CEP engine may not be based on any physical communication capabilities or limitations of the CEP engine, but rather may be based on a purposeful/specific configuration of the CEP engine. Thus, for example, in the architecture of FIG. 4A, CEP engine 403b may be physically capable of communicating with CEP engine 403c, but does not communicate with CEP engine 403c because it is not configured (e.g., by a network administrator or programmer/developer) to communicate with this CEP engine. That is, for example, the query set that is applied by CEP engine 403b may configure the CEP engine such that it communicates with CEP engine 401 and 403a, but not CEP engine 403c. Thus, in some embodiments, the hierarchical architecture of CEP engines depicted in FIG. 4A may be imposed as a result of the configuration of (e.g., the query set applied by) each CEP engine, rather than the physical ability of CEP engines to communicate with certain other CEP engines in the network.

In this respect, the CEP engines in a hierarchical network according to some embodiments of the present invention may be viewed as a reconfigurable web of CEP engines that may be configured into any of a number of different architectures (e.g., including any number of tiers and any number of peers in a given tier) virtually at any time, in response to any of a variety of circumstances or conditions. For example, if the computer executing CEP engine 401 experiences a hardware failure rendering CEP engine 401 inoperable, it may be desirable to move one of the CEP engines 403a, 403b or 403c from tier 2 to tier 1. This may be accomplished by reconfiguring which CEP engine(s) in the network communicate with each other. For example, as shown in FIG. 4B, CEP Engine 403b may be moved from tier 2 to tier 1 to replace inoperable CEP engine 401 by configuring CEP engines 403b and 403c to communicate with each other, and by configuring CEP engines 403a and 403c to no longer communicate with CEP engine 401, but to treat CEP engine 403b as the tier 1 replacement for CEP engine 401.

Figure 4B:
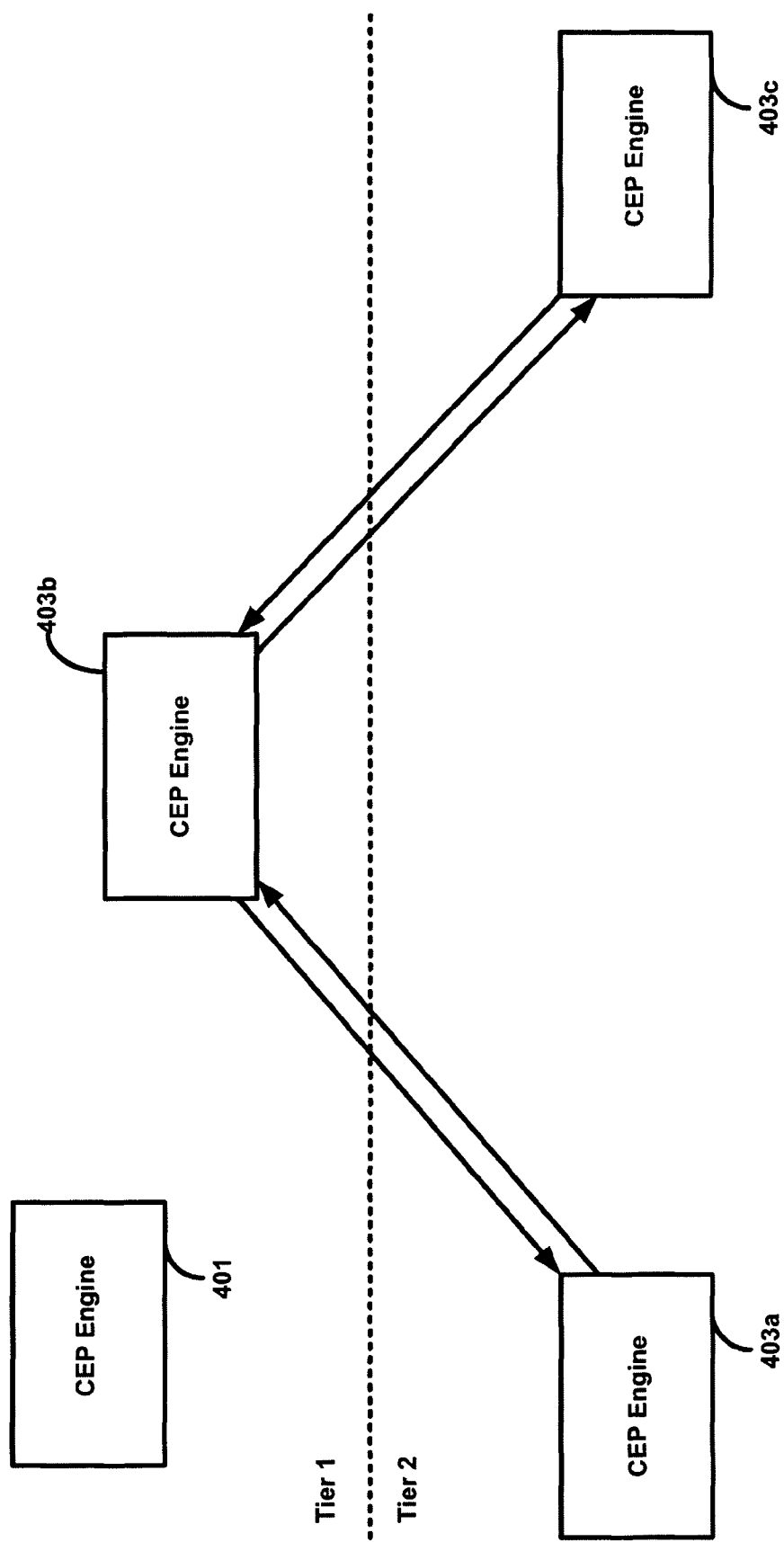
FIG. 4B is a block diagram of a second exemplary configuration of the reconfigurable hierarchical complex event processing architecture shown in FIG. 4A, in accordance with some embodiments of the invention.

In various embodiments according to the present invention, the architecture of FIGS. 4A and 4B may be useful in situations in which each CEP engine at tier 2 in the hierarchy receives input from a different set of sensors, and a CEP engine at tier 1 performs event processing based on input streams for one or more of the CEP engines in tier 2 of the hierarchy. For example, in one implementation based on the architecture of FIG. 4A, each CEP engine 403a, 403b, and 403c may be either a vehicle-based CEP engine in a vehicle of a fleet or a CEP engine in the handheld computing device (e.g., table PC, mobile phone, or other handheld computing device) used by the vehicle driver, while CEP engine 401 may be a CEP engine, at an office overseeing fleet management operations, that is capable of receiving indications of the occurrences of events from each CEP engine 403a, 403b, and 403c and is in turn capable of sending information (e.g., event information) to each of the tier 2 CEP engines. In some embodiments, CEP engine 401 may use event information received from one or more of the tier 2 CEP engines to detect complex events that are based on information from multiple different tier 2 CEP engines.

More specifically, in the foregoing example, each CEP engine 403a, 403b, and 403c may provide an output stream that outputs an event indicating the current location of the vehicle or the driver in which the CEP engine is situated and the vehicle's current state of motion (e.g., moving, speeding, idling). CEP engine 401 may receive this output stream from each CEP engine 403a, 403b, and 403c and use this information to detect a traffic jam complex event. For example, if there are a certain number of vehicles on the same road at the same time that are idling, CEP engine 401 may detect a traffic jam event that indicates that there is a traffic jam on that road. That is, because CEP engine 401 receives a stream from each vehicle or driver (i.e., generated by the CEP engine in the vehicle) indicating the location of the vehicle and the vehicle's current state of motion (or the location of the driver), CEP engine 401 can determine whether there are multiple vehicles on the same road at the same time that are idling (or that the drivers of these vehicles are respectively hanging out at a coffee shop on the same congested road rather than performing their respective tasks).

In the foregoing example, if the number of vehicles on the same road that are idling (or the number of drivers hanging out at a coffee shop on this road) exceeds a threshold, a traffic jam event may be detected. CEP engine 401 may send an indication of the occurrence of this event to the CEP engine of one or more vehicles of the fleet that are not on that road (e.g. one or more other CEP engines in tier 2 that are not stuck in traffic) to apprise the drivers of these vehicles that there is a traffic jam on the noted road so that they may take an alternate route to avoid the traffic jam if necessary. If CEP engine 401 subsequently determines that the vehicles on the noted congested road are again moving, it may detect another event that indicates that the traffic jam on that road has cleared and may send an indication of the occurrence of this event to some or all of tier 2 CEP engines.

As with the examples discussed above, it should be appreciated that the hierarchical architectures shown in FIGS. 4A and 4B are not limited to use with vehicles or the operators of these vehicles, as the architecture shown in FIGS. 4A and 4B may be used in a variety of different applications and environments. In addition, the CEP engines shown in FIGS. 4A and 4B may be implemented in any suitable way, including any of the ways discussed above in connection with the CEP engines 201 and 211 shown in FIG. 2. The inventors have appreciated that when a first CEP engine is resident and operates in a mobile environment (e.g., in a vehicle, a mobile device, or another type of mobile environment), any other CEP engine with which the first CEP engine communicates may depend on the proximity of the other CEP engine(s) to the first CEP engine. Thus, in some embodiments, a CEP engine may operate in an "ad-hoc mode," in which it can first discover and then communicate with one or more other CEP engines in close proximity to it. In this way, CEP engines may dynamically interconnect with one another and communicate directly with each other without requiring the use of a central access point or additional network infrastructure.

II. Complex Event Processing for Fleet Management

While some illustrative examples have been provided above of systems of multiple communicatively coupled CEP engines operating in a vehicle-related environment, additional details of complex event processing systems and methods according to the present invention more specifically directed to facilitating fleet management operations are provided below. As noted above, for purposes of the present disclosure, "fleet management operations" refers to any activity relating to the maintenance, dispatch (e.g., scheduling), operation, monitoring (e.g., tracking) and oversight of multiple vehicles and/or vehicle operators employed to conduct business.

Many different types of businesses use vehicle fleets to carry out their business. For example, package delivery companies use fleets of delivery vehicles or vans to deliver packages to their destinations. Utility companies (e.g., telephone companies, electric companies, cable television companies) rely on fleets of vehicles that are used by technicians to travel to job sites and/or customers' homes or places of business. Some companies provide a locating and marking service to mark the ground, pavement, or other surface to indicate the location of underground facilities (e.g., electric utility lines, gas, water or sewer pipes, cable or fiber optic lines, etc.) at or near work sites at which an excavation is planned. These companies often rely on a fleet of vehicles that their technicians use to travel to and from job sites. Rental car companies often operate a large fleet of vehicles that they rent out to customers.

The inventors have recognized that operating a large fleet of vehicles presents a number of challenges. One challenge is assuring that the drivers of the vehicles in the fleet are operating the vehicles in a safe manner. The costs of maintaining and insuring the vehicles in a fleet can be burdensome. When drivers operate vehicles in a safe and appropriate manner, they are less likely to be involved in accidents that necessitate repair to the vehicle, payment of fine for traffic violations, and/or payment of insurance deductibles. Moreover, lowering the accident rate for a fleet of vehicles may lower the insurance premiums for the fleet and the cost of operating and maintaining the fleet.

The inventors have further appreciated that another challenge of operating a large fleet of vehicles relates to driver inefficiency. Inefficiencies may arise when drivers of vehicles use the vehicles for personal reasons when the business expects the driver to be using the vehicle for business purposes. For example, if a technician for a telephone company uses his or her vehicle to run personal errands in between visits to job sites, the technician may not visit as many job sites as otherwise possible in a given time frame, resulting in reduced efficiency.

The inventors have recognized that yet another challenge that frequently arises when operating a fleet of vehicles is scheduling drivers to particular job sites. That is, it is generally desirable to assign drivers to job sites in an efficient manner, taking into account travel time between jobs, traffic conditions, and other factors.

In addition, the inventors have appreciated that in a large fleet of vehicles, determining which vehicles warrant maintenance, and at what time, may present challenges. Often, vehicles in a fleet are periodically inspected manually to determine whether any maintenance is warranted. This can be a time consuming and costly endeavor.

Figure 5:
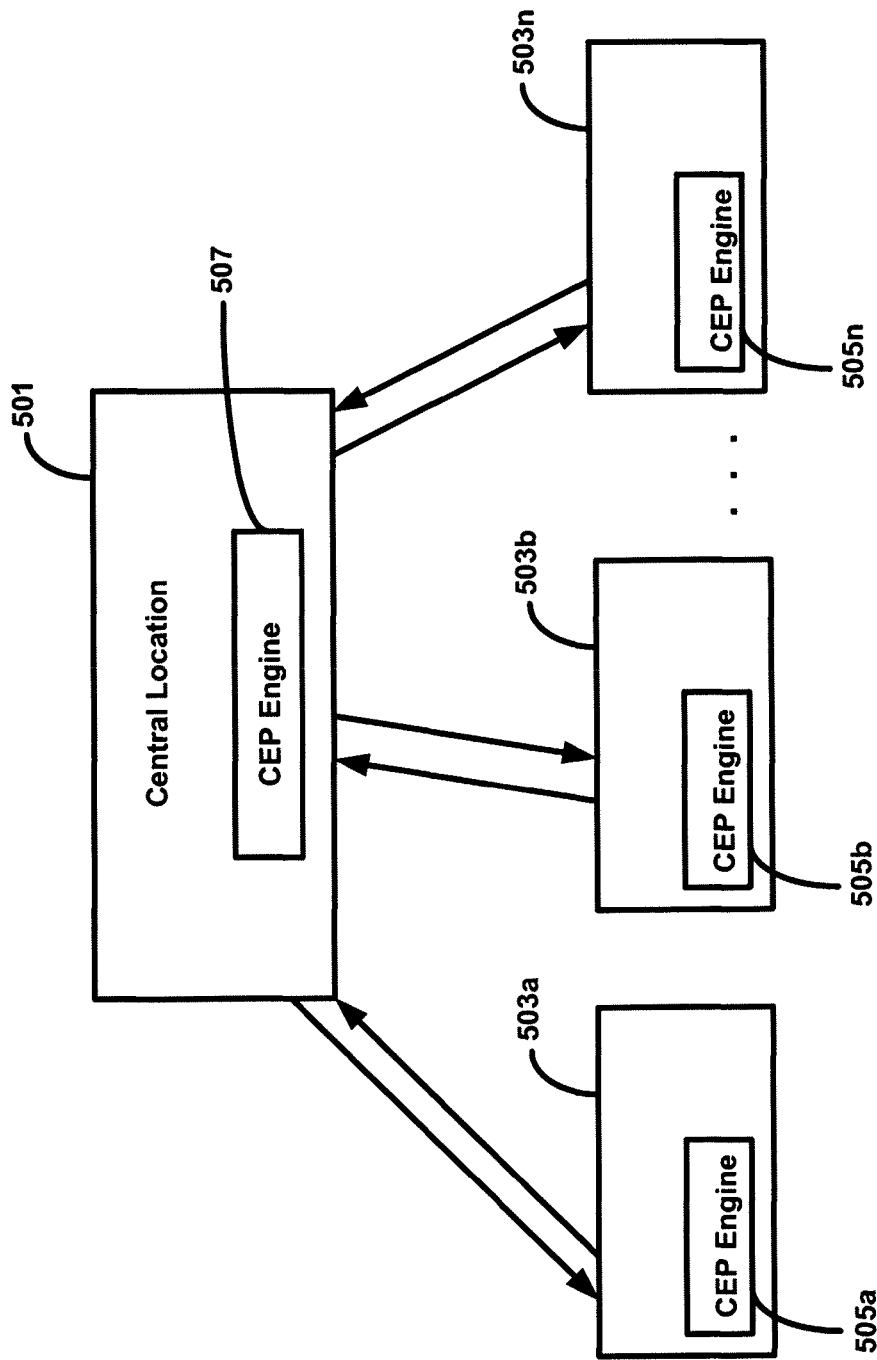
FIG. 5 is a block diagram of a complex event processing system comprising a plurality of complex event processing engines in vehicles and a complex event processing engine at a central location, in accordance with some embodiments of the invention.

In view of the foregoing, the inventors have appreciated that, when used in the context of a large fleet of vehicles, various concepts discussed above in connection with FIGS. 2-4 relating to complex event processing may address some of these challenges. To this end, FIG. 5 is a block diagram of a system in which various complex event processing techniques discussed above may be used more specifically in the context of a vehicle fleet environment to facilitate fleet management operations. It should be appreciated however that these CEP techniques and additional CEP techniques discussed below are not limited to use in the field of vehicle fleet operation and management, as these techniques have wide and general applicability to numerous other fields.

A. Exemplary System Architecture and Processes

In FIG. 5, a CEP engine 507 may execute in a central location 501 (e.g., a main office of the company overseeing fleet management operations), and/or in a mobile computing device of a supervisor or dispatcher, for example. In addition, multiple vehicle-based CEP engines (i.e., CEP engines 505a, 505b, . . . , 505n) respectively execute in each of a plurality of vehicles 503a, 503b, . . . , 503n. One or more vehicle-based CEP engines 505a, b, . . . n may send information to and receive information from CEP engine 507 (e.g., in a manner similar to that described above in connection with FIG. 4A).

Figure 6:
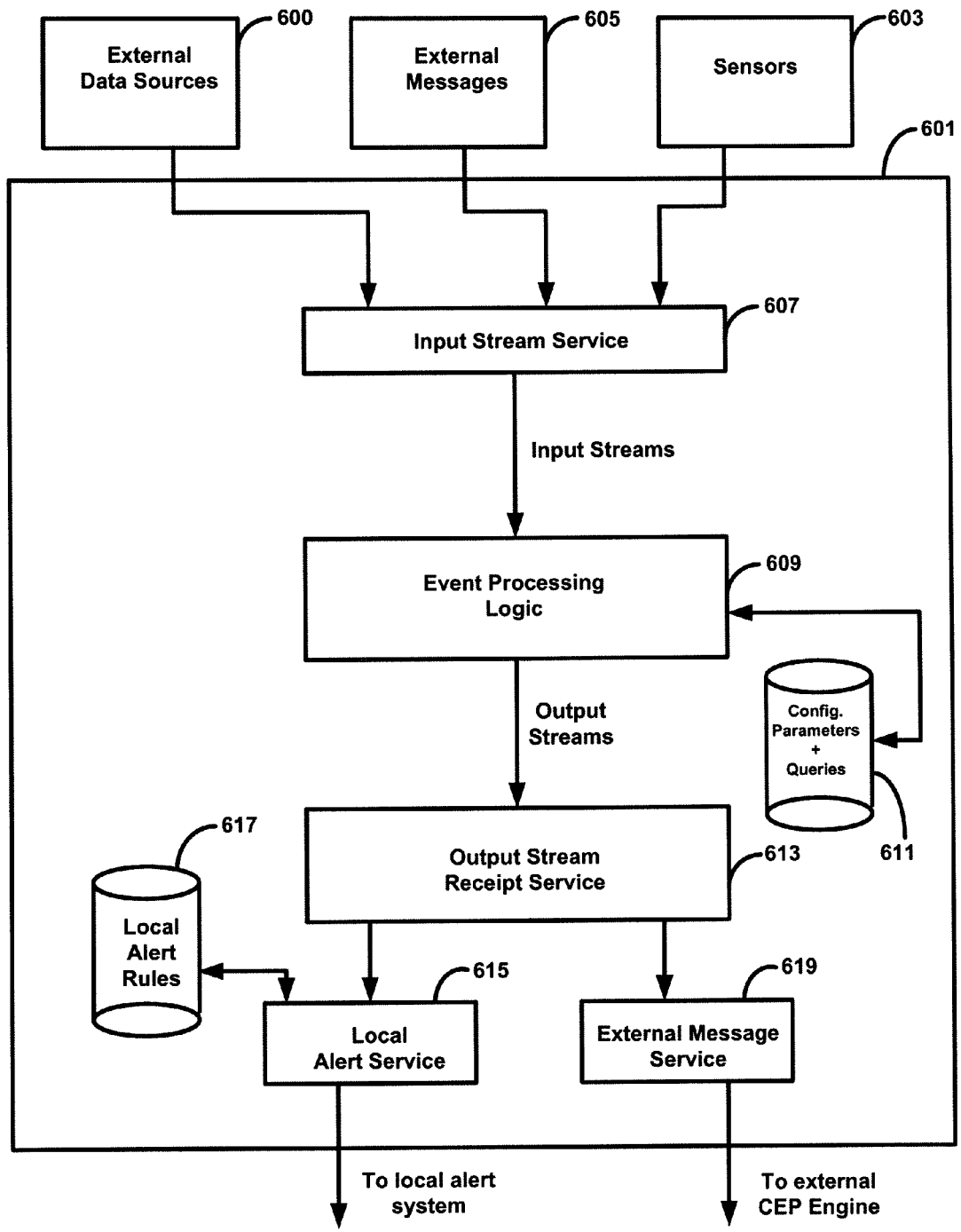
FIG. 6 is a block diagram of an illustrative architecture for a complex event processing engine that may be employed in some embodiments of the invention.

FIG. 6 is a block diagram of an illustrative internal architecture for a CEP engine that may be used in the system shown in FIG. 5 (i.e., CEP engine 507 and each of CEP engines 505 may be implemented in the manner shown in FIG. 6). However, the CEP engines shown in FIG. 5 are not required to be implemented in this way, as many other implementations are possible according to different embodiments of the present invention.

As shown in FIG. 6, CEP engine 601 comprises an input stream service 607, event processing logic 609, data store 611 that stores configuration parameters and event detection queries, output stream receipt service 613, local alert service 615, local alert queries 617, and external message service 619. Generally, the input stream service 607 may be considered an input interface for the CEP engine, and the local alert service 615 and the external message service 619 may be considered output interfaces for the CEP engine. Similarly, in exemplary implementations the event processing logic 609 constitutes a hardware processor on which executable instructions (e.g., the configuration parameters and event detection queries stored in data store 611) execute to implement the CEP engine. Although the input stream service 607, the local alert service 615 and the external message service 619 respectively are shown as internal components of the CEP engine 601, it should be appreciated that one or more of these components, generally serving as an input/output (I/O) interface, may be implemented externally and communicatively coupled to the CEP engine in alternative implementations.

Input stream service 607 may receive input data from any of a variety of information sources, such as one or more sensors 603, one or more external messages 605, and/or one or more external data sources 600. Input stream service 607 formats the input data as one or more input streams suitable for processing by event processing logic 609 and provides the input streams to event processing logic 609. In embodiments in which CEP engine 601 is in a vehicle, sensors 603 may include sensors local to the vehicle, which may detect various parameters related to the vehicle (as discussed in greater detail below).

In some embodiments, a given CEP engine in a network implementation according to the present invention may not receive any input data from sensors (e.g., if there are no sensors local to the CEP engine). For example, in FIG. 5, in some implementations CEP engine 507 located in central location 501 may not receive any sensor inputs. In such embodiments, the input stream service 607 of the CEP engine may not receive any input data from sensors.

External messages 605 include messages from other CEP engines that may, for example, indicate the occurrence of an event (e.g., a simple event or a complex event). External data sources 600 include, for example, external databases from which CEP engine 601 may retrieve data, as well as Internet information sources to which web service calls can be made to retrieve information. Examples of external data sources include, but are not limited to, databases that store and/or website that provide street map information, traffic information, weather information or credit/fuel card transaction information, as well as resource and scheduling information (e.g., relating to vehicle driver shifts and schedules, vehicle use schedules, vehicle maintenance schedules or maintenance history, etc.). In some embodiments, a CEP engine may not obtain data from any external data sources and, in such embodiments, input stream service 607 need not interface with or obtain data from such external data sources. In yet other instances, the lack of available information from one or more particular external data sources may itself constitute one or more events.

Event processing logic 609 may receive one or more input streams from input stream service 607 and determine from the data in the one or more input streams if an event has occurred. The queries that event processing logic 609 applies to determine if an event has occurred may be user-specified and may be stored, along with other configuration parameters for event processing logic 609, in data store 611, and/or the queries may be stored as a compiled program or script used by event processing logic 609. Event processing logic may publish indications of detected events on one or more output streams to output stream receipt service 613. Event processing logic 609 may be implemented in any suitable way, including using a commercially available event processing server (some examples of which were discussed above).

Output stream receipt service 613 may receive output streams from event processing logic 609 and perform any formatting of the event indications in the output streams that is warranted, and may provide the event indications in the output streams to local alert service 615 and/or external message service 619.

Local alert service 615 receives event indications from output stream receipt service 613, applies the local alert queries stored in data store 617 to these event indications to determine whether these events trigger any local actions and, if it is determined that an event triggers a local action, sends a message to the system responsible for taking that action. For example, a speeding event may trigger a local action, such as playing an audible message notifying the driver that he or she is speeding and should slow down.

External message service 613 receives event indications from output stream receipt service 613 and may send messages indicating the occurrence of these events to external systems (e.g., one or more other CEP engines). For example, external message service 613 may send a message indicating the occurrence of event detected by event processing logic 609 to another CEP engine.

Figure 7:
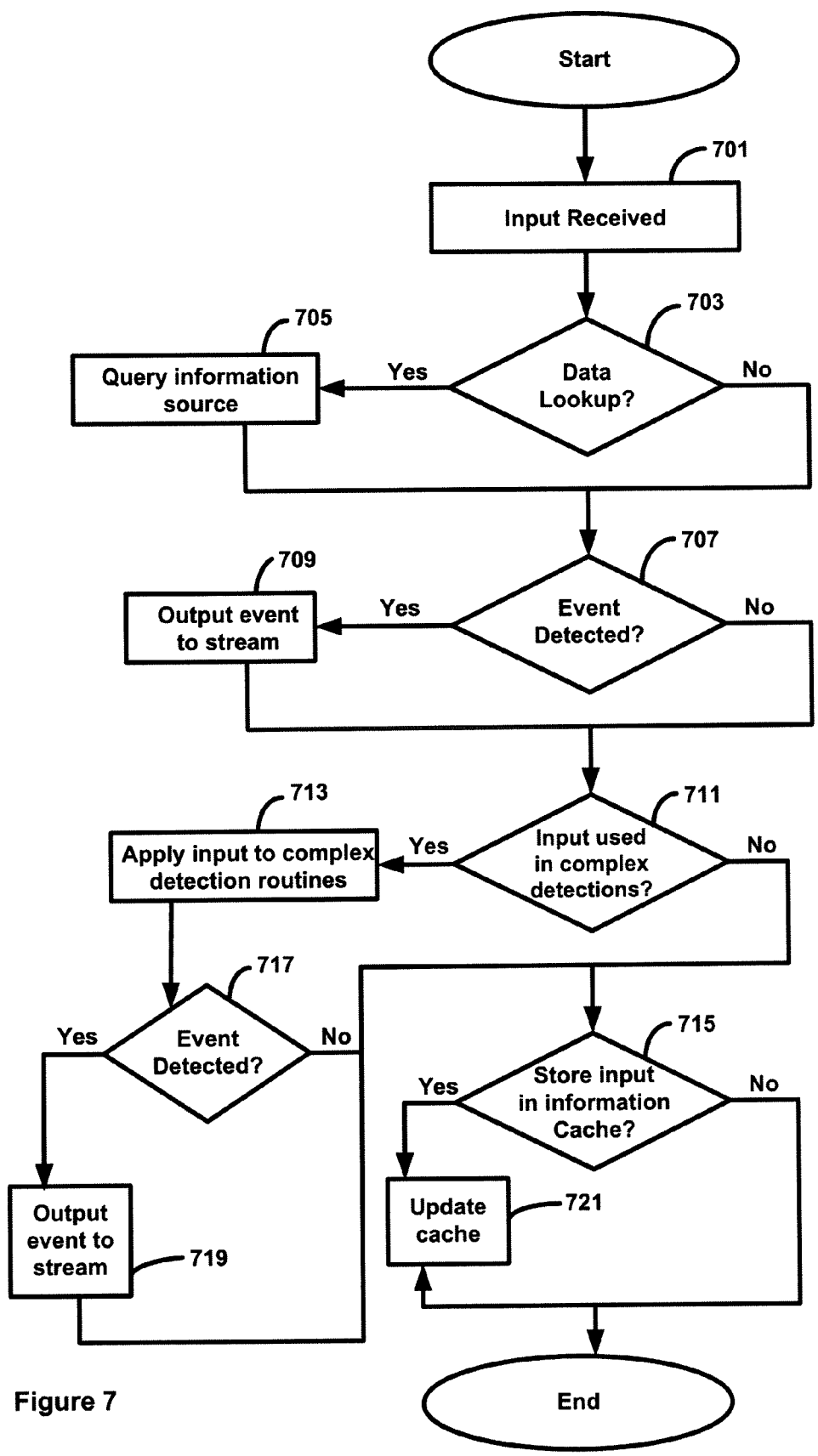
FIG. 7 is a flow chart of an illustrative process for processing received input data in a complex event processing engine that may be employed in some embodiments of the invention.

FIG. 7 is a flow chart of an illustrative process that event processing logic 609 may use to process received input data (e.g., from input stream service 607). The process begins at block 701, where input data is received. The process next continues to block 703, where CEP logic 609 determines whether the received input data warrants looking up data from an external data source (e.g., an external database). If it is determined at block 703 that a data lookup is warranted, the process continues to block 705 where the information from the appropriate data source is obtained. If, at block 703, it is determined that no data lookup is warranted, the process continues to block 707, where it is determined if the received input indicates that an event has occurred. If, at block 707, it is determined that an event has occurred, the process continues to block 709, where the event is output via an output stream.

The process next continues to block 711, where it is determined if the received input data is used in the detection of any complex events. If so, the process continues to block 713, where the input data is applied to the complex detection routines (as discussed in greater detail below). The process next continues to block 717, where it is determined if a complex event has occurred. If a complex event has occurred, the process continues to block 719, where the complex event is output via an output stream. If, at block 717, it is determined that no complex event has occurred the process continues to block 715.

If at block 711, it is determined that the received input data is not used in the detection of complex events, the process continues directly to block 715, bypassing blocks 717 and 719. At block 715, it is determined if the received input data should be cached by event processing logic 609. That is, event processing logic 609 may cache received input data that may be subsequently used in the detection of complex events so that this data may be quickly accessed. If at, block 715, it is determined that the input data warrants caching, the process may continue to block 721, where the input data is stored in the cache. If at, block 715, it is determine that the received input data does not warrant caching, the process ends.

B. Exemplary Vehicle-Related Input Streams and Output Streams

In the exemplary system discussed above in connection with FIGS. 5-7, one or more of the CEP engines 505 in a vehicle 503 may receive a variety of information from different sources, examples of which information include, but are not limited to, vehicle information, image information, event-based information (e.g., from one or more other vehicles, a central office, and/or a mobile supervisor/dispatcher), and/or non-vehicle specific information (e.g., weather information, traffic information, street map information, credit/fuel card transaction information, etc.). The input stream service of a given CEP engine publishes the various information received onto one or more input streams, to which queries are applied by event processing logic to determine one or more events based on the received information.

Regarding vehicle information generally, at least some of the vehicle information may originate from one or more sensors associated with a vehicle (e.g., a vehicle in which the CEP engine itself may be situated). In another aspect, vehicle information may include environmental and/or operational information regarding a vehicle and/or the environment in which a vehicle is operated. In yet another aspect, vehicle information may include a variety of resource and/or scheduling information relating to a vehicle and/or its driver (e.g., to what driver is a vehicle assigned, when and/or by whom the vehicle was taken out or returned to a company lot, when the vehicle was started-up at the beginning of a day/shift and shut-down/parked at the end of a day/shift, vehicle maintenance schedules and/or maintenance history, etc.). In some implementations, such resource and/or scheduling information may be accessed via electronic records maintained by a company overseeing fleet management operations. Specific examples of the foregoing vehicle information types are provided in turn below.

Image information relating to a given vehicle and/or its operating environment also may be received from various sources and published onto one or more input streams. In some examples, image information may be provided as part of the vehicle information to which a CEP engine applies one or more queries, while in other cases image information may be provided apart from vehicle information. Examples of image information include, but are not limited to, "raw" or unprocessed information obtained from an output of one or more on-board vehicle cameras (in which pixel information, such as luminance and/or color values for a particular pixel, is represented as a series of digital values constituting one or more frames of image data), status information regarding operation of one or more on-board vehicle cameras (which may be provided as digital values, text strings, or Boolean values), and processed image information (e.g., color detection information, luminance information, edge detection information, motion detection information, pattern/object recognition information, etc.) derived from data provided by one or more on-board vehicle cameras (processed image information similarly may be provided as digital values, text strings, or Boolean values).

As discussed further below, image information may itself include image-related event information, for example, in which processed image information is further analyzed or itself provides one or more indications of a particular image attribute or particular image content (e.g., the presence of a red traffic light or a stop sign in one or more image frames). In some embodiments discussed in greater detail below, various types of image information may be used in conjunction with vehicle information and/or other non-vehicle specific information to determine complex events such as a "disobeyed stop traffic signal event," an "excessive speed event," and/or a "reckless driving event," for example.

With respect to processed image information, in some exemplary implementations an input stream of a CEP engine onto which processed image information is published may be generated based at least in part on data provided by one or more dedicated image processors communicatively coupled to the CEP engine (which may constitute one or more external data sources 600 as shown in FIG. 6). In such implementations, the image processor(s) may be configured to execute any of a variety of image analysis algorithms on data representing one or more acquired images so as to provided the processed image information. In other implementations, a CEP engine itself may be configured, via an appropriate query set, to monitor "raw" image information (e.g., luminance/color pixel values) and/or partially/pre-processed image information published to one or more input streams so as to perform further image analysis, which may in turn be used for vehicle-related and/or fleet-related event detection (e.g., an image processor itself may be implemented as a CEP engine, in which one or more output streams of the image processor CEP engine may provide image-related event information to another CEP engine for purposes of detecting vehicle-related and/or fleet-related events).

Some examples of image analysis algorithms that may be implemented by one or more image processors (whether or not they are CEP-based) include, but are not limited to, a motion detection algorithm, a pixel value analysis algorithm, a color analysis algorithm, a pixel entropy algorithm, an edge detection algorithm, a line detection algorithm, and a compression analysis algorithm. Any one or more of such exemplary algorithms may be applied to image pixel data representing one or more image frames so as to provide luminance information, color detection information, edge or line detection information, motion detection information, pattern/object recognition information, and compression information.

With respect to exemplary image analysis algorithms, in one embodiment a motion detection algorithm may perform an optical flow calculation for determining a pattern of apparent motion of an on-board vehicle camera based on changes of image content represented by data in multiple image frames. In one implementation, the optical flow algorithm may be based on the Pyramidal Lucas-Kanade method for performing an optical flow calculation (see Lucas B D and Kanade T, "An iterative image registration technique with an application to stereo vision," *Proceedings of Imaging understanding workshop*, pp 121-130, 1981, which publication is hereby incorporated herein by reference). A pixel value analysis algorithm may be used to generate a grayscale luminance distribution histogram of image content. A color analysis algorithm may be used to analyze the RGB color data or HSV color coordinate system hue and saturation values in one or more frames of image data. In one implementation, the color analysis algorithm may determine a most prevalent color present in some portion of one or more image frames (e.g., yellow for a yellow traffic light, red for a red traffic light or stop sign, etc.). A pixel entropy algorithm may measure a degree of randomness of image content represented in one or more frames of image data. Randomness of an image may be a measure of, for example, the presence or absence of predictable patterns in the image. As a more specific example, the pixel entropy algorithm may compute an entropy value for an image based on grayscale luminance distribution and/or color distribution of the image data. Thus, an image that is more varied in color and/or intensity may have a higher entropy value compared to an image that is less varied in color and/or intensity.

Edge detection is a process of identifying points in a digital image at which image brightness changes sharply (e.g., a process of detecting extreme pixel differences). An edge detection algorithm may be used to perform edge detection on one or more frames of the image data. In one example, an edge detection algorithm may use the Sobel operator, which calculates a gradient of image intensity at each point/pixel, giving a direction of largest increase from light to dark and/or from one color to another and a rate of change in that direction. The result therefore shows how "abruptly" or "smoothly" the image changes at that point and, therefore, how likely it is that that part of the image represents an edge, as well as how that edge is likely to be oriented. One or more results of edge detection may be used by a line detection algorithm for further processing to determine line characteristics of certain frames of the image data. Like an edge detection algorithm, a line detection algorithm may be based on one or more edge detection processes that use, for example, the Sobel operator. A line detection algorithm may group together edges output by the edge detection processes based on the edges' locations, lengths, and/or orientations. For example, in one implementation, the line detection algorithm may output a detected line when the total length of a group of adjacent edges exceed a certain threshold (e.g., 10 pixels).

A compression analysis algorithm may be any suitable software algorithm for performing a compression operation on image data. As is well known, in a compression operation such as standard JPEG, a discrete cosine transform (DCT) may be applied to blocks of pixels to transform the data into a frequency domain, thereby facilitating removal of fine details in the image (e.g., high frequency components) that are less perceptible to humans.

As noted above, processed image information published to one or more input streams of a CEP engine (or published to one or more output streams of a CEP-based image processor) also may include indications of detected image-related events based on application of one or more image analysis algorithms to one or more frames of image data. Examples of image-related events that may be detected as a result of image processing include, but are not limited to, detecting the presence of a particular object or feature in an on-board vehicle camera's field of view, as well as detecting a pattern of motion of particular objects or features in the camera's field of view from multiple frames of image data. Some examples of image-related events generally relating to forward field of view include a "lane change event" (e.g., when a vehicle changes lanes) and a "proximate forward collision event" (e.g., when a vehicle is tailgating another vehicle) (see Su Y F, Chen C T, Liao H L, "Study of Integrated Vehicle Image System Including LDW, FCW, and AFS," World Academy of Science, Engineering and Technology, Vol. 60, pages 216-222, 2009, which publication is incorporated herein by reference). Other examples of image-related events generally relating to forward field of view include detection of a particular color traffic light in one or more images, detecting the presence of a traffic sign such as a speed limit sign, stop sign, or yield sign in one or more images, and detecting activation of the windshield wipers in one or more images. Examples of image-related events generally relating to rear or driver-facing field of view include, but are not limited to a "driver distracted event" (e.g., in which the orientation of a driver's face may be determined, pursuant to image analysis, as not forward-facing) and a "driver sleeping event" (e.g., in which a driver's eyes may be determined, pursuant to image analysis, to be drooping or closed).

One or more on-board vehicle cameras may be placed inside and/or outside of a vehicle in various locations, and may monitor an internal view (including a driver) and/or an external view (e.g., one or more in-cab camera may be mounted on or near a rear view mirror and oriented to acquire images from a forward field of view and/or rear/driver field of view). In one exemplary implementation, a 360 degree camera system may be used to obtain a wide range of image views. Examples of such 360 degree camera systems are given by the "Around View Monitor" (AVM) system presently employed in some vehicles offered by Nissan and Infinity (e.g., see http://www.nissan-global.com/EN/TECHNOLOGY/INTRODUCTION/DETAILS/AVM/; also see http://www.worldcarfans.com/10703284651/infiniti-around-view-monitor), as well as the system described in U.S. Patent Publication No. 2010/0182398 A1, entitled "360 Degree Automobile Video Camera System," filed Feb. 25, 2010 and published Jul. 22, 2010, which publication is incorporated herein by reference. In another exemplary implementation, an on-board vehicle camera may include a video event recorder configured to record video events based at least in part on one or more exceptional forces acting on the vehicle (e.g., hard braking, swerving, collision, etc.). Such recorders may provide both real-time or "raw" image data from monitored views, as well as one or more specific images relating to particular events or time periods preceding/following specific events relating to exceptional forces. Examples of such video event recorders are given by the Vision Drive 3000 available from Catalk, Inc. dba VisionDriveCam.com, 11501 Dublin Blvd. Suite 200, Dublin, Calif. 94568 (see http://visiondrivecam.com), and the DriveCam™ brand imaging system available from DriveCam Inc., 8911 Balboa Ave., San Diego, Calif. 92123 (see http://www.drivecam.com).

In yet another aspect, "non-vehicle specific information" that may be helpful in determining vehicle-related events and/or fleet-related events may be published onto one or more input streams to which a CEP engine applies one or more queries. Examples of such information include, but are not limited to, weather information, traffic information, street map information, and credit card or fuel card transaction information. One or more of these exemplary information types may be obtained from a variety of sources in any of a variety of manners (e.g., issuing a web service call to retrieve weather, traffic and/or street map information based on a vehicle's current location). Non-vehicle specific information may be assessed by a CEP engine alone or together with vehicle information, image information, and/or one or more other complex events to determine a variety of vehicle-related and/or fleet-related events.

Table 1 below lists an illustrative set of input streams to which various information may be published and processed by a vehicle-based CEP engine 505 in a vehicle 503, and Table 2 lists an illustrative set of output streams to which the vehicle-based CEP engine may publish indications of event occurrences as a result of the application to one or more input streams of one or more queries. It should be appreciated that these tables are intended to be exemplary and not exhaustive with respect to the types of information and/or events that may be published to one or more input streams and/or one or more output streams of a CEP engine according to various embodiments of the present invention.

TABLE 1

| Stream Name | Description |
| --- | --- |
| Vehicle_Readings_Input | Information gathered from the ECU of the vehicle |
| GPS_Input | Information from a GPS receiver in the vehicle |
| Accelerometer_Input | Information from an on-board accelerometer |
| Humidity_Input | Information from an on-board humidity sensor |
| In-Cab_Temperature_Input | Information from a temperature sensor that measures temperature inside the vehicle |
| Outside_Temperature_Input | Information from a temperature sensor that measures temperature outside the vehicle |
| Light_Input | Information from an on-board light sensor |
| Ign_Voltage_Input | Information from an ignition voltage sensor |

TABLE 1-continued

| Stream Name | Description |
| --- | --- |
| Cam_Voltage_Input | Information from a voltage sensor for an on-board camera |
| Vehicle_Camera_Input | Information from an on-board camera that monitors the view from the front windshield of the vehicle |
| Driver_Camera_Input | Information from an on-board camera that monitors the driver of the vehicle |
| Cellular_Diagnostic_Input | Information from a component that monitors cellular connectivity |
| Wireless_Diagnostic_Input | Information from a component that monitors WiFi connectivity |
| Weather_Input | Weather information (e.g., obtained from a web service call) |
| Traffic_Input | Traffic information (e.g., obtained from a web service call) |
| Street_Map_Input | Street map information (e.g., obtained from a web service call) |
| Credit/Fuel_Card_Transaction_Input | Credit/fuel card transaction information (e.g., obtained from a web service call) |
| Resource/Scheduling_Input | Resource/Scheduling information (e.g., obtained from a company database) |

TABLE 2

| Stream Name | Description |
| --- | --- |
| Vehicle_Component_Error_Output | Event detected that indicates a diagnostic error condition for a specific component |
| Vehicle_Component_Warning_Output | Event detected that suggests that a specific component is not operating as intended |
| Vehicle_Component_Heartbeat_Output | Event detected that indicates a heartbeat message transmitted from a specific component |
| Vehicle_System_Error_Output | Event detected from one stream or the combination of several input streams that indicates an error condition for the entire vehicle system or portion of the system |
| Vehicle_System_Warning_Output | Event detected from one stream or the combination of several input streams that suggests the entire vehicle system or a portion of the system is not operating as intended |
| Vehicle_Movement_Output | Event detected that indicates the current geographic position of the vehicle, as well as the vehicle's current state of motion (e.g., idling, speeding, moving) |
| Vehicle_Engine_Output | Event detected that indicates a vehicle engine condition that exceeds set tolerances |
| Vehicle_Fluid_Output | Event detected that indicates that a vehicle fluid reading exceeds set tolerances |
| Vehicle_State_Output | Event detected that indicates a change in the vehicle state such as key position, door open/close, dash lights, gear position, and/or other changes in state |
| Vehicle_Camera_Output | Event detected that indicates the vehicle camera is capturing, or has captured, images of both the cab and the front of the vehicle |
| Vehicle_Impact_Output | Event detected that indicates that the vehicles has experienced a significant impact on one or more axes |
| Vehicle_Environment_Output | Event detected that indicates the current state of the internal in-cab environment of the vehicle (e.g., temperature, lighting, and/or other environmental conditions) |
| Occupant_State_Output | Event detected that indicates a change in the state of the driver (e.g., seatbelt fastened, driver drowsiness, driver distraction, passenger presence, and/or other changes in driver state). |
| External_Environment_Output | Event detected that indicates the current state of the external (i.e., outside vehicle) environment (e.g., outside temperature, outside lighting, outside humidity, and/or other environmental conditions) |
| Disobeyed_Stop_Traffic_Signal_Output | Event detected that indicates the vehicle ran a red traffic light or stop sign |
| Excessive_Speed_Output | Event detected that indicates the vehicle speed exceeded a safe speed |

TABLE 2-continued

| Stream Name | Description |
| --- | --- |
| Reckless_Driving_Output | Event detected that indicates the driver is operating the vehicle recklessly (e.g., multiple excessive speeding events, combination of one or more excessive speeding events with one or more disobeyed traffic stop signal events, etc.) |

A more detailed discussion of exemplary ones of the above-listed input streams processed by a CEP engine 505 in a vehicle 503 and exemplary ones of the above-listed output streams generated by a CEP engine 505 is provided below. It should be appreciated that different vehicles may have different types of sensors and thus may receive different types of input streams and generate different types of output streams. As with Tables 1 and 2 above, the information provided in the tables below is intended to be illustrative and not exhaustive.

Vehicle_Readings_Input

The Vehicle_Readings_Input stream may provide data from an Electronic Control Unit (ECU) of the vehicle in which a CEP engine 505 is located. In some examples, the ECU may be on On-Board Diagnostic system (OBD) that provides access to various information relating to vehicle health for various vehicle sub-systems, which in many instances is provided by various sensors on/in the vehicle. The amount of information available from an ECU/OBD may vary widely amongst different vehicle makes/models. Some ODB implementations utilize a standardized series of diagnostic trouble codes which facilitate identification of various parameters, while some vehicle manufacturers adopt proprietary protocols. One example of a standardized system for providing vehicle readings information is the On Board Diagnostic OBD-II standard SAE J1979, which provides a number of values corresponding to defined parameter identifiers representing various vehicle conditions/sensor outputs.

Table 3 below lists exemplary vehicle readings information that may be included in the Vehicle_Readings_Input stream.

TABLE 3

| Parameter Name | Type | Description |
| --- | --- | --- |
| Vehicle Identification Number | String | The Vehicle Identification Number that is unique to the vehicle |
| Mileage | Float | The current odometer reading for the vehicle |
| Engine_Temp | Float | The current engine temperature |
| Oil_Temp | Float | The current oil temperature |
| Oil_Pressure | Float | The current engine oil pressure |
| Water_Temp | Float | The current engine water temperature |
| Fuel_Level | Float | The current fuel level percentage |
| RPM_Level | Float | The current engine RPM reading |
| Speed_Level | Float | The current vehicle speed in MPH |
| Throttle_Pct | Float | The current percentage of throttle depression |
| Brake_Ind | Boolean | Indicator as to whether or not the brake pedal is being applied |
| Psgr_ABag_Ind | Boolean | Indicator as to whether or not the passenger airbag off light is lit |
| Psgr_Sbelt_Ind | Boolean | Indicator as to whether or not the passenger seatbelt is fastened |
| Drvr_ABag_Ind | Boolean | Indicator as to whether or not the driver airbag light is on |
| Key_Pos | String | Indicator as to which position the vehicle key is in (e.g., Acc, Power, Start, Run) |
| Gear_Pos | String | Indicator as to which position the vehicle gear shift is in (e.g., park, reverse, neutral, drive, 1, 2) |
| Eng_Light_Ind | Boolean | Indicator as to whether check engine light is on |
| Ovr_Drv_Ind | Boolean | Indicator as to whether or not the overdrive off light is on |
| Prk_Brk_Ind | Boolean | Indicator as to whether or not the parking brake has been engaged |
| Psgr_Door_Ind | Boolean | Indicator as to whether or not the vehicle's passenger door is open |
| SBelt_Light_Ind | Boolean | Indicator as to whether or not the fasten seat belt light is on |
| DrOpen_Light_Ind | Boolean | Indicator as to whether or not the Door Open light is on |
| Ign_Sec_Pos | String | Indicator as to the current setting for the vehicle ignition security feature |
| Wind_Wiper_Ind | Boolean | Indicator for activation of windshield wipers |
| LT_Sig_Ind | Boolean | Indicator for activation of left turn signal |
| RT_Sig_Ind | Boolean | Indicator for activation of right turn signal |
| Emerg_Sig_Ind | Boolean | Indicator for activation of emergency flashers |
| Headlmp_Ind | Boolean | Indicator for activation of headlamps |
| Audio_Sys_Status | String | Indicator(s) for status of audio system (on/off, volume, source selection, etc.) |
| Read_TS | Timestamp | Timestamp that indicates when the vehicle readings were obtained |

GPS_Input

The GPS_Input stream may provide data from an on-board GPS receiver in the vehicle in which a CEP engine 505 is located. Table 4 below lists exemplary information that may be included in the GPS_Input stream.

TABLE 4

| Parameter Name | Type | Description |
| --- | --- | --- |
| Vehicle Identification Number | String | The Vehicle Identification Number that is unique to the vehicle |
| Lat_Deg | Integer | The current latitude degrees determined by the GPS receiver |

TABLE 4-continued

| Parameter Name | Type | Description |
| --- | --- | --- |
| Lat_Min | Float | The current latitude minutes determined by the GPS receiver |
| Lat_Sec | Float | The current latitude seconds determined by the GPS receiver |
| Lng_Deg | Integer | The current longitude degrees determined by the GPS receiver |
| Lng_Min | Float | The current longitude minutes determined by the GPS receiver |
| Lng_Sec | Float | The current longitude seconds determined by the GPS receiver |
| Lat_Head | String | The latitude heading determined by the GPS receiver |
| Lng_Head | String | The longitude heading determined by the GPS receiver |
| Direction | String | The direction of the vehicle determined by the GPS receiver |
| Sat_Cnt | Integer | The number of satellites currently being used by the GPS receiver |
| Data_Rate | Float | The current data rate of the GPS receiver |
| Dec_Deg_Lat | String | The current latitude in decimal degrees format |
| Dec_Deg_Lng | String | The longitude in decimal degrees format |
| GPS_Speed | Float | The current speed of the vehicle as read from the GPS receiver |
| Sig_Noise_Ratio | Float | The current signal to noise ration for the GPS receiver |
| Curr_Fix | String | The current fix status of the GPS receiver (e.g., invalid, valid, valid-DGPS, etc.) |
| NMEA_String | String | The current raw NMEA string provide from the GPS receiver |
| GPS_TS | Timestamp | The timestamp of the GPS information provided from the GPS receiver |
| Read_TS | Timestamp | The timestamp that indicates when the GPS information was gathered |

Accelerometer_Input

The Accelerometer_Input stream may provide data from an on-board accelerometer in the vehicle in which a CEP engine 505 is located. Table 5 below lists exemplary information that may be included in the Accelerometer_Input stream.

TABLE 5

| Parameter Name | Type | Description |
| --- | --- | --- |
| Vehicle Identification Number | String | The Vehicle Identification Number that is unique to the vehicle |
| X_Axis | Float | The current reading from the X Axis of the accelerometer |
| Y_Axis | Float | The current reading from the Y Axis of the accelerometer |
| Z_Axis | Float | The current reading from the Z Axis of the accelerometer |
| Read_TS | Timestamp | The time at which the accelerometer information was gathered |

Humidity_Input

The Humidity_Input stream may provide data from an on-board humidity sensor in the vehicle in which a CEP engine 505 is located. Table 6 below lists exemplary information that may be included in the Humidity_Input stream.

TABLE 6

| Parameter Name | Type | Description |
| --- | --- | --- |
| Vehicle Identification Number | String | The Vehicle Identification Number that is unique to the vehicle |
| Humidity_Level | Float | The current reading from the humidity sensor |
| Read_TS | Timestamp | The time at which the humidity information was gathered |

In-Cab_Temperature_Input

The In-Cab_Temperature_Input stream may provide data from an on-board temperature sensor that measures air temperature inside the vehicle in which a CEP engine 505 is located. Table 7 below lists exemplary information that may be included in the In-Cab_Temperature_Input stream.

TABLE 7

| Parameter Name | Type | Description |
| --- | --- | --- |
| Vehicle Identification Number | String | The Vehicle Identification Number that is unique to the vehicle |
| Temp_Level | Float | The current reading from the in-cab temperature sensor |
| Read_TS | Timestamp | The time at which the temperature information was gathered |

Outside_Temperature_Input

The Outside_Temperature_Input stream may provide data from an on-board temperature sensor that measures air temperature outside the vehicle in which a CEP engine 505 is located. Table 8 below lists exemplary information that may be included in the Outisde_Temperature_Input stream.

TABLE 8

| Parameter Name | Type | Description |
| --- | --- | --- |
| Vehicle Identification Number | String | The Vehicle Identification Number that is unique to the vehicle |
| Temp_Level | Float | The current reading from the outside temperature sensor |
| Read_TS | Timestamp | The time at which the temperature information was gathered |

Light_Input

The Light_Input stream may provide data from an on-board temperature light-sensor in the vehicle in which a CEP engine 505 is located. Table 9 below lists exemplary information that may be included in the Light_Input stream.

TABLE 9

| Parameter Name | Type | Description |
| --- | --- | --- |
| Vehicle Identification Number | String | The Vehicle Identification Number that is unique to the vehicle |
| Light_Level | Float | The current reading from the light sensor |

TABLE 9-continued

| Parameter Name | Type | Description |
| --- | --- | --- |
| Read_TS | Timestamp | The time at which the light level information was gathered |

Ign_Voltage_Input

The Ign_Voltage_Input stream may provide data from an on-board ignition voltage sensor in the vehicle in which a CEP engine 505 is located. Table 10 below lists exemplary information that may be included in the Ign_Voltage_Input stream.

TABLE 10

| Parameter Name | Type | Description |
| --- | --- | --- |
| Vehicle Identification Number | String | The Vehicle Identification Number that is unique to the vehicle |
| Voltage_Level | Float | The current reading from the ignition voltage sensor |
| Read_TS | Timestamp | The time at which the voltage level information was gathered |

Cam_Voltage_Input

The Cam_Voltage_Input stream may provide data from an on-board camera voltage sensor in the vehicle in which a CEP engine 505 is located. Table 11 below lists exemplary information that may be included in the Cam_Voltage_Input stream.

TABLE 11

| Parameter Name | Type | Description |
| --- | --- | --- |
| Vehicle Identification Number | String | The Vehicle Identification Number that is unique to the vehicle |
| Voltage_Level | Float | The current reading from the camera voltage sensor |
| Read_TS | Timestamp | The time at which the voltage level information was gathered |

Driver_Camera_Input

The Driver_Camera_Input stream may provide data from an on-board camera and sensor monitoring the state of the driver of the vehicle in which a CEP engine 505 is located. As noted above, un-processed image information, processed image information, image-related event information, and/or camera status information may be published to this input stream. Table 12 below lists exemplary information that may be included in the Driver_Camera_Input stream.

TABLE 12

| Parameter Name | Type | Description |
| --- | --- | --- |
| Vehicle Identification Number | String | The Vehicle Identification Number that is unique to the vehicle |
| Clip_Cnt | Integer | The number of clips/frames captured by and available from the vehicle camera |
| Frame_Number_Output | Integer | An indexed number relating to frame position in a series of image frames |
| Pixel_ID_Output | Integer | 2D coordinates (x, y) of pixel location in a frame |
| Pixel_Value_Output | Integer | Grayscale, RGB, or HIS value(s) of a particular pixel (e.g., indexed by frame number and pixel ID) |
| Analysis_Type_Output | String | Identification of image analysis algorithm applied to generate pixel values (e.g., None, Color Detection, Edge Detection, Motion Detection, Compression, etc.) |
| Drvr_Distract_Ind | Boolean | Event indicator as to whether or not a driver distraction state has been detected |
| Drvr_Sleep_Ind | Boolean | Event indicator as to whether or not a driver sleep state has been detected |
| Read_TS | Timestamp | The timestamp that indicates when the driver camera information was gathered |

Vehicle_Camera_Input

The Vehicle_Camera_Input stream may provide data from and/or derived from an on-board vehicle camera that monitors the front field of view from the vehicle in which a CEP engine 505 is located. As noted above, un-processed image information, processed image information, image-related event information, and/or camera status information may be published to this input stream. Table 13 below lists exemplary information that may be included in the Vehicle_Camera_Input stream.

TABLE 13

| Parameter Name | Type | Description |
| --- | --- | --- |
| Vehicle Identification Number | String | The Vehicle Identification Number that is unique to the vehicle |
| Clip_Cnt | Integer | The number of clips/frames captured by and available from the vehicle camera |
| Frame_Number_Output | Integer | An indexed number relating to frame position in a series of image frames |
| Pixel_ID_Output | Integer | 2D coordinates (x, y) of pixel location in a frame |
| Pixel_Value_Output | Integer | Grayscale, RGB, or HIS value(s) of a particular pixel (e.g., indexed by frame number and pixel ID) |
| Analysis_Type_Output | String | Identification of image analysis algorithm applied to generate pixel values (e.g., None, Color Detection, Edge Detection, Motion Detection, Compression, etc.) |

TABLE 13-continued

| Parameter Name | Type | Description |
| --- | --- | --- |
| Forward_Motion_Detection_Output | Boolean | Event indicator that forward vehicle movement is detected (e.g., via optical flow algorithm on multiple images) |
| Rear_Motion_Detection_Output | Boolean | Event indicator that rear vehicle movement is detected (e.g., via optical flow algorithm on multiple images) |
| Left_Motion_Detection_Output | Boolean | Event indicator that left vehicle movement is detected (e.g., via optical flow algorithm on multiple images) |
| Right_Motion_Detection_Output | Boolean | Event indicator that right vehicle movement is detected (e.g., via optical flow algorithm on multiple images) |
| Yellow_Traffic_Signal_Output | Boolean | Event indicator that a yellow traffic light is detected in one or more images |
| Red_Traffic_Signal_Output | Boolean | Event indicator that a red traffic light or stop sign is detected in one or more images |
| Wiper_Activation_Output | Boolean | Event indicator that wiper activation is detected in one or more images |
| Speed_Limit_Sign_Output | Boolean | Event indicator that a speed limit sign is detected in one or more images |
| Posted_Speed_Limit_Output | Integer | Speed Limit as detected from an image of a speed limit sign detected in one or more images |
| Lane_Change_Output | Boolean | Event indicator that vehicle has changed lanes |
| Proximate_Forward_Collision_Output | Boolean | Event indicator that vehicle is tailgating another vehicle |
| Read_TS | Timestamp | The timestamp that indicates when the vehicle camera information was gathered |

Cellular_Diagnostic_Input

The Cellular_Diagnostic_Input stream may provide data from an on-board component that measures cellular telephone network connectivity from the vehicle in which a CEP engine 505 is located. Table 14 below lists exemplary information that may be included in the Cellular_Diagnostic_Input stream.

TABLE 14

| Parameter Name | Type | Description |
| --- | --- | --- |
| Vehicle Identification Number | String | The Vehicle Identification Number that is unique to the vehicle |
| Cell_Sig_Level | Float | The current cellular signal level |
| Cell_Data_Rate | Float | The current cellular data rate |
| Cell_Active | Boolean | Indicator as to whether or not cellular service is currently available |
| Read_TS | Timestamp | The timestamp that indicates when the cellular diagnostic information was gathered |

Wireless_Diagnostic_Input

The Wireless_Diagnostic_Input stream may provide data from an on-board component that measures WiFi network connectivity from the vehicle in which a CEP engine 505 is located. Table 15 below lists exemplary information that may be included in the Wireless_Diagnostic_Input stream.

TABLE 15

| Parameter Name | Type | Description |
| --- | --- | --- |
| Vehicle Identification Number | String | The Vehicle Identification Number that is unique to the vehicle |
| WiFi_Chnl | Integer | The current wireless channel number |
| WiFi_Name | String | The current wireless name |
| WiFi_Client_Cnt | Integer | The current number of clients connected |
| WiFi_Active | Boolean | Indicator as to whether or not the wireless service is active |
| Read_TS | Timestamp | The timestamp that indicates when the wireless diagnostic information was gathered |

Following below are exemplary formats/content for exemplary output streams identified in Table 2 above. As with the exemplary input streams identified in Table 1 and their exemplary formats/content as given in the above tables, it should be appreciated that the information provided in the tables below is intended to be illustrative and not exhaustive.

Component_Error_Output

A CEP engine 505 may use information from the Vehicle_Readings_Input, the GPS_Input, the Accelerometer_Input, Humidity_Input, In-Cab_Temperature_Input, Outside_Temperature_Input, Light_Input, Ign_Voltage_Input, Cam_Voltage_Input, Driver_Camera_Input, Vehicle_Camera_Input, Cellular_Diagnostic_Input, and Wireless_Diagnostic_Input to detect events that indicate a diagnostic error condition for a specific component. Such events may be output via the Component_Error_Output stream. The Component_Error_Output stream may include the exemplary information listed in Table 16 below.

TABLE 16

| Parameter Name | Type | Description |
| --- | --- | --- |
| Vehicle Identification Number | String | The Vehicle Identification Number that is unique to the vehicle |
| Component_Nm | String | The name of the component that generated the error |
| Err_Severity | Integer | The severity level of the error |
| Err_Msg | String | A text message that includes details about the component error |
| Err_Trace | String | The trace information that supplements the error text |
| Err_TS | Timestamp | The time that the component error occurred |
| Err_Lat | String | The latitude reading at the time of the component error |
| Err_Lng | String | The longitude reading at the time of the component error |
| Direction | String | The vehicle direction at the time of the component error |

Component_Warning_Output

A CEP engine 505 may use information from the Vehicle_Readings_Input, the GPS_Input, the Accelerometer_Input, Humidity_Input, In-Cab_Temperature_Input, Outside_Temperature_Input, Light_Input, Ign_Voltage_Input, Cam_Voltage_Input, Driver_Camera_Input, Vehicle_Camera_Input, Cellular_Diagnostic_Input, and Wireless_Diagnostic_Input to detect events that suggest that a specific component is not operating as intended. Such events may be output via the Component_Warning_Output stream. The Component_Warning_Output stream may include the exemplary information listed in Table 17 below.

TABLE 17

| Parameter Name | Type | Description |
| --- | --- | --- |
| Vehicle Identification Number | String | The Vehicle Identification Number that is unique to the vehicle |
| Component_Nm | String | The name of the component that generated the warning |
| Warn_Reason | String | The reason code as to why the component event was deemed a warning |
| Warn_Msg | String | A text message that includes details about the component warning |
| Warn_Trace | String | The trace information that supplements the warning text |
| Warn_TS | Timestamp | The time that the component warning occurred |
| Warn_Lat | String | The latitude reading at the time of the component warning |
| Warn_Lng | String | The longitude reading at the time of the component warning |
| Direction | String | The vehicle direction at the time of the component warning |

Component_Heartbeat_Output

A CEP engine 505 may use information from the Vehicle_Readings_Input, the GPS_Input, the Accelerometer_Input, Humidity_Input, In-Cab_Temperature_Input, Outside_Temperature_Input, Light_Input, Ign_Voltage_Input, Cam_Voltage_Input, Driver_Camera_Input, Vehicle_Camera_Input, Cellular_Diagnostic_Input, and Wireless_Diagnostic_Input to detect events that indicate a heartbeat message transmitted from a specific component. Such events may be output via the Component_Heartbeat_Output stream. The Component_Heartbeat_Output stream may include the exemplary information listed in Table 18 below.

TABLE 18

| Parameter Name | Type | Description |
| --- | --- | --- |
| Vehicle Identification Number | String | The Vehicle Identification Number that is unique to the vehicle |
| Component_Nm | String | The name of the component that generated the heartbeat |
| IsAlive | Boolean | Indicator as to whether or not the component is alive |
| IsHealthy | Boolean | Indicator as to whether or not the component is healthy |
| Next_TS | Timestamp | The anticipated time that the next heartbeat will be generated for this component |
| HBeat_TS | Timestamp | The time that component heartbeat occurred |
| HBeat_Lat | String | The latitude reading at the time of the component heartbeat |
| HBeat_Lng | String | The longitude reading at the time of the component heartbeat |
| Direction | String | The vehicle direction at the time of the component heartbeat |

System_Error_Output

A CEP engine 505 may use information from the Vehicle_Readings_Input, the GPS_Input, the Accelerometer_Input, Humidity_Input, In-Cab_Temperature_Input, Outside_Temperature_Input, Light_Input, Ign_Voltage_Input, Cam_Voltage_Input, Driver_Camera_Input, Vehicle_Camera_Input, Cellular_Diagnostic_Input, and Wireless_Diagnostic_Input to detect events that indicate an error condition for the entire vehicle system. Such events may be output via the System_Error_Output stream.

For example, a System_Error_Ouput event may be detected if, for period of at least one minute, the WiFi Client Count indicated in the Wireless_Diagnostic_Input is less than or equal to a predefined threshold of the minimum number of network clients. This threshold may be specified by a user or administrator and stored, for example, in data store 611. The System_Error_Output stream may include the exemplary information listed in Table 19 below.

TABLE 19

| Parameter Name | Type | Description |
| --- | --- | --- |
| Vehicle Identification Number | String | The Vehicle Identification Number that is unique to the vehicle |
| Rel_Cmpnts | String | The component names of the components that make up the system error condition |
| Err_Severity | Integer | The level of severity associated with this error |
| Err_Msg | String | Text that describes the system error that occurred |
| Err_Trace | String | Trace information that supplements the error message |
| Err_TS | Timestamp | Time that the system error occurred |
| Err_Lat | String | The latitude reading at the time of the system error |

TABLE 19-continued

| Parameter Name | Type | Description |
| --- | --- | --- |
| Err_Lng | String | The longitude reading at the time of the system error |
| Direction | String | The vehicle direction at the time of the system error |

System_Warning_Output

A CEP engine 505 may use information from the Vehicle_Readings_Input, the GPS_Input, the Accelerometer_Input, Humidity_Input, In-Cab_Temperature_Input, Outside_Temperature_Input, Light_Input, Ign_Voltage_Input, Cam_Voltage_Input, Driver_Camera_Input, Vehicle_Camera_Input, Cellular_Diagnostic_Input, and Wireless_Diagnostic_Input to detect events that suggest that the an entire vehicle system or a portion thereof is not operating as intended. Such events may be output via the System_Warning_Output stream.

For example, a System_Warning_Ouput event may be detected if the Cellular Signal Level in the Cellular_Diagnostic Input Stream indicates is less than a predefined minimum signal level threshold. This threshold may be specified by a user or administrator and stored, for example, in data store 611. The System_Warning_Output stream may include the exemplary information listed in Table 20 below.

TABLE 20

| Parameter Name | Type | Description |
| --- | --- | --- |
| Vehicle Identification Number | String | The Vehicle Identification Number that is unique to the vehicle |
| Rel_Cmpnts | String | The component names of the components that make up the system warning condition |
| Warn_Reason | Integer | The reason code that indicates why the system warning event was generated |
| Warn_Msg | String | Text that describes the system warning that has occurred |
| Warn_Trace | String | Trace information that supplements the warning message |
| Warn_TS | Timestamp | Time that the system warning occurred |
| Warn_Lat | String | The latitude reading at the time of the system warning |
| Warn_Lng | String | The longitude reading at the time of the system warning |
| Direction | String | The vehicle direction at the time of the system warning |

Vehicle_Movement_Output

A CEP engine 505 may use information from the Vehicle_Readings_Input, the GPS_Input, and/or the Vehicle_Camera_Input to detect events that indicate the current geographic position of the vehicle and the vehicle's current state of motion. Such events may be output via the Vehicle_Movement_Ouput stream.

A vehicle movement event may be detected, for example, if the vehicle speed as indicated in the Vehicle_Readings_Input stream exceeds a predefined maximum speed threshold (e.g., stored in data store 611). That is, an event may be detected if the vehicle is speeding. Another example of a type of vehicle movement event that may be detected is if the vehicle is idling. Such an event may be detected and output if, for example, the vehicle speed is less than or equal to a minimum speed threshold (e.g., 0 mph), the engine RPM level is greater than or equal to a minimum RPM threshold (e.g., 100 rpm), the vehicle key position is in the "Run" position, and the engine oil pressure is greater than a minimum oil pressure threshold (e.g. 15 psi). Another example of a type of vehicle movement event that may be detected is a vehicle moving event. Such an event indicates that the vehicle is moving and may be detected, for example, if the vehicle speed is greater than a minimum speed threshold (e.g., 0 mph) and the vehicle gear position is not in park.

Another type of vehicle movement event that may be detected is a U-turn event, which may be detected if, within 15 seconds, the current vehicle direction as indicated by the GPS receiver does not equal the previous vehicle direction. Another type of vehicle movement event that may be detected is a long braking event which may be detected using the Brake_Ind parameter of the Vehicle_Readings_Input stream. For example, if it is determined that the brakes are being continuously applied for longer than a predefined maximum brake duration threshold (e.g, 45 seconds), then a long braking event may be detected.

Another type of vehicle movement event that may be detected is a hard braking event. Such an event may be detected if, over a period of five seconds, the speed level of the vehicle decreases by an amount that is greater than a predefined maximum speed change threshold (e.g, 30 mph). Another type of vehicle movement event that may be detected is a long reverse event. Such an event may be detected, for example, if the gear position of the vehicle is in reverse and the speed of the vehicle exceeds a minimum speed threshold (e.g., 0 mph or 1 mph) for period of time equal to or longer than a predefined maximum reverse time threshold (e.g., 120 seconds).

Another type of vehicle movement event that may be detected is a fast reverse event, which may be detected if, for example, the vehicle gear position is in reverse and the vehicle speed exceeds a predefined maximum reverse speed threshold (e.g., 25 mph). Another type of vehicle movement event that may be detected is a near miss event, which may be detected if, for example, Drvr_Distract_Ind indicates a driver distraction event within five seconds of any detected hard braking event.

Another type of vehicle movement event that may be detected is a moving while not in gear event. Such an event may be detected if the gear position of the vehicle is in neutral or park and the speed of the vehicle (as specified either in the Vehicle_Readings_Input or GPS_Input) exceeds a minimum speed threshold (e.g. 0 mph). Another type of vehicle movement event that may be detected is a heavy traffic event. Such an event may be detected if the vehicle speed is greater than or equal to a predefined normal speed threshold (e.g., 35 mph), followed by the vehicle speed being less than the normal speed threshold for a period of time that is greater than or equal to minimum traffic jam time threshold (e.g, 300 seconds).

In the foregoing and examples, the Vehicle_Camera_Input stream also may be queried in connection with the various vehicle movement indicators included in Table 13 above. The Vehicle_Movement_Output stream may include the exemplary information listed in Table 21 below.

TABLE 21

| Parameter Name | Type | Description |
| --- | --- | --- |
| Vehicle Identification Number | String | The Vehicle Identification Number that is unique to the vehicle |

TABLE 21-continued

| Parameter Name | Type | Description |
| --- | --- | --- |
| GPS_Lat | String | The latitude, in decimal degrees, at the time of the Vehicle Movement event |
| GPS_Lng | String | The longitude, in decimal degrees, at the time of the Vehicle Movement event |
| Direction | String | The vehicle direction at the time the Vehicle Movement event occurred |
| GPS_Speed | Float | The vehicle speed, as reported by the GPS, at the time the Vehicle Movement event occurred |
| Key_State | Integer | The state of the vehicle key at the time the Vehicle Movement event occurred |
| RPM_Level | Float | The engine RPM reading at the time the Vehicle Movement event occurred |
| Brake_Ind | Boolean | Indicator as to whether or not the vehicle brake was applied at the time of the Vehicle Movement event |
| Throttle_Pct | Float | The percentage of the throttle usage at the time of the Vehicle Movement event |
| Gear_Pos | Integer | The vehicle gear position at the time of the Vehicle Movement event |
| Veh_Speed | Float | The vehicle speed, as reported by the on-board diagnostic system, at the time of the Vehicle Movement event |
| Read_TS | Timestamp | The timestamp at the time of the vehicle movement event |

Vehicle_Engine_Output

A CEP engine 505 may use information from the Vehicle_Readings_Input and the GPS_Input to detect events that indicate a vehicle engine condition that exceeds set tolerances. Such events may be output via the Vehicle_Engine_Ouput stream.

One example of type of vehicle engine output event that may be detected is a high throttle event. Such an event may be detected if the throttle percentage specified in the Vehicle_Readings_Input exceeds a predefined maximum throttle percentage threshold (e.g, 100 percent). Another type of vehicle engine output event that may be detected is a red line event. Such an event may be detected, for example, if the RPM level specified in the Vehicle_Readings_Input exceeds a maximum RPM threshold (e.g., 3500 rpm). The Vehicle_Engine_Output stream may include the exemplary information listed in Table 22 below.

TABLE 22

| Parameter Name | Type | Description |
| --- | --- | --- |
| Vehicle Identification Number | String | The Vehicle Identification Number that is unique to the vehicle |
| Oil_Temp | Float | The temperature of the engine oil at the time of the vehicle engine event |
| Eng_Temp | Float | The temperature of the engine at the time of the vehicle engine event |
| RPM_Level | Float | The RPM level of the engine at the time of the vehicle engine event |
| Speed_Level | Float | The vehicle speed at the time of the vehicle engine event |

TABLE 22-continued

| Parameter Name | Type | Description |
| --- | --- | --- |
| Throttle_Pct | Float | The percentage of throttle used at the time of the vehicle engine event |
| Mileage | Float | The engine mileage at the time of the vehicle engine event |
| Trouble_Cd | Float | The trouble code associated with the vehicle engine event |
| Eng_Light_Ind | Boolean | Indicator as to whether or not the check engine lights was on at the time of the vehicle engine event |
| GPS_Lat | String | The latitude, in decimal degrees, at the time of the vehicle engine event |
| GPS_Lng | String | The longitude, in decimal degrees, at the time of the vehicle engine event |
| Direction | String | The vehicle direction at the time of the vehicle engine event |
| Read_TS | Timestamp | The timestamp at the time of the vehicle engine event |

Vehicle_Fluid_Output

A CEP engine 505 may use information from the Vehicle_Readings_Input and the GPS_Input to detect events that indicate a vehicle fluid reading that exceeds set tolerances. Such events may be output via the Vehicle_Fluid_Ouput stream.

One example of a type of vehicle fluid event that may be detected is a fueled event. Such an event may be detected if current fuel level indicated in the Vehicle_Readings_Input is greater than the previous fuel level, the current fuel level is less than or equal to a predefined maximum fuel level threshold (e.g., 100 percent) and the current fuel level is greater than a predefined minimum fuel level threshold (e.g, 0 percent) Another example of a type of vehicle fluid event that may be detected is a low fuel event. Such an event may be detected, for example, if the current fuel level indicated in the Vehicle_Readings_Input is less than or equal to the predefined minimum fuel level threshold. The Vehicle_Fluid_Output stream may include the exemplary information listed in Table 23 below.

TABLE 23

| Parameter Name | Type | Description |
| --- | --- | --- |
| Vehicle Identification Number | String | The Vehicle Identification Number that is unique to the vehicle |
| Oil_Temp | Float | The temperature of the engine oil at the time of the vehicle fluid event |
| Eng_Temp | Float | The temperature of the engine at the time of the vehicle fluid event |
| Fuel_Level | Float | The fuel level of the vehicle at the time of the vehicle fluid event |
| Water_Temp | Float | The water temperature of the vehicle at the time of the vehicle engine event |
| Trouble_Cd | String | The trouble code associated with the vehicle fluid event |
| GPS_Lat | String | The latitude, in decimal degrees, at the time of the vehicle fluid event |
| GPS_Lng | String | The longitude, in decimal degrees, at the time of the vehicle fluid event |

TABLE 23-continued

| Parameter Name | Type | Description |
| --- | --- | --- |
| Direction | String | The direction of the vehicle at the time of the vehicle fluid event |
| Read_TS | Timestamp | The timestamp at the time of the vehicle fluid event |

Vehicle_State_Output

A CEP engine 505 may use information from the Vehicle_Readings_Input, the Ign_Voltage_Input, and the GPS_Input to detect events that indicate a change in vehicle state. Such events may be output via the Vehicle_State_Ouput stream.

An example of a type of vehicle state event that may be detected is an ignition event, which may be detected if the input voltage level specified in the Ign_Voltage_Input stream exceeds a predefined maximum voltage threshold (e.g., 20 volts). Another type of vehicle state event is that may be detected is an ignition off event. Such an event may be detected, for example, if vehicle key position is not in the start position and is not in the run position, and the ignition voltage level is less than or equal to a minimum voltage threshold (e.g., 0 volts). Another type of vehicle state event that may be detected is a check engine event, which may be detected if the Eng_Light_Ind in the Vehicle_Readings_Input indicates that the check engine light is lit. The Vehicle_State_Output stream may include the exemplary information listed in Table 24 below.

TABLE 24

| Parameter Name | Type | Description |
| --- | --- | --- |
| Vehicle Identification Number | String | The Vehicle Identification Number that is unique to the vehicle |
| State_Type | Integer | The type of vehicle state event that is being reported |
| State_Text | String | Description of the vehicle state event being reported |
| Key_Pos | Integer | The position of the vehicle key at the time of the vehicle state event |
| Gear_Pos | Integer | The position of the gear selector at the time of the vehicle state event |
| Psgr_Door_Ind | Boolean | Indicator as to whether the passenger door was open at the time of the vehicle state event |
| Psgr_SBelt_Ind | Boolean | Indicator as to whether the passenger seat belt was fastened at the time of the vehicle state event |
| Psgr_ABag_Ind | Boolean | Indicator as to whether the passenger airbag off light was lit at the time of the vehicle state event |
| Drvr_ABag_Ind | Boolean | Indicator as to whether the driver airbag light was lit at the time of the vehicle state event |
| Ign_Sec_Pos | Timestamp | The ignition security state of the vehicle at the time of the vehicle state event |
| Eng_Light_Ind | Boolean | Indicator as to whether the check engine light was lit at the time of the vehicle state event |

TABLE 24-continued

| Parameter Name | Type | Description |
| --- | --- | --- |
| Prk_Brk_Ind | Boolean | Indicator as to whether the parking brake was engaged at the time of the vehicle state event |
| Ovr_Drv_Ind | Boolean | Indicator as to whether the overdrive light was lit at the time of the vehicle state event |
| SBelt_Light_Ind | Boolean | Indicator as to whether the fasten seatbelt light was lit at the time of the vehicle state event |
| DrOpen_Light_Ind | Boolean | Indicator as to whether or not the door ajar light was lit at the time of the vehicle state event |
| GPS_Lat | String | The vehicle latitude, in decimal degrees, at the time of the vehicle state event |
| GPS_Lng | String | The vehicle longitude, in decimal degrees, at the time of the vehicle state event |
| Direction | String | The direction of the vehicle at the time of the vehicle state event |
| Read_TS | Timestamp | The time at which the vehicle state event occurred |

Vehicle_Camera_Output

A CEP engine 505 may use information from the Vehicle_Camera_Input, the Cam_Voltage_Input, and the GPS_Input to detect events that indicate that the vehicle camera is capturing or has captured images of the cab and the front of the vehicle. Such events may be output via the Vehicle_Camera_Output stream.

An example of a type of vehicle camera event that may be detected is a camera capture event, which may be detected if the camera voltage level specified in the Vehicle_Camera_Input stream exceeds a predefined threshold (e.g., 0 volts). The Vehicle_Camera_Output stream may include the exemplary information listed in Table 25 below. It should be appreciated that this output stream is status-oriented in nature, in that it provides information about operation of an on-board vehicle camera. As discussed elsewhere herein, other output streams are possible in which the occurrence of complex events may be indicated based on one or more image-related events present in the Vehicle_Camera_Input stream or Driver_Camera_Input stream.

TABLE 25

| Parameter Name | Type | Description |
| --- | --- | --- |
| Vehicle Identification Number | String | The Vehicle Identification Number that is unique to the vehicle |
| Cam_Volt_Level | Float | The voltage reading from the vehicle camera at the time of the vehicle camera event |
| Cam_Clip_Cnt | Integer | The number of available pictures captured by the camera at the time of the vehicle camera event |
| GPS_Lat | String | The vehicle latitude, in decimal degrees, at the time of the vehicle camera event |
| GPS_Lng | String | The vehicle longitude, in decimal degrees, at the time of the vehicle camera event |

TABLE 25-continued

| Parameter Name | Type | Description |
| --- | --- | --- |
| Direction | String | The direction of the vehicle at the time of the vehicle camera event |
| Read_TS | Timestamp | The time at which the vehicle camera event occurred |

Vehicle_Impact_Output

A CEP engine 505 may use information from the Vehicle_Camera_Input, the Cam_Voltage_Input, the Vehicle_Readings_Input, the Accelerometer_Input, and the GPS_Input to detect events that indicate that the vehicle has experienced significant impact one or more axes. Such events may be output via the Vehicle_Impact_Ouput stream.

One example of a type of vehicle impact event that may be detected is an x-axis impact, which may be detected if the x-axis reading from the Accelerometer_Input exceeds a predefined x-axis impact threshold (e.g., 0.8 g). Another example of a type of vehicle impact event that may be detected is a y-axis impact, which may be detected if the y-axis reading from the Accelerometer_Input exceeds a predefined y-axis impact threshold (e.g., 0.5 g). Another example of a type of vehicle impact event that may be detected is a z-axis impact, which may be detected if the z-axis reading from the Accelerometer_Input exceeds a predefined z-axis impact threshold (e.g., 1.0 g). The Vehicle_Impact_Output stream may include the exemplary information listed in Table 26 below.

TABLE 26

| Parameter Name | Type | Description |
| --- | --- | --- |
| Vehicle Identification Number | String | The Vehicle Identification Number that is unique to the vehicle |
| X-Axis | Float | The accelerometer x-axis reading at the time of the vehicle impact event |
| Y-Axis | Float | The accelerometer y-axis reading at the time of the vehicle impact event |
| Z-Axis | Float | The accelerometer z-axis reading at the time of the vehicle impact event |
| Veh_Speed | Float | The vehicle speed at the time of the vehicle impact event |
| RPM_Level | Float | The engine RPM level at the time of the vehicle impact event |
| Brake_Ind | Boolean | Indicator as to whether or not brake was applied at the time of the vehicle impact event |
| Gear_Pos | Integer | Vehicle gear shift position at the time of the vehicle impact event |
| Throttle_Pct | Float | The percentage of throttle utilization at the time of the vehicle impact event |
| Cam_Volt_Level | Float | The voltage reading of the vehicle camera at the time of the vehicle impact event |
| Cam_Clip_Cnt | Integer | The captured image count of the vehicle camera at the time of the vehicle impact event |
| GPS_Lat | String | The vehicle latitude, in decimal degrees, at the time of the vehicle impact event |
| GPS_Lng | String | The vehicle longitude, in decimal degrees, at the time of the vehicle impact event |
| Direction | String | The direction of the vehicle at the time of the vehicle impact event |
| Read_TS | Timestamp | The time at which the vehicle impact event occurred |

Vehicle_Environment_Output

A CEP engine 505 may use information from the GPS_Input, the In-Cab_Temperature_Input, the Humidity_Input, and the Light_Input to detect events that indicate the current environmental conditions inside the vehicle. Such events may be output via the Vehicle_Environment_Ouput stream. The Vehicle_Environment_Output stream may include the exemplary information listed in Table 27 below.

TABLE 27

| Parameter Name | Type | Description |
| --- | --- | --- |
| Vehicle Identification Number | String | The Vehicle Identification Number that is unique to the vehicle |
| Evt_Type | Integer | The type of vehicle environment event being reported |
| Evt_Text | String | Description of the vehicle environment event being reported |
| Cab_Temp_Level | Float | The temperature reading inside the vehicle at the time of the vehicle environment event |
| Humidity_Level | Float | The humidity reading at the time of the vehicle environment event |
| Light Level | Float | The light level reading at the time of the vehicle environment event |
| Dr_Open_Light_Ind | Boolean | Indicator as to whether or not the Door Ajar light was lit at the time of the vehicle environment event |
| Psgr_Door_Open_Ind | Boolean | Indicator as to whether or not the passenger door was open at the time of the vehicle environment event |
| GPS_Lat | String | The vehicle latitude, in decimal degrees, at the time of the vehicle environment event |
| GPS_Lng | String | The vehicle longitude, in decimal degrees, at the time of the vehicle environment event |
| Direction | String | The direction of the vehicle at the time of the vehicle environment event |
| Read_TS | Timestamp | The time at which the vehicle environment event occurred |

Occupant_State_Output

A CEP engine 505 may use information from the GPS_Input, the Vehicle_Readings_Input, and the Driver_Camera_Input to detect events that indicate a change in the state of the driver. Such events may be output via the Occupant_State_Ouput stream.

An example of a type of occupant state event that may be detected is a driver drowsy event. Such an event may be detected if number of driver sleep events received from the Driver_Camera_Input stream in a one minute period exceeds a predefined threshold (e.g., 5). Another example of a type of occupant state event that may be detected is a driver distracted event, which may be detected, for example, if the number of driver distracted events received via the Driver_Camera_Input stream in a one minute period exceeds a predefined threshold (e.g, 4). Another type of occupant state event that may be detected is a passenger present event. Such an event may be detected if, for example, the Psgr_Abag_Ind parameter of the Vehicle_Readings_Input stream indicates that the passenger airbag light is lit or if the Psgr_Sbelt_Ind indicates that the passenger seatbelt is fastened. The Occupant_State_Output stream may include the exemplary information listed in Table 28 below.

TABLE 28

| Parameter Name | Type | Description |
| --- | --- | --- |
| Vehicle Identification Number | String | The Vehicle Identification Number that is unique to the vehicle |
| Evt_Type | Integer | The type of occupant state event being reported |
| Evt_Text | String | Description of the occupant state event being reported |
| Psgr_SBelt_Ind | Boolean | Indicator as to whether or not the passenger seat belt is fastened at the time of the occupant state event |
| Psgr_ABag_Ind | Boolean | Indicator as to whether or not the passenger airbag off light was lit at the time of the occupant state event |
| SBelt_Light_Ind | Boolean | Indicator as to whether or not the fasten seat belt light was lit at the time of the occupant state event |
| DrOpen_Light_Ind | Boolean | Indicator as to whether or not the Door Ajar light was lit at the time of the occupant state event |
| Psgr_Door_Open_Ind | Boolean | Indicator as to whether or not the passenger door was open at the time of the occupant state event |
| Drvr_Distract_Ind | Boolean | Indicator as to whether or not the driver state sensor detected driver distraction at the time of the occupant state event |
| Drvr_MSleep_Ind | Boolean | Indicator as to whether or not the driver state sensor detected driver microsleep at the time of the occupant state event |
| GPS_Lat | String | The vehicle latitude, in decimal degrees, at the time of the occupant state event |
| GPS_Lng | String | The vehicle longitude, in decimal degrees, at the time of the occupant state event |
| Direction | String | The direction of the vehicle at the time of the occupant state event |
| Read_TS | Timestamp | The time at which the occupant state event occurred |

External_Environment_Output

A CEP engine 505 may use information from the GPS_Input, the Outside_Temperature_Input, the Humidity_Input, and the Light_Input to detect events that indicate the current state of the external environmental conditions. Such events may be output via the External_Environment_Ouput stream.

An example of an external environment event that may be detected is a low light event. Such an event may be detected if the light level specified in the Light_Input stream is less than or equal to a predefined minimum light threshold (e.g., 15 percent). The External_Environment_Output stream may include the exemplary information listed in Table 29 below.

TABLE 29

| Parameter Name | Type | Description |
| --- | --- | --- |
| Vehicle Identification Number | String | The Vehicle Identification Number that is unique to the vehicle |
| Evt_Type | Integer | The type of external environment event being reported |
| Evt_Text | String | Description of the external environment event being reported |
| Ext_Temp_Level | Float | The temperature reading outside the vehicle at the time of the external environment event |
| Humidity_Level | Float | The humidity reading at the time of the external environment event |
| Light Level | Float | The light level reading at the time of the external environment event |
| GPS_Lat | String | The vehicle latitude, in decimal degrees, at the time of the external environment event |
| GPS_Lng | String | The vehicle longitude, in decimal degrees, at the time of the external environment event |
| Direction | String | The direction of the vehicle at the time of the external environment event |
| Read_TS | Timestamp | The time at which the external environment event occurred |

Disobeyed_Stop_Traffic_Signal_Output

In some embodiments an output stream may be defined onto which data is published relating to detection of a disobeyed stop traffic signal (e.g., a vehicle entering an intersection when the traffic signal has indicated that the driver must stop, such as a red traffic light or a stop sign). Vehicle_Readings_Input (described above in Table 3), GPS_Input (described above in Table 4), Vehicle_Camera_Input (described above in Table 13) and/or Street_Map_Input (see Table 1) may be used by CEP engine 505 as input streams, and various information derived therefrom may be used to detect such an event. A Disobeyed_Stop_Traffic_Signal_Output stream may include the exemplary information listed in Table 30 below.

TABLE 30

| Parameter Name | Type | Description |
| --- | --- | --- |
| Vehicle Identification Number | String | The Vehicle Identification Number that is unique to the vehicle |
| Speed_Level_Before_Signal | Float | Vehicle speed in MPH immediately before detection of a traffic signal in one or more images |
| Speed_Level_After_Signal | Float | Vehicle speed in MPH following detection of a traffic signal in one or more images |
| Thottle_Pct_Before | Float | Percentage of throttle depression immediately before detection of a traffic signal in one or more images |

TABLE 30-continued

| Parameter Name | Type | Description |
| --- | --- | --- |
| Thottle_Pct_After | Float | Percentage of throttle depression following detection of a traffic signal in one or more images |
| Brake_Ind | Boolean | Indicator as to whether or not the brake pedal was applied following detection of a traffic signal in one or more images |
| Yellow_Traffic_Signal_Ind | Boolean | Indicator that a yellow traffic light was detected in one or more images |
| Red_Traffic_Signal_Ind | Boolean | Indicator that a red traffic light or stop sign was detected in one or more images |
| Yellow_Red_Time | Float | Time interval between a detected yellow traffic light and a detected red traffic light in one or more images |
| Read_GPS | Float, Float | Vehicle GPS latitude and longitude coordinates at which disobeyed stop traffic signal event occurred |
| Read_TS | Timestamp | The time at which the disobeyed stop traffic signal event occurred |

In connection with a disobeyed stop traffic signal event, any one or more of a vehicle speed, a vehicle throttle depression reading, and a brake pedal application indicator may be used from the Vehicle_Readings_Input stream to assess a current speed as well as acceleration and/or deceleration of the vehicle (change of speed over some time interval). Speed information also or alternatively may be obtained from the GPS_Input stream. Speed, acceleration and/or deceleration may be compared to one or more pieces of traffic signal information derived from the Vehicle_Camera_Input stream, such as an indication of a presence of a yellow traffic light in one or more images, an indication of a red traffic light in one or more images, and/or an indication of a stop sign in one or more images (as discussed earlier, it is presumed that appropriate image analysis algorithms are applied to acquired images to make the necessary determination of traffic signal presence in one or more images). Changes in speed, acceleration and/or deceleration proximate in time to the detection of a traffic signal in one or more images provides instructive information with respect to a potentially disobeyed traffic signal.

In one implementation for which an exemplary query set is provided below, a disobeyed stop traffic signal event is determined if a red traffic light is detected within a predetermined time interval of a detected yellow traffic light, and if the vehicle speed and/or throttle depression is approximately the same or increased during the predetermined time interval between detection of a yellow traffic light and a red traffic light (e.g., indicating that the driver made no attempt to slow down upon the yellow traffic light, or in fact sped up in an attempt to beat the red light). In one aspect of this example, an absence of the brake pedal application indicator during the predetermined time interval between a detected yellow traffic light and a detected red traffic light also or alternatively may be indicative of a disobeyed stop traffic signal.

In some implementations, the CEP engine also may consult the GPS_Input stream to assess the current geographic location of a vehicle and, based on same, issue a web service call for information to be published to the Street_Map_Input stream. Based on information contained in the Street_Map_Input stream, a query may assess if the vehicle is approaching an intersection and, if so, the CEP engine may begin specifically monitoring the Vehicle_Camera_Input stream, and/or triggering one or more specific image analysis algorithms, for determination of relevant traffic signal information that may be present in one or more images.

Figure 8:
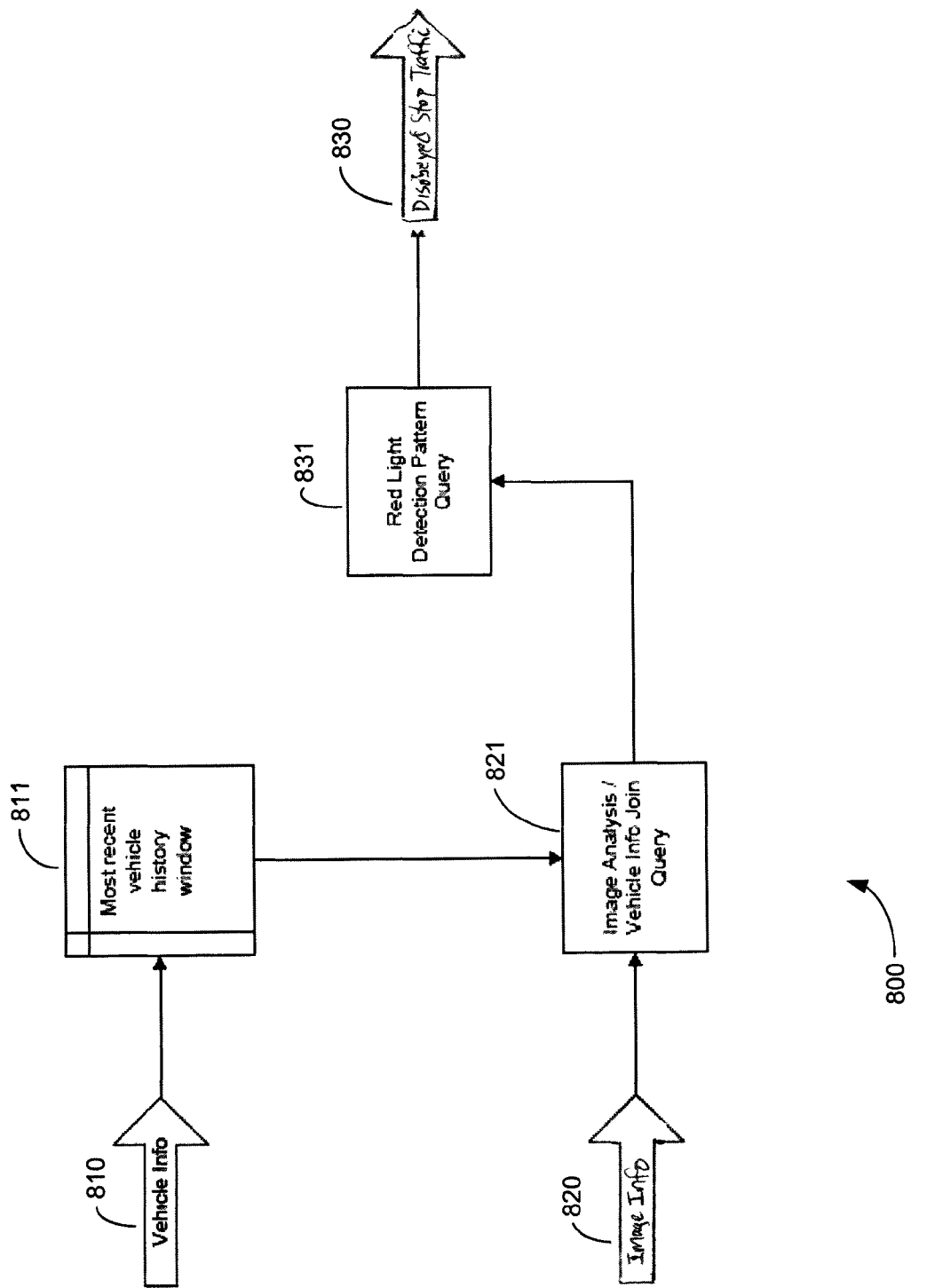
FIG. 8 is a flow chart of a process for detecting a "disobeyed stop traffic signal event" using a complex event processing engine, in accordance with some embodiments of the invention.

FIG. 8 shows a high-level generalized flow chart diagram of a specific example of a query set 800 for detecting when a vehicle runs a red traffic light (minor modifications to this query set would be applicable to detecting when a vehicle runs a stop sign). CEP query 800 monitors one or more first input streams 810 onto which vehicle information is published (e.g., the Vehicle_Readings_Input stream, the GPS_Input stream), and monitors one or more second input streams 820 onto which image information is published (e.g., the Vehicle_Camera_Input stream). When an event is published to stream 820 indicating the detection of traffic signal information, the event is joined by Join Query 821 with the most recent VIS information provided on the Vehicle_Readings_Input stream, which is stored in Most Recent Vehicle History Window 811. Red Light Detection Pattern Query 831 monitors the output of the Join Query 821. When Red Light Detection Pattern Query 831 detects a yellow light event (i.e., Yellow_Traffic_Signal_Ind) followed by a red light event (i.e., Red_Traffic_Signal_Ind) within a predetermined time interval (e.g., a 5 second window), it compares the VIS information joined to those two events. If the result of that comparison is that the speed of the vehicle or throttle percentage of the vehicle is approximately the same or greater at the time of the red light event than that at the time of the yellow light event, CEP query 800 publishes the Disobeyed_Stop_Traffic_Output to output stream 830, and may also issue a local "run red light alert."

Following below is exemplary pseudo-code to be executed by a CEP engine to assess a disobeyed stop traffic signal event based on increasing vehicle speed and throttle depression in the interval between a detected yellow traffic light and a detected red traffic light (the parameter names used in the pseudo-code example below do not necessarily correspond precisely with names of information fields published onto the output stream of Table 30, as the parameters used in the pseudo-code may be related to, but not identical to, information in one or more of the input streams and/or information ultimately published to the output stream):

```
//maintain the most recent vehicle information (VIN, Speed,
ThrottlePercentage)
//every time an event is received from the image analysis system, join this
information with the most recent vehicle information. (VIN, ImageIdType,
ImageIdValue, Speed, ThrottlePercentage)
//detect the running of a red light
INSERT INTO osRunRedLightAlert
    SELECT Yellow.VIN,
        'Possible Running of Red Light',
        (Red.Speed – Yellow.Speed),
        (Red.ThrottlePct – Yellow.ThrottlePct),
        TO_FLOAT(GETTIMESTAMP(Red) –
        GETTIMESTAMP(Yellow)) / 1000000.0
    FROM IsImageAnalysisEnriched Yellow, IsImageAnalysisEnriched
        Red
MATCHING [5 SECONDS: Yellow,Red]
ON Yellow.VIN = Red.VIN
WHERE (Yellow.IdType = 'TrafficLight') AND (Yellow.IdValue =
'Yellow')
 AND (Red.IdType = 'TrafficLight') AND (Red.IdValue = 'Red')
 AND (Red.Speed > Yellow.Speed)
 AND (Red.ThrottlePct > Yellow.ThrottlePct);
//issue the event
```

It should be appreciated that the exemplary output stream content, query set and pseudo-code for this event are provided primarily for purposes of illustration, and that alterations to the output stream, query set and/or pseudo-code are contemplated for application to vehicle information and/or image information relating to a detected stop sign.

Excessive_Speed_Output

In some embodiments an output stream may be defined onto which data is published relating to detection of an excessive speed event (e.g., a vehicle traveling at a speed in excess of a posted speed limit, and/or traveling at a speed in excess of a determined safe speed, wherein the determined safe speed may rely on existing weather and/or traffic conditions, for example). Vehicle_Readings_Input (described above in Table 3), GPS_Input (described above in Table 4), Vehicle_Camera_Input (described above in Table 13), Weather_Input (see Table 1), Traffic_Input (see Table 1), and/or Street_Map_Input (Table 1) may be used by CEP engine 505 as input streams, and various information derived therefrom may be used to detect such an event. An Excessive_Speed_Output stream may include the exemplary information listed in Table 31 below.

TABLE 31

| Parameter Name | Type | Description |
| --- | --- | --- |
| Vehicle Identification Number | String | The Vehicle Identification Number that is unique to the vehicle |
| Speed_Level | Float | Vehicle speed in MPH (from ECU or GPS receiver) |
| Wind_Wiper_Ind | Boolean | Indicator from ECU and/or image information for activation of windshield wipers |
| Brake_Ind | Boolean | Indicator as to whether or not the brake pedal was applied following detection of a speed limit sign in one or more images |
| Speed_Limit | Float | Speed limit indicated on a speed limit sign detected in one or more images, and/or street map information based on web service call |
| Weather_Info | String | Text description of weather based on web service call |
| Traffic_Info | String | Text description of traffic based on web service call |
| Safe_Speed | Integer | Calculated safe speed based on predetermined percentage of posted speed limit, and/or weather/traffic information |
| Read_GPS | Float, Float | Vehicle GPS latitude and longitude coordinates at which excessive speed event occurred |
| Read_TS | Timestamp | The time at which the excessive speed event occurred |

In connection with an excessive speed event, as in the disobeyed stop traffic signal event, any one or more of a vehicle speed, a vehicle throttle depression reading, and a brake pedal application indicator may be used from the Vehicle_Readings_Input stream to assess a current speed as well as acceleration and/or deceleration of the vehicle. Speed information also may be obtained from the GPS_Input stream. Speed, acceleration and/or deceleration may be compared to one or more pieces of traffic speed information derived from the Vehicle_Camera_Input stream, such as an indication of a presence of a speed limit sign in one or more images, as well as the posted speed limit on the speed limit sign (as discussed earlier, it is presumed that appropriate image analysis algorithms are applied to acquired images to make the necessary determination of a posted speed limit in one or more images). In some embodiments, information about the speed limit for the road on which the vehicle is traveling may be obtained using geographic information from the GPS_Input stream to issue a web service call to a website providing street map information to be published to the Street_Map_Input stream, and this information may be used alternatively to, or in conjunction with, the image information relating to a detected speed limit sign to ascertain the appropriate speed limit.

In some implementations, a safe speed for the vehicle may be determined as a predetermined percentage of the relevant speed limit (e.g., the posted speed limit as detected in one or more images, speed limit as indicated in street map information, etc.). For example, absent any extenuating weather and/or traffic conditions, a safe speed may be set at equal to or slightly greater than the posted speed (e.g., 105% of the posted speed limit, providing some allowance for "reasonable" speeding). In other implementations, the safe speed may be determined based not only on the posted speed limit, but also on weather and/or traffic conditions in the vicinity of the vehicle that may in some manner affect safe travel (and perhaps warrant a safe speed that is less than 100% of the posted speed limit). To this end, a Wind_Wiper_Ind present in the Vehicle_Readings_Input stream (see Table 3), and/or a Wiper_Activation_Output present in the Vehicle_Camera_Input stream (see Table 13), may be used as an indicator of inclement weather conditions (e.g., rain, sleet, snow, etc.), upon which a safe speed of less than 100% of the posted speed limit may be determined. Alternatively, based on information in the GPS_Input stream relating to current geographic location (latitude and longitude coordinates) of the vehicle, the CEP engine may issue a web service call to a weather-oriented website for weather information to be published to the Weather_Input stream, and the safe speed may be determined based at least in part on the retrieved weather information. Regarding determination of safe speed based on traffic information, the CEP engine also or alternatively may issue a web service call, based on information in the GPS_Input stream, to a traffic-oriented website for traffic information to be published to the Traffic_Input stream, and the safe speed may be determined based at least in part on the retrieved traffic information (alone or together with weather information).

Figure 9:
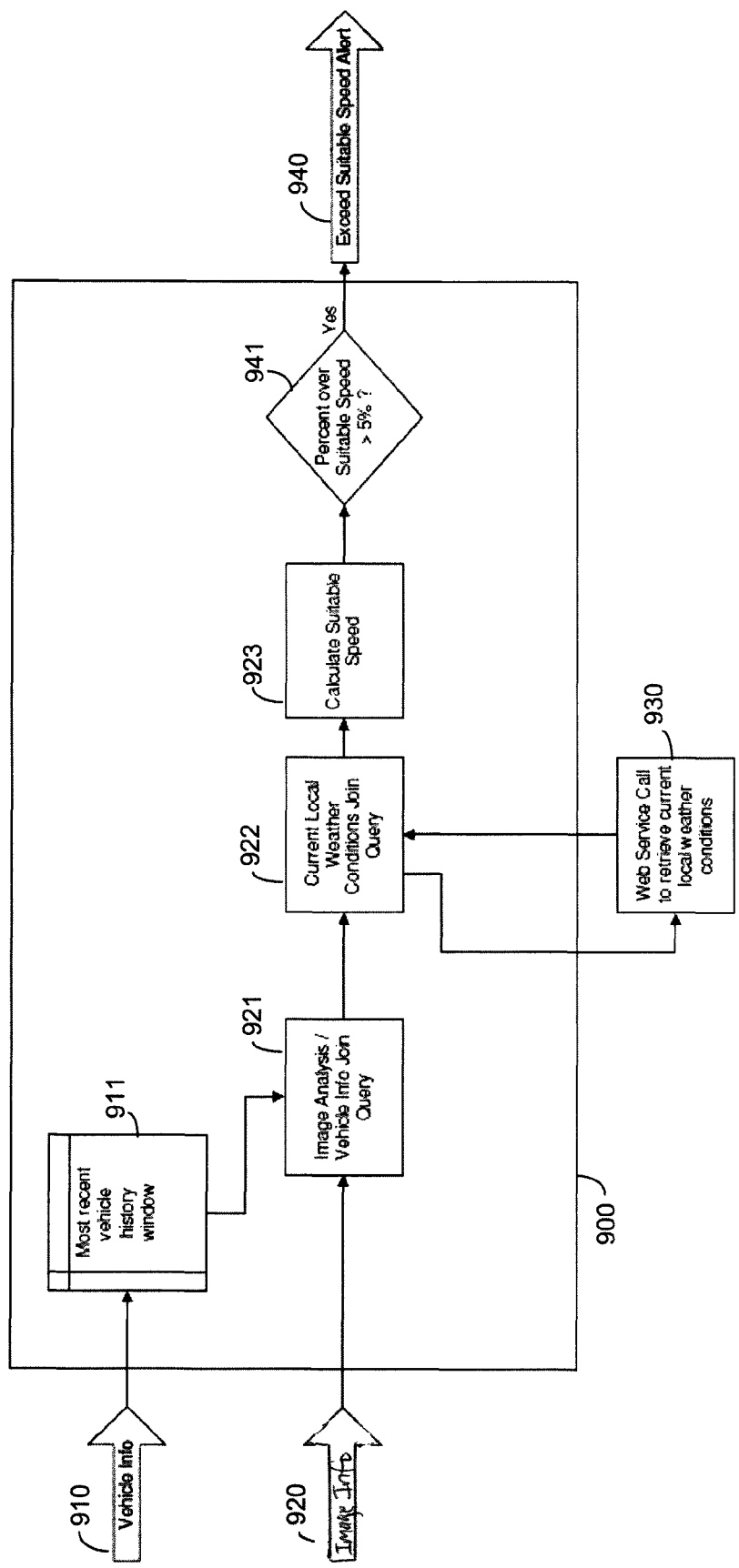
FIG. 9 is a flow chart of a process for detecting an "excessive speed event" using a complex event processing engine, in accordance with some embodiments of the invention.

FIG. 9 shows a high-level generalized flow chart diagram of a specific example of a CEP query 900 for detecting when a vehicle exceeds a safe speed. In FIG. 9, CEP query 900 monitors vehicle information published to one or more first input streams 910 (e.g., the Vehicle_Readings_Input stream, the GPS_Input stream), and monitors image information published to one or more second input streams 920 (e.g., the Vehicle_Camera_Input stream). When an event is published to the input stream 920 (e.g., Speed_Limit_Sign_Output, Posted_Speed_Limit_Output, see Table 13), the event is joined by Join Query 921 with the most recent information from stream 910, stored in Most Recent Vehicle History Window 911. If that event is the detection of a speed limit sign, Current Local Weather Conditions Join Query 922 issues a web service call to retrieve current local weather conditions 930 (a similar web service call may be made to retrieve current local traffic conditions). The VIS and Weather Service Conditions information is evaluated by a routine that calculates the safe speed for the retrieved weather conditions (as shown at act 923 in FIG. 9). If the weather information indicates that it is raining then the safe speed may be calculated as less than 100% (e.g., 75%) of the detected posted speed limit.

If the weather information indicates that it is snowing or that the outside temperature is such that any reported precipitation might be snow or ice, then the safe speed may be calculated as an even lower percentage (e.g., 50%) of the detected posted speed limit. After the safe speed is calculated, it is compared at act 941 with the vehicle speed as stored in Most Recent Vehicle History Window 911. If the result of that comparison is that the speed of the vehicle exceeds the safe speed, or exceeds the safe space by more than some predetermined value (e.g., 105%), CEP query 900 publishes an Exceed Safe Speed event to output stream 940.

In the example above, weather information is obtained by issuing a web service call to a weather information service. However, as discussed above, a variety of other techniques may be used to determine inclement weather conditions. For example, in some embodiments, information may be obtained from the vehicle electronic control unit (ECU) to determine whether the windshield wipers are turned on and, if so, the speed of the windshield wipers. Alternatively, image analysis may be performed on images obtained from the on-board vehicle camera to determine if wiper blades are moving across the windshield, as well as the speed with which the wiper blades are moving across the windshield. Also, while the example above focused specifically on weather information, in a similar manner traffic information may be consulted for determination of an appropriate safe speed.

Following below is exemplary pseudo-code for assessing an excessive speed event based at least in part on local weather conditions (the parameter names used in the pseudo-code example below do not necessarily correspond precisely with names of information fields published onto the output stream of Table 31, as the parameters used in the pseudo-code may be related to, but not identical to, information in one or more of the input streams and/or information ultimately published to the output stream):

```
//maintain the most recent vehicle information (VIN, Speed, Latitude, Longitude)
//when an event is received from the image analysis system (events provided by
Vehicle_Canera_Input), join this information with the most recent vehicle
information (VIN, ImageIdType, ImageIdValue, Speed, Latitude, Longitude)
//when the image analysis system identifies a speed sign, issue a web service call,
utilizing the latitude and longitude, to retrieve the local weather conditions
(temperature and any precipitation condition).
//use this compiled information to calculate the percent over the suitable speed...
FUNCTION GetPercentOverSuitableSpeed(
VehicleTemp FLOAT,
VehicleSpeed FLOAT,
ImageAnalysisSpeedLimit FLOAT,
ImageAnalysisPrecip BOOLEAN,
WeatherServiceTemp FLOAT,
WeatherServiceConditions STRING
) RETURNS FLOAT
    FLOAT result = ImageAnalysisSpeedLimit;
    BOOLEAN WeatherServicePrecip = (WeatherServiceConditions='RAIN') OR
            (WeatherServiceConditions)='SNOW');
    BOOLEAN Rain = (WeatherServiceConditions='RAIN');
    //if both the image analysis and the weather service are indicating precipitation
    IF (ImageAnalysisPrecip AND WeatherServicePrecip) THEN
        IF (Rain) THEN //raining
            result = ImageAnalysisSpeedLimit * .75;
        ELSE //snowing
            result = ImageAnalysisSpeedLimit * .5;
        END;
    //if either the image analysis OR the weather service are indicating precipitation
    ELSEIF (ImageAnalysisPrecip OR WeatherServicePrecip) THEN
        result = ImageAnalysisSpeedLimit * .75;
    END;
    //furthermore, if the weather service is indicating rain, but there is a good
reason to believe the weather could deteriorate...
    IF (Rain) AND (WeatherServiceTemp < 30.0) AND (VehicleTemp < 30.0)
THEN
        result = ImageAnalysisSpeedLimit * .5;
    END;
    RETURN ((VehicleSpeed – result) / result);
END FUNCTION;
//issue an alert based on the calculated metric
IF (percent_over_suitable_speed > .05) THEN "issue alert"
```

It should be appreciated that the exemplary output stream, query set and pseudo-code for this event are provided primarily for purposes of illustration, and that alterations to this output stream, query set and/or pseudo-code are contemplated for application to vehicle information and/or image information relating to an excessive speed event.

Reckless_Driving Output

In some embodiments an output stream may be defined onto which data is published relating to detection of a reckless driving event. Disobeyed_Stop_Traffic_Signal Output (described above in Table 30) and Excessive_Speed_Output (described above in Table 31) may be used by CEP engine 505 as input streams, and various information derived therefrom may be used to detect such an event. A Reckless_Driving_Output stream may include the exemplary information listed in Table 32 below.

TABLE 32

| Parameter Name | Type | Description |
|---|---|---|
| Vehicle Identification Number | String | The Vehicle Identification Number that is unique to the vehicle |
| Excessive_Speed_Duration | Float | Predetermined time period over which excessive speed event has occurred |
| Excessive_Speed_Count | Integer | Number of times an excessive speed event has occurred during a predetermined time period |
| Disobeyed_Stop_Traffic_Signal_Count | Integer | Number of times a disobeyed stop traffic signal even has occurred during a predetermined time period |
| Excessive_Speed_Disobeyed_Stop_Traffic_Signal_Interval | Float | Time interval between proximate occurrences of an excessive speed event and a disobeyed stop traffic signal event |
| Priority_Level | Integer | Priority level assessed for reckless driving event |
| Read_GPS | Float, Float | Vehicle GPS latitude and longitude coordinates at which reckless driving event occurred |
| Read_TS | Timestamp | The time at which the reckless driving event occurred |

As noted in Table 32, a reckless driving event may be determined if an excessive speed event has occurred for a predetermined time period (e.g., excessive speed event is transmitted on an input stream for more than five minutes). Similarly, a reckless driving event may be determined based on a number of times an excessive speed event has occurred (discretely) during a predetermined time period, the number of times that a disobeyed stop traffic signal event has occurred during a predetermined time period, and/or a proximate occurrence in time of an excessive speed event and a disobeyed stop traffic signal event. In some implementations, a priority level may be associated with the reckless driving event.

Figure 10:
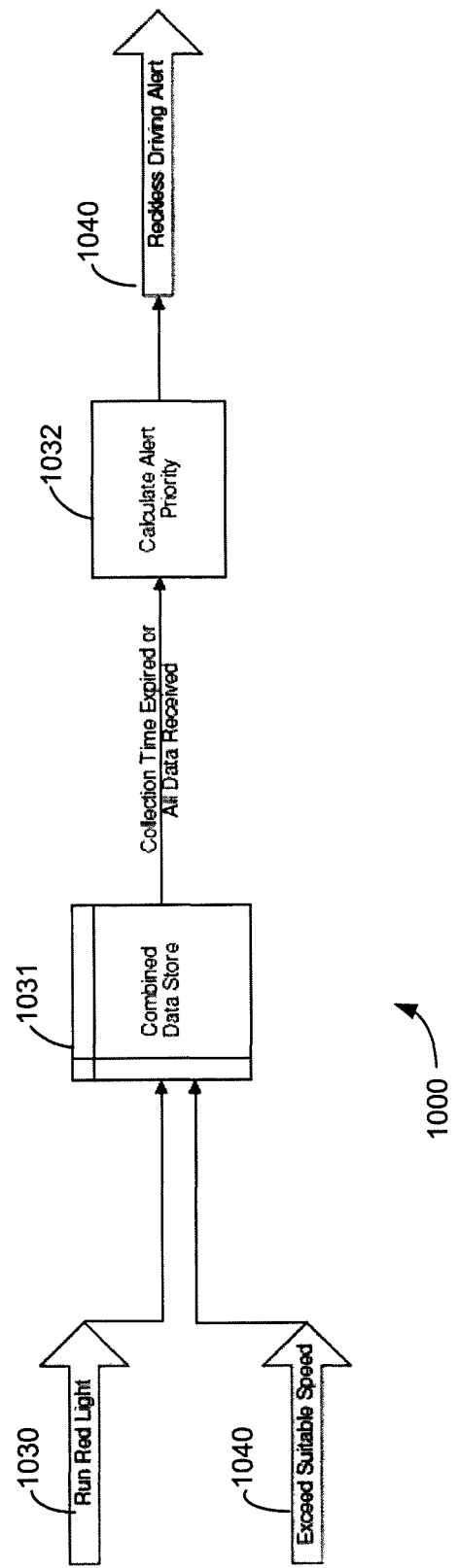
FIG. 10 is a flow chart of a process for detecting a "reckless driving event" using a complex event processing engine, in accordance with some embodiments of the invention.

FIG. 10 shows a high-level generalized flow chart of a specific example of a CEP query 1000 for detecting when a vehicle is driving recklessly. CEP query 1000 monitors event input stream 1030 (onto which disobeyed stop traffic signal events are published) and input stream 1040 (onto which excessive speed events are published). When an event is published to either input stream, any additional event that occur on either of these two input streams within a predetermined time interval (e.g., 5 minutes) is stored in Combined Data Store window 1031. After collecting all available data, or after the expiration of the time window associated with the predetermined time interval, Calculate Alert Priority query 1032 determines an event priority for the initial event. For example, if a vehicle is determined to have disobeyed a stop traffic signal and exceeded the safe speed by more than 40% within a five minute window, Calculate Alert Priority query 1032 may determine that a priority 1 Reckless Driving Event has occurred. If a vehicle is determined to have either disobeyed a stop traffic signal or exceeded the safe speed by more than 40% within a five minute window, Calculate Alert Priority query 1032 may determine that a priority 2 Reckless Driving Event has occurred. If no disobeyed stop traffic signal event has been detected but the vehicle is determined to have exceeded the safe speed by more than 20%, then Calculate Alert Priority query 1032 may determine that a priority 3 Reckless Driving Event has occurred. If only an excessive speed event has been detected in the five minute window, for example by a vehicle exceeding the suitable speed by less than 20% but more than 5%, Calculate Alert Priority query 1032 may determine that a priority 4 Reckless Driving Event has occurred. Query 1032 may publish any detected Reckless Driving event and its priority to output stream 1040. It should be appreciated that the determination of priority levels discussed above is primarily for purposes of illustration, and that priority levels for a reckless driving event may be assessed in any of a variety of manners based on the number and order of excessive speed event and/or disobeyed stop traffic signal event occurrences, and/or a time interval between any two such event occurrences.

Following below is exemplary pseudo-code for assessing a reckless driving event (the parameter names used in the pseudo-code example below do not necessarily correspond precisely with names of information fields published onto the output stream of Table 32, as the parameters used in the pseudo-code may be related to, but not identical to, information in one or more of the input streams and/or information ultimately published to the output stream):

```
//receive Disobeyed_Stop_Traffic_Signal and Excessive_Speed events
as inputs
//for each VIN, collect events for 5 minute after the first event is
received.
//for each VIN, upon collecting all possible data, or completion of the
5 minute collection period for the VIN, use the following logic to
prioritize a Reckless Driving Event...
    IF   (RunRedLight AND (PercentExceeded > .4))
    THEN Event_Priority = 1
    ELSIF (RunRedLight OR (PercentExceeded > .4)) THEN
    Event_Priority = 2
    ELSIF (PercentExceeded > .2) THEN Event_Priority = 3
    ELSE Event_Priority = 4 /* (RanRedLight AND/OR
    (PercentExceeded < .2)) */
//issue the event
```

It should be appreciated that the exemplary output stream, query set and pseudo-code for this event are provided primarily for purposes of illustration, and that alterations to this output stream, query set and/or pseudo-code are contemplated for application to event information relating to reckless driving.

C. Exemplary Fleet-Related Input Streams and Output Streams

With reference again to the CEP system architecture depicted in FIG. 5, in which a CEP engine 507 executing in a central location 501 (e.g., a main office of the company overseeing fleet management operations), and/or in a mobile computing device of a supervisor or dispatcher, is communicatively coupled to multiple vehicle-based CEP engines (i.e., CEP engines 505a, 505b, . . . , 505n), it should be appreciated that a given CEP engine in the system architecture may be configured to receive and/or transmit a wide variety of input and output streams from/to one or more others of the CEP engines in the system. In particular, the exemplary CEP engine 507 in some embodiments serves as a "fleet management CEP engine," in that it receives one or more input streams that are provided as output streams from one or more vehicle-based CEP engines (some of which output streams include vehicle-related events), and also may monitor one or more input streams relating to weather information, traffic information, street map information, and/or credit/fuel card transaction information, for example, to determine any of a wide variety of events relating to respective/collective actions of multiple vehicles of a fleet (as well as assessing events relating to any particular vehicle of the fleet).

Table 33 below lists an illustrative set of input streams that CEP engine 507 may receive in some embodiments. As discussed above, in this example many of the input streams listed in Table 33 correspond to output streams generated by one or more vehicle-based CEP engines 505 (as listed in Table 2 above). As noted in the tables above respectively corresponding to these exemplary input streams to a fleet management CEP engine, a vehicle identification number typically is included in the noted input stream so that respective vehicles of the fleet may be identified. It should be appreciated, however, that in some embodiments, the information content in the exemplary input streams indicated in Table 33 may not exactly match the information content included in the corresponding output streams from vehicle-based CEP engines as listed in Table 2 above. Table 33 also includes exemplary input streams from external data sources, such as weather information, traffic information, street map information, credit/fuel card information and/or resource/scheduling information.

TABLE 33

| Stream Name | Description |
| --- | --- |
| Vehicle_Component_Error_Input | Event detected that indicates a diagnostic error condition for a specific component |
| Vehicle_Component_Warning_Input | Event detected that suggests that a specific component is not operating as intended |
| Vehicle_Component_Heartbeat_Input | Event detected that indicates a heartbeat message transmitted from a specific component |
| Vehicle_System_Error_Input | Event detected from one stream or the combination of several input streams that indicates an error condition for the entire vehicle system, or a portion of that system. |
| Vehicle_System_Warning_Input | Event detected from one stream or the combination of several input streams that suggests the entire vehicle system or a portion of that system is not operating as intended. |
| Vehicle_Movement_Input | Event detected that indicates the current geographic position of the vehicle, as well as the vehicle's current state of motion (e.g., Idling, Speeding, Moving). |
| Vehicle_Engine_Input | Event detected that indicates a vehicle engine condition that exceeds set tolerances. |
| Vehicle_Fluid_Input | Event detected that indicates a vehicle fluid reading that exceeds set tolerances. |
| Vehicle_State_Input | Event detected that indicates a change in the vehicle state (e.g., Key Position, Door Open/Close, Dash Lights, Gear Position). |
| Vehicle_Camera_Input | Event detected that indicates the vehicle camera is capturing, or has captured images of both the cab and the front of the vehicle. |
| Vehicle_Impact_Input | Event detected that indicates that the vehicle has experienced a significant impact on one or more axis. |
| Vehicle_Environment_Input | Event detected that indicates the current state of the internal, in-cab, environment of the vehicle (e.g., In-Cab temperature, In-Cab Lighting). |
| Occupant_State_Input | Event detected that indicates a change in the state of the driver (e.g., Seatbelts fastened, Driver Drowsiness, Driver Distraction, Passenger Presence). |
| External_Environment_Input | Event detected that indicates the current state of the external (outside vehicle) environment (e.g., Outside Temperature, Outside Lighting, Outside Humidity). |

TABLE 33-continued

| Stream Name | Description |
| --- | --- |
| Disobeyed_Traffic_Stop_Signal_Input | Event detected that indicates the vehicle ran a red traffic light or stop sign |
| Excessive_Speed_Input | Event detected that indicates the vehicle speed exceeded a safe speed |
| Reckless_Driving_Input | Event detected that indicates the driver is operating the vehicle recklessly (e.g., multiple excessive speeding events, combination of one or more excessive speeding events with one or more disobeyed traffic stop signal events, etc.) |
| Weather_Input | Weather information (e.g., obtained from a web service call) |
| Traffic_Input | Traffic information (e.g., obtained from a web service call) |
| Street_Map_Input | Street map information (e.g., obtained from a web service call) |
| Credit/Fuel_Card_Transaction_Input | Credit/fuel card transaction information (e.g., obtained from a web service call) |
| Resource/Scheduling_Input | Resource/Scheduling information (e.g., obtained from a company database) |

Table 34 lists an illustrative set of output streams that CEP engine 507 may generate based on queries applied to one or more input streams (e.g., such as those listed in Table 33) received from one or more of CEP engines 505. Each of the indicated output streams generally represents a fleet-related event, and may include a variety of information content in a variety of formats, in a manner similar to that illustrated in the various tables above pertaining to vehicle-related events. In particular, for fleet-related events pertaining to multiple vehicles of the fleet, generally the output stream may include multiple vehicle identification numbers corresponding to the vehicles on which the fleet-related event is based or to which the fleet-related event pertains. Additionally, it should be appreciated that while the output streams in Table 34 below in some instances may represent events relating to multiple vehicles of a fleet, some types of events may relate only to a specific vehicle of the fleet.

TABLE 34

| Name | Description |
| --- | --- |
| Traffic_Jam_Output | Event indicating that a number of vehicles on the same route in the same time period are traveling below threshold speed. |
| Driver_Congregation_Output | Event indicating that a defined number of vehicles are a defined minimum distance away from each other in a certain time period. |
| Frequent_Fueling_Output | Event indicating a defined number of fueling events at the same location in a certain time period. |
| Favorite_Fueling_Location_Output | Event indicating a defined number of fueling events at the same location in a certain time period. |
| Stolen_Fuel_Output | Event indicating that a driver of one or more vehicles may have stolen fuel |
| Frequented_Location_Output | Event indicating a location visited a defined number of times in a certain time period. |
| Rough_Road_Output | Event indicating a threshold number of g-force events in a certain time period indicating an uneven road surface. |
| High_Speed_Areas_Output | Event indicating a certain number of speeding events in a certain time period. |
| Dead_Communications_Area_Output | Event relating locations to cellular or WiFi connectivity difficulty. |

In some embodiments, CEP Engine 507 may detect an event based on input streams from multiple CEP engines 505 and output the event via one of the output streams listed in Table 34. For example, a traffic jam event may be detected and output via the Traffic_Jam_Output stream if it is determined via the Vehicle_Movement_Input streams received from multiple CEP engines 505 that a certain number of vehicles on the same road are traveling below a threshold speed. A technician congregation event may be detected, for example, if it is determined from the Vehicle_Movement_Input streams received by CEP engine 507 that a certain number of vehicles are within a predefined distance of each other within a certain time period. A stolen fuel event may be detected and output via the Stolen_Fuel_Output stream if it is determined for any one or more vehicles that they have stopped at a gas station (e.g., determined using information from the GPS_Input stream and/or the Street_Map_Input stream), used a credit/fuel card to pay for gas (e.g., as determined via the Credit/Fuel_Card_Transaction_Input), and yet within a predetermined time period following the credit/fuel card transaction, the Vehicle_Readings_Input from the vehicle includes a Fuel_Level reading that is not commensurate in scope with the amount of fuel purchased (e.g., the credit/fuel card transaction is for $125, and yet the Fuel_Level reading retrieved from the vehicle indicates 10% full scale). Similarly, a rough road event may be detected if a certain number of vehicle impact events in the same location are received by CEP engine 507 via the Vehicle_Impact_Input streams.

Again, it should be appreciated that the foregoing examples of fleet-related events and/or vehicle-related events determined by a fleet management CEP engine are provided primarily for purposes of illustration, and that various embodiments of the invention are not limited to these examples.

Variable Acquisition Rate GPS

In another embodiment, the CEP engine may be used to determine an environment-appropriate acquisition rate for GPS readings. The acquisition rate for GPS readings is the frequency with which the GPS receiver calculates or logs the current position.

The inventors have appreciated that it may be desirable to adjust the frequency with which the GPS receiver calculates position based on any of a variety of factors. For example, the inventors have recognized that it may be desirable to decrease the acquisition rate at higher vehicle speeds, or to increase the acquisition rate as the vehicle nears its destination. The inventors have also realized that it may be desirable to use a lower acquisition rate in rural environments than in urban environments.

Figure 11:
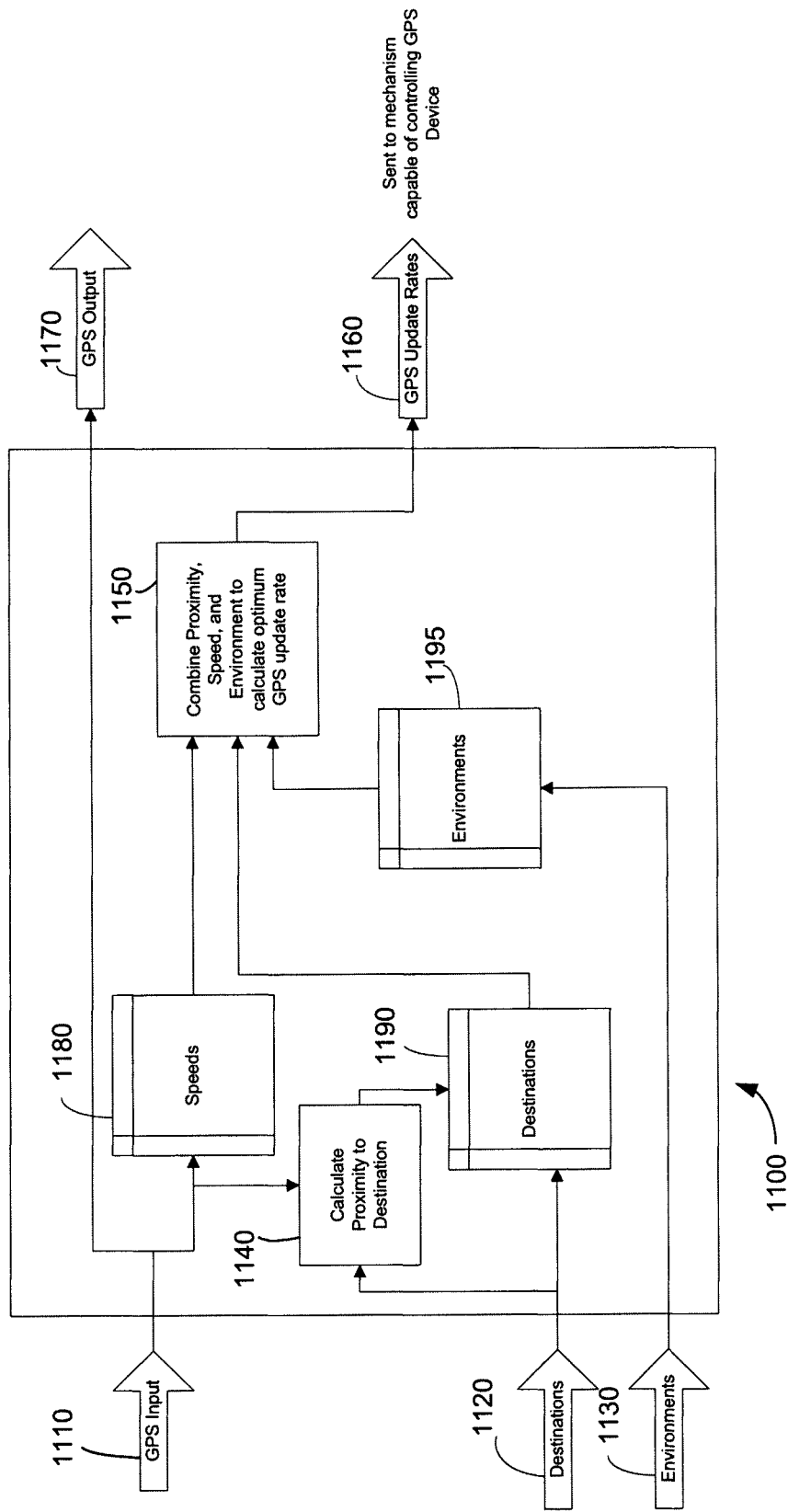
FIG. 11 is a flow chart of a process for adjusting a GPS acquisition rate using a complex event processing engine, in accordance with some embodiments of the invention.

FIG. 11 is a flow chart of an illustrative CEP query 1100 for determining an environment appropriate acquisition rate for GPS readings. This may be achieved either by changing the rate at which the GPS readings are taken, or by using the maximum rate at which GPS readings can be taken but reducing the rate at which the GPS readings are logged (described with below in connection with FIG. 12).

Query 1100 may use information from the GPS_Input stream (described above in connection with table 4), an input stream that provides information from a database of rural and urban environments, information from the Vehicle_Readings_Input stream (described above in connection with table 3), and information about the destination of the vehicle (e.g., derived from the GPS unit or from the dispatch schedule for a given VIN or Technician ID).

In FIG. 11, CEP query 1100 monitors GPS_Input stream 1110, Destinations_Input stream 1120, and Environments_Input stream 1130, which comprises the response from the web service call to the environments database discussed above. When an event is published to either the GPS_Input or Destinations_Input streams, a calculation of proximity to the destination is performed at step 1140. Speeds window 1180 stores the current speed from the GPS_Input stream. Destination Window 1190 stores the vehicle's current distance from the destination, calculated at step 1140. Environments Window 1195 stores the type of environment (e.g., urban or rural) through which the vehicle is currently traveling.

When any event is published to CEP query 1100 the most recently calculated proximity, speed, and environment events are joined at Query 1150, using the information stored in Speeds Window 1180, Destinations Window 1190, and Environments Window 1195. Query 1150 may additionally calculate the environment appropriate acquisition rate for GPS readings, and publish this rate to the GPS_Update_Rates output stream 1160. In some embodiments, CEP query 1100 may additionally publish a copy of the GPS_Input stream data as GPS_Output stream 1170.

The environment-appropriate acquisition rate may be calculated in any of a variety of possible ways. In some embodiments, the acquisition rate may be calculated based on the vehicle's speed, the distance from the final destination, and the type of environment (e.g., urban or rural) through which the vehicle is traveling. Table 35 shows one example of how the acquisition rate may be calculated based on these variables.

TABLE 35

|  | City | | Rural | |
|---|---|---|---|---|
| >5 mi from destination | >50 MPH | 15" | >50 MPH | 30" |
|  | 30-50 MPH | 15" | 30-50 MPH | 30" |
|  | 10-30 MPH | 15" | 10-30 MPH | 15" |
|  | <10 MPH | 1" | <10 MPH | 1" |
| 1-5 mi from destination | >50 MPH | 15" | >50 MPH | 30" |
|  | 30-50 MPH | 15" | 30-50 MPH | 15" |
|  | 10-30 MPH | 1" | 10-30 MPH | 15" |
|  | <10 MPH | 1" | <10 MPH | 1" |
| <1 mi from destination | >50 MPH | 1" | >50 MPH | 1" |
|  | 30-50 MPH | 1" | 30-50 MPH | 1" |
|  | 10-30 MPH | 1" | 10-30 MPH | 1" |
|  | <10 MPH | 1" | <10 MPH | 1" |

GPS_Update_Rates output stream 1160 may be used to change the polling frequency of the GPS device. In embodiments in which the GPS device does not have an interface that allows the acquisition rate to be adjusted, the GPS device may use its pre-configured acquisition rate, and the data output by the GPS device may be altered to effectively decrease the acquisition rate.

Figure 12:
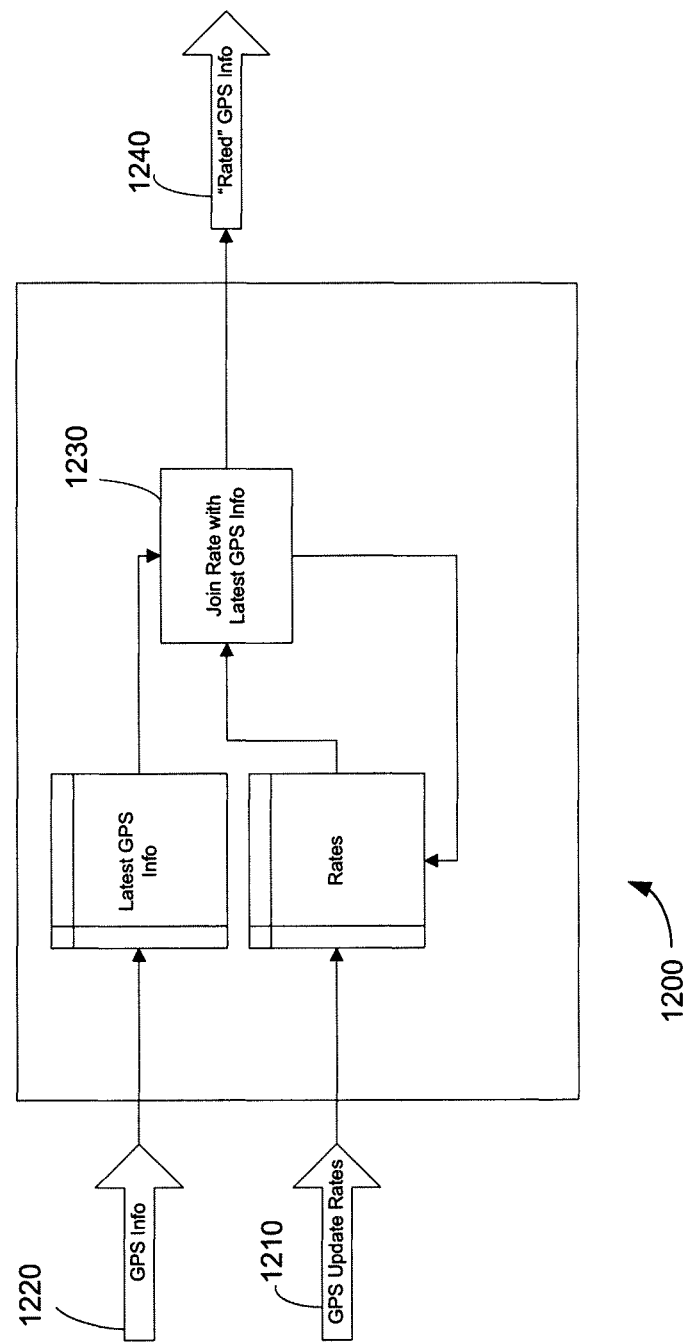
FIG. 12 is a flow chart of a process for modifying the data on a stream generated from a GPS device to adjust to a desired GPS acquisition rate, in accordance with some embodiments of the invention.

For example, as shown in FIG. 12, the GPS_Update_Rates stream 1160 and GPS_Output stream 1170 may be consumed by CEP query 1200 as GPS_Update_Rates stream 1210 and GPS_Info stream 1220, respectively. At step 1230 CEP query 1200 joins and "gates" the GPS readings consumed on GPS_Info stream 1220 at the rate defined by GPS_Update_Rates stream 1210 and publishes the result to "Rated"_GPS_Info stream 1240. In this way, the "Rated" GPS Info stream effectively reduces the acquisition rate of the GPS device by only publishing some of the GPS calculations, such that acquisition rate on output stream 1240 appears to be the desired acquisition rate.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method performed by a complex event processing (CEP) engine that executes on at least one hardware computer processor in a vehicle, the method comprising:
    A) receiving at least two input streams comprising:
        at least one first input stream onto which vehicle information related to the vehicle is published; and
        at least one second input stream onto which image information is published, wherein the image information is based at least in part on data provided by at least one on-board vehicle camera;
    B) applying at least one query to the at least one first input stream and the at least one second input stream;
    C) assessing, based on B), if a vehicle-related complex event has occurred; and
    D) if it is determined in C) that the vehicle-related complex event has occurred, publishing an indication of occurrence of the vehicle-related complex event on at least one output stream of the CEP engine.

2. The method of claim 1, further comprising:
generating at least one perceivable alert in the vehicle based at least in part on D).

3. The method of claim 1, further comprising:
altering operation of the vehicle based at least in part on D).

4. The method of claim 1, further comprising:
transmitting the indication of the occurrence of the vehicle-related complex event from the vehicle to at least one office at which fleet management operations occur and/or to at least one supervisor responsible for the vehicle.

5. The method of claim 1, further comprising:
transmitting the indication of the occurrence of the vehicle-related complex event to at least one second CEP engine external to the vehicle.

6. The method of claim 1, wherein in A), the vehicle information comprises:
vehicle readings information regarding the vehicle provided by an Electronic Control Unit (ECU) of the vehicle.

7. The method of claim 6, wherein the vehicle readings information includes a plurality of values corresponding to a plurality of parameter identifiers defined by the On Board Diagnostic (OBD-II) standard SAE J1979.

8. The method of claim 6, wherein the vehicle readings information includes at least one of:
    a vehicle identification number;
    an odometer reading;
    an engine temperature;
    an oil temperature;
    an engine water temperature;
    a fuel level;
    an engine RPM reading;
    a vehicle speed;
    a throttle depression reading;
    a brake pedal application indicator;
    at least one airbag indicator;
    at least one seatbelt indicator;

a key position indicator;
a gear shift indicator;
a check engine indicator;
an overdrive indicator;
a parking brake indicator;
at least one door open indicator;
at least one vehicle ignition security indicator;
a windshield wiper activation indicator;
a left turn signal indicator;
a right turn signal indicator;
an emergency signal indicator;
a headlamps activation indicator;
a vehicle audio system status indicator; and
at least one timestamp indicating when vehicle readings are obtained.

9. The method of claim 1, wherein in A), the vehicle information includes non-image based environmental information and/or operational information comprising at least one of:
GPS information from at least one GPS receiver associated with the vehicle;
accelerometer information from at least one accelerometer associated with the vehicle;
humidity information from at least one humidity sensor associated with the vehicle;
temperature information from at least one temperature sensor associated with the vehicle;
light-level information from at least one light sensor associated with the vehicle;
ignition voltage information from at least one ignition voltage sensor associated with the vehicle;
cellular diagnostic information relating to cellular connectivity with the vehicle; and
wireless diagnostic information relating to WiFi connectivity with the vehicle.

10. The method of claim 1, wherein the image information includes unprocessed image information obtained from at least one output of the at least one on-board vehicle camera.

11. The method of claim 1, wherein the image information includes status information regarding operation of the at least one on-board vehicle camera.

12. The method of claim 1, wherein the image information includes processed image information derived from the data provided by the at least one on-board vehicle camera.

13. The method of claim 12, wherein the processed image information includes at least one of:
color detection information;
edge detection information;
line detection information;
motion detection information;
pattern recognition information;
object recognition information;
compression information; and
luminance information.

14. The method of claim 12, wherein the processed image information includes traffic signal information indicating that a yellow traffic light, a red traffic light or a stop sign is present in at least one image captured by the at least one on-board vehicle camera.

15. The method of claim 12, wherein the processed image information includes traffic speed information relating to a posted speed limit present in at least one image captured by the at least one on-board vehicle camera.

16. The method of claim 12, wherein the processed image information includes weather information based at least in part on windshield wiper operation detected in at least one image captured by the at least one on-board vehicle camera.

17. The method of claim 12, wherein the processed image information includes lane change information relating to a vehicle lane change determined from image analysis of multiple images captured by the at least one on-board vehicle camera.

18. The method of claim 12, wherein the processed image information includes proximate vehicle collision information relating to a forward proximity of the vehicle to another vehicle as determined from image analysis of multiple images captured by the at least one on-board vehicle camera.

19. The method of claim 1, wherein the at least one on-board vehicle camera is positioned to monitor a driver and/or a rear view of the vehicle, and wherein in A), the image information includes driver image information and/or rear view image information from the at least one on-board vehicle camera.

20. The method of claim 19, wherein the driver image information includes at least one of:
a first indicator corresponding to a detected driver distraction state;
a second indicator corresponding to a detected driver sleep state; and
at least one timestamp indicating when the driver image information is obtained.

21. The method of claim 1, wherein the at least one on-board vehicle camera is positioned to monitor a view from the front windshield of the vehicle, and wherein in A), the image information includes front view image information from the at least one on-board vehicle camera.

22. The method of claim 21, wherein the front view image information includes at least one of:
a number of clips captured by and available from the at least one on-board vehicle camera; and
at least one timestamp indicating when the front view image information is obtained.

23. The method of claim 1, wherein the at least one on-board vehicle camera includes a 360 degree camera system configured to monitor a 360 degree range of view inside or outside the vehicle, and wherein in A), the image information includes 360 degree view image information from the 360 degree camera system.

24. The method of claim 1, wherein the at least one on-board vehicle camera includes a video event recorder configured to record video events based at least in part on one or more exceptional forces acting on the vehicle, and wherein in A), at least some of the image information is provided by the video event recorder.

25. The method of claim 24, wherein the at least one on-board vehicle camera includes a DriveCam™ brand imaging system, and wherein in A), at least some of the image information is provided by the DriveCam™ brand imaging system.

26. The method of claim 1, wherein in C), the vehicle-related complex event includes a disobeyed stop traffic signal event, and wherein C) comprises assessing if the vehicle has run a red traffic light or a stop sign.

27. The method of claim 26, wherein:
in A), the vehicle information includes a current vehicle speed, a throttle depression reading, and/or a brake pedal application indicator;
in A), the image information comprises processed image information including traffic signal information indicating a presence of a yellow traffic light, a red traffic light or a stop sign in at least one image captured by the at least one on-board vehicle camera; and B) comprises:
- B1) detecting the current vehicle speed, the throttle depression reading, and/or the brake pedal application indicator in the at least one first input stream; and
- B2) detecting the traffic signal information in the at least one second input stream.

28. The method of claim 27, wherein:
in A), the traffic signal information includes:
- a first indication of a presence of a yellow traffic light in at least one first image captured by the at least one on-board vehicle camera; and
- a second indication of a presence of a red traffic light in at least one second image captured by the at least one on-board vehicle camera; and B2) comprises:
- B2a) detecting the first indication; and
- B2b) detecting the second indication within a predetermined time interval following B2b).

29. The method of claim 27, wherein C) comprises:
determining that the disobeyed stop signal event has occurred if:
- the current vehicle speed and/or the throttle depression is approximately the same or increased upon detection in B2) of the traffic signal information and/or for a predetermined time interval following detection in B2) of the traffic signal information; and/or
- the brake pedal application indicator is absent upon detection in B2) of the traffic signal information and/or for a predetermined time interval following detection in B2) of the traffic signal information.

30. The method of claim 1, wherein in C), the vehicle-related complex event includes an excessive speed event, and wherein C) comprises assessing if a current vehicle speed exceeds a safe speed.

31. The method of claim 30, wherein:
in A), the vehicle information includes the current vehicle speed;
in A), the image information comprises processed image information including traffic speed information representing a posted speed limit present in at least one image captured by the at least one on-board vehicle camera; and
B) comprises detecting the current vehicle speed in the at least one first input stream and detecting the traffic speed information in the at least one second input stream.

32. The method of claim 31, wherein:
in A), the vehicle information comprises vehicle readings information regarding the vehicle provided by an Electronic Control Unit (ECU) of the vehicle, wherein the vehicle readings information includes the current vehicle speed.

33. The method of claim 31, wherein:
in A), the vehicle information comprises GPS information from at least one GPS receiver associated with the vehicle, wherein the GPS information includes the current vehicle speed.

34. The method of claim 31, wherein C) comprises:
determining that the excessive speed event has occurred if the current vehicle speed detected in B) exceeds the posted speed limit represented by the traffic speed information detected in B) by a predetermined percentage of the posted speed limit.

35. The method of claim 31, wherein C) comprises:
C1) determining the safe speed based at least in part on the traffic speed information detected in B) and weather information.

36. The method of claim 35, wherein:
in A), the vehicle information further includes GPS information from at least one GPS receiver associated with the vehicle;
B) further comprises detecting current longitude and latitude coordinates of the vehicle based on the GPS information in the at least one first input stream; and
C1) comprises issuing a web service call to retrieve the weather information based on the current longitude and latitude coordinates of the vehicle detected in B).

37. The method of claim 35, wherein:
in A), the vehicle information comprises vehicle readings information regarding the vehicle provided by an Electronic Control Unit (ECU) of the vehicle, wherein the vehicle readings information includes a windshield wiper activation indicator;
B) further comprises detecting the windshield wiper activation indicator in the at least one first input stream; and
C1) comprises determining the safe speed based at least in part on the traffic speed information detected in B) and the windshield wiper activation indicator detected in B).

38. The method of claim 35, wherein:
in A), the processed image information further includes at least one indication of windshield wiper operation detected in at least one image captured by the at least one on-board vehicle camera;
B) further comprises detecting the at least one indication of windshield wiper operation based on the processed image information in the at least one second input stream; and
C1) comprises determining the safe speed based at least in part on the traffic speed information detected in B) and the at least one indication of windshield wiper operation detected in B).

39. The method of claim 35, wherein C1) comprises:
if the weather information indicates at least one inclement weather condition, calculating the safe speed as a percentage of the posted speed limit represented by the traffic speed information detected in B).

40. The method of claim 35, wherein:
in A), the vehicle information further includes GPS information from at least one GPS receiver associated with the vehicle;
B) further comprises detecting current longitude and latitude coordinates of the vehicle based on the GPS information in the at least one first input stream; and
C1) comprises issuing a web service call to retrieve the traffic information based on the current longitude and latitude coordinates of the vehicle detected in B).

41. The method of claim 31, wherein C) comprises:
C1) determining the safe speed based at least in part on the traffic speed information detected in B) and traffic information.

42. The method of claim 41, wherein C1) comprises:
if the traffic information indicates a slow traffic or congested traffic condition, calculating the safe speed as a percentage of the posted speed limit represented by the traffic speed information detected in B).

43. The method of claim 1, wherein in C), the vehicle-related complex event includes a reckless driving event.

44. The method of claim 43, wherein C) comprises:
assessing if an excessive speed event has occurred for a predetermined time period.

45. The method of claim 43, wherein C) comprises:
determining a number of times that an excessive speed event has occurred during a predetermined time period.

46. The method of claim 43, wherein C) comprises:
determining a number of times that a disobeyed stop traffic signal event has occurred during a predetermined time period.

47. The method of claim 43, wherein C) comprises:
C1) assessing if an excessive speed event has occurred;
C2) assessing if a disobeyed stop traffic signal event has occurred; and
C3) determining that the reckless driving event has occurred if the excessive speed event occurs within a predetermined time interval of the disobeyed traffic signal event.

48. The method of claim 43, further comprising assessing a priority level of the reckless driving event.

49. At least one computer-readable medium encoded with a processor-executable instructions that, when executed by at least one hardware computer processor, implement a complex event processing (CEP) engine that performs a method comprising:
A) receiving at least two input streams comprising:
  at least one first input stream onto which vehicle information related to a vehicle is published; and
  at least one second input stream onto which image information is published, wherein the image information is based at least in part on data provided by at least one on-board vehicle camera;
B) applying at least one query to the at least one first input stream and the at least one second input stream;
C) assessing, based on B), if a vehicle-related complex event has occurred; and
D) if it is determined in C) that the vehicle-related complex event has occurred, publishing an indication of occurrence of the vehicle-related complex event on at least one output stream of the CEP engine.

50. A complex event processing (CEP) engine to assess occurrences of vehicle-related complex events, the CEP engine comprising:
at least one hardware computer processor;
at least one input/output (I/O) interface; and
at least one tangible memory to store processor-executable instructions,
wherein, upon execution of the processor-executable instructions by the at least one hardware computer processor, the CEP engine:
A) receives, via the at least one I/O interface, at least two input streams comprising:
  at least one first input stream onto which vehicle information related to a vehicle is published; and
  at least one second input stream onto which image information is published, wherein the image information is based at least in part on data provided by at least one on-board vehicle camera;
B) applies at least one query to the at least one first input stream and the at least one second input stream;
C) assesses, based on B), if a vehicle-related complex event has occurred; and
D) if it is determined in C) that the vehicle-related complex event has occurred, publishes, via the at least one I/O interface, an indication of occurrence of the vehicle-related complex event on at least one output stream of the CEP engine.

51. A system, comprising:
the CEP engine of claim 50;
the at least one on-board vehicle camera; and
the vehicle,
wherein the CEP engine is disposed on the vehicle.

52. The system of claim 51, wherein the at least one on-board vehicle camera includes a 360 degree camera system configured to monitor a 360 degree range of view inside or outside the vehicle, and wherein in A), the image information includes 360 degree view image information from the 360 degree camera system.

53. The system of claim 51, wherein the at least one on-board vehicle camera includes a video event recorder configured to record video events based at least in part on one or more exceptional forces acting on the vehicle, and wherein in A), at least some of the image information is provided by the video event recorder.

54. The system of claim 53, wherein the at least one on-board vehicle camera includes a DriveCam™ brand imaging system, and wherein in A), at least some of the image information is provided by the DriveCam™ brand imaging system.

55. The system of claim 51, further comprising:
an Electronic Control Unit (ECU) disposed on the vehicle and coupled to the CEP engine, wherein the vehicle information published on the at least one first input stream and received by the CEP engine comprises vehicle readings information provided by the ECU.

56. The system of claim 55, further comprising at least one environmental and/or operational sensor disposed on the vehicle and coupled to the CEP engine, wherein the at least one environmental and/or operational sensor includes at least one of:
a GPS receiver;
at least one accelerometer;
at least one humidity sensor;
at least one in-vehicle temperature sensor;
at least one external temperature sensor;
at least one light sensor; and
at least one ignition voltage sensor.

57. The system of claim 55, further comprising at least one communications interface, coupled to the CEP engine, to facilitate at least one cellular connection and/or at least one WiFi connection to the CEP engine.

* * * * *